US012586531B2

(12) United States Patent
Yamamoto et al.

(10) Patent No.: US 12,586,531 B2
(45) Date of Patent: Mar. 24, 2026

(54) DISPLAY DEVICE AND METHOD FOR DRIVING SAME

(71) Applicant: Sharp Display Technology Corporation, Kameyama City (JP)

(72) Inventors: Kaoru Yamamoto, Kameyama City (JP); Kohhei Tanaka, Kameyama City (JP)

(73) Assignee: SHARP DISPLAY TECHNOLOGY CORPORATION, Kameyama City (JP)

( * ) Notice: Subject to any disclaimer, the term of this patent is extended or adjusted under 35 U.S.C. 154(b) by 0 days.

(21) Appl. No.: 19/105,399

(22) PCT Filed: Sep. 7, 2022

(86) PCT No.: PCT/JP2022/033521
§ 371 (c)(1),
(2) Date: Feb. 21, 2025

(87) PCT Pub. No.: WO2024/053003
PCT Pub. Date: Mar. 14, 2024

(65) Prior Publication Data
US 2026/0065860 A1 Mar. 5, 2026

(51) Int. Cl.
*G09G 3/32* (2016.01)
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0819* (2013.01); *G09G 2300/0842* (2013.01); *G09G 2300/0861* (2013.01); *G09G 2310/0297* (2013.01); *G09G 2310/08* (2013.01); *G09G 2320/0247* (2013.01); *G09G 2320/0252* (2013.01); *G09G 2330/021* (2013.01); *G09G 2340/0435* (2013.01)

(58) Field of Classification Search
CPC ............... G09G 3/3233; G09G 3/3266; G09G 2300/0819; G09G 2300/0842; G09G 2300/0861; G09G 2310/0297; G09G 2310/08
See application file for complete search history.

(56) References Cited

U.S. PATENT DOCUMENTS 11,538,412 B1 * 12/2022 Zhang .................. G09G 3/3233
2019/0057646 A1 2/2019 Lin et al.
2024/0355287 A1 10/2024 Tanaka et al.

* cited by examiner

*Primary Examiner* — Michael A Faragalla
(74) *Attorney, Agent, or Firm* — Keating & Bennett, LLP

(57) ABSTRACT

In a current drive type display device of a variable refresh rate system such as an organic EL display device, an on-bias voltage line for supplying an on-bias voltage Vobs to be applied to a driving transistor in a pixel circuit is provided in a display portion in order to reduce an influence of a hysteresis characteristic of the driving transistor on display luminance. Therefore, when an operation mode is switched from the low refresh mode to the high refresh mode, among pixel circuits in the same column connected to the same data signal line, a pixel circuit to which data is written and a pixel circuit to which the on-bias voltage is applied can be mixed. This enables quick switching from the low refresh rate to the high refresh rate.

20 Claims, 30 Drawing Sheets

(A) Anode Initialization (NRF Frame Period)

(B) On-Bias Application (NRF Frame Period)

DISPLAY DEVICE AND METHOD FOR DRIVING SAME

TECHNICAL FIELD

The following disclosure relates to a display device, and more particularly to a current drive type display device including a display element driven by a current such as an organic electroluminescence (EL) element, and a method for driving the same.

BACKGROUND ART

In recent years, an organic EL display device having a pixel circuit including an organic EL element (also referred to as an organic light emitting diode (OLED)) has been put into practical use. The pixel circuit of the organic EL display device includes a driving transistor, a write control transistor, a holding capacitor, and the like in addition to the organic EL element. A thin film transistor is used for the driving transistor and the write control transistor, the holding capacitor is connected to a gate terminal as a control terminal of the driving transistor, and a voltage corresponding to a video signal representing an image to be displayed (in more detail, a voltage indicating a gradation value of a pixel to be formed in the pixel circuit) is applied as a data voltage to the holding capacitor from a drive circuit via a data signal line. The organic EL element is a self-luminous display element that emits light with luminance corresponding to a current flowing therethrough. The driving transistor is provided in series with the organic EL element, and controls a current flowing through the organic EL element according to a voltage held in the holding capacitor.

Meanwhile, there is known a display device of a variable refresh rate system (hereinafter, also referred to as a "VRR system") enabling reduction in power consumption by changing a refresh rate according to display contents. In such a display device of the VRR system, a configuration is adopted in which a refresh rate is changed by inserting a frame period in which refresh operation is not performed between adjacent frame periods in which the refresh operation is performed. For example, when a still image is displayed, the refresh rate is greatly reduced as compared with a case of moving image display, so that power consumption can be greatly reduced. This VRR system can be effectively applied when a transistor in a pixel circuit has a small off-leakage current like a transistor using an oxide semiconductor.

In a case where the VRR system as described above is adopted in an organic EL display device, while in a frame period in which refresh operation is performed (hereinafter, referred to as a "refresh frame period" or an "RF frame period"), an organic EL element in each pixel circuit is put into a light-off state by a light emission control transistor during a non-light emission period provided for each frame period, in a frame period in which the refresh operation is not performed (hereinafter, referred to as a "non-refresh frame period" or an "NRF frame period"), operation of a drive circuit is stopped, and the organic EL element in each pixel circuit continues to emit light with luminance corresponding to a data voltage written in a previous refresh frame period. In general, in a case of still image display on a display device of the VRR system, a period during which display is continued without performing the refresh operation (the period including a plurality of consecutive NRF frame periods, and being hereinafter referred to as an "NRF operation period") is much longer than a period during which the refresh operation is performed (the period including one RF frame period or a plurality of consecutive RF frame periods, and being hereinafter referred to as an "RF operation period"), and such an RF operation period and an NRF operation period alternately appear during the display operation. Therefore, when a still image is displayed on the display device of the VRR system, turning off of the organic EL element in the RF operation period is visually recognized as flicker.

On the other hand, Patent Document 1 (US 2019/0057646 A) discloses a pixel circuit configured to cause a decrease in luminance at an appropriate frequency also in an NRF operation period (extended blanking period T_blank) in addition to a decrease in luminance due to turning off of an organic EL element (light emitting diode 304) in an RF operation period (data refresh period T_refrech), and a method for driving the pixel circuit, in order to eliminate flickers visually recognized when driving is performed at a low refresh rate (driven low) (see paragraphs 0049 to 0052 and FIGS. 8A, 8B, 9A, and 9B).

However, even if it is configured such that luminance decreases at an appropriate frequency even during the NRF operation period (hereinafter, such a configuration is referred to as a "periodic turn-off configuration"), since a thin film transistor as a driving transistor in a pixel circuit has a hysteresis characteristic, flicker is still visually recognized when driven low. In other words, in this periodic turn-off configuration, since a voltage stress applied to the thin film transistor as the driving transistor is different between the RF operation period and the NRF operation period, a turn-off waveform is slightly different between the RF operation period and the NRF operation period due to the hysteresis characteristic of the driving transistor, resulting in making flicker be visually recognized.

Patent Document 1 describes that in order to cope with this problem, a bias stress voltage (hereinafter referred to as "on-bias stress or voltage" "on-bias voltage") is intentionally applied to the driving transistor not only in the RF operation period (data refresh period T_refrech) but also in the NRF operation period (extended blanking period T_blank) to balance an influence of a hysteresis characteristic (influence on luminance of the organic EL element) (see FIG. 5 and FIG. 10, paragraph 0053 of Patent Document 1). In this way, it is possible to suppress occurrence of flicker due to a hysteresis characteristics of the driving transistor even when driven low.

CITATION LIST

Patent Documents

[Patent Document 1] US 2019/0057646 A

SUMMARY

Technical Problem

In the organic EL display device of the VRR system as described above, in a case where a still image is displayed, by inserting an NRF frame period between adjacent RF frame periods, a refresh rate is lowered, and power consumption of a drive circuit is reduced. In such an organic EL display device, a refresh cycle can be changed on a frame period basis depending on the number of NRF frame periods inserted into adjacent RF frame periods. Note that a refresh request may occur in the middle of the NRF frame period for moving image display. In this case, in such a known organic EL display device having the configuration as described above in which an on-bias voltage is applied, no refresh operation can be started until an end time point of the NRF frame period. This causes a problem that when still image display is performed at a low refresh rate, a response at the time of switching to moving image display at a high refresh rate is delayed.

Therefore, in a case where a variable refresh rate system (VRR system) is adopted in a current drive type display device such as an organic EL display device in order to reduce power consumption in still image display or the like, it is demanded to enable quick switching from a low refresh rate to a high refresh rate while suppressing occurrence of flicker.

Solution to the Problems

Several embodiments of the disclosure provide a display device having at least two operation modes including a low refresh mode and a high refresh mode, the display device including:

- a display portion including a plurality of data signal lines, a plurality of control scanning lines, and a plurality of pixel circuits arranged along the plurality of data signal lines and the plurality of control scanning lines;
- a data-side drive circuit configured to generate a plurality of data signals based on image data input from the outside and apply the plurality of data signals to the plurality of data signal lines;
- a scanning-side drive circuit configured to control the plurality of pixel circuits by selectively driving the plurality of control scanning lines, and
- a display control circuit configured to control the data-side drive circuit and the scanning-side drive circuit such that an image represented by the image data is displayed by the plurality of pixel circuits in one of the at least two operation modes, wherein

- each pixel circuit of the plurality of pixel circuits
- corresponds to one of the plurality of data signal lines,
- includes: a display element driven by a current; a holding capacitor; a driving transistor for controlling a supply amount of a current to the display element; a write control switching element for controlling whether to write a voltage of a corresponding data signal line as a data voltage to the holding capacitor; and a bias application circuit for applying, to the driving transistor, a bias voltage for reducing an influence of a hysteresis characteristic of the driving transistor on luminance of the display element, and
- is configured to apply the bias voltage from the bias application circuit to the driving transistor simultaneously or concurrently in the each pixel circuit when a voltage of a data signal line corresponding to the each pixel circuit is written as a data voltage to the holding capacitor of another pixel circuit,
- the display control circuit,
- in the low refresh mode, controls the data-side drive circuit and the scanning-side drive circuit such that one or a plurality of refresh frame periods during which a plurality of data voltages based on the image data is written to the plurality of pixel circuits, respectively, alternates with one or a plurality of non-refresh frame periods during which writing of the plurality of data voltages to the plurality of pixel circuits is stopped, and
- in the high refresh mode, controls the data-side drive circuit and the scanning-side drive circuit such that the refresh frame period during which the plurality of data voltages based on the image data is written to the plurality of pixel circuits, respectively, continues, and
- the scanning-side drive circuit,
- in each refresh frame period, controls the write control switching element such that the voltage of the corresponding data signal line is written as a data voltage to the holding capacitor in each of the plurality of pixel circuits in a predetermined data write period,
- in each non-refresh frame period, controls the bias application circuit such that the bias voltage is applied to the driving transistor in each of the plurality of pixel circuits during a predetermined bias period, and
- controls the write control switching element and the bias application circuit such that when new image data is input from the outside during any one of the non-refresh frame periods in the low refresh mode, a new refresh frame period is started at a predetermined time point before an end time point of the any one of the non-refresh frame periods and a plurality of data voltages based on the new image data is written to the plurality of pixel circuits, respectively, and such that in a pixel circuit in which the bias voltage is yet not applied to the driving transistor during the any one of the non-refresh frame periods among the plurality of pixel circuits, the bias voltage is applied to the driving transistor during the bias period from the predetermined time point to the end time point.

Several other embodiments of the disclosure provide a display device based on the above several embodiments,

- wherein the display portion further includes a bias voltage line configured to supply the bias voltage,
- the bias application circuit is connected to the bias voltage line, and
- the scanning-side drive circuit controls the bias application circuit such that the bias voltage is applied to the driving transistor from the bias voltage line during the bias period in each of the plurality of pixel circuits.

Yet other embodiments of the disclosure provide a display device based on the above several embodiments,

- wherein the display portion further includes an initialization voltage line configured to supply an initialization voltage for initializing the display element,
- the bias application circuit is connected to the initialization voltage line, and
- the scanning-side drive circuit controls the bias application circuit such that a voltage of the initialization voltage line is applied to the driving transistor as the bias voltage during the bias period in each of the plurality of pixel circuits.

Yet other embodiments of the disclosure provide a display device based on the above several embodiments, further including a plurality of multiplexers provided outside or inside the data-side drive circuit so as to correspond to the plurality of data signal lines, respectively, each of the multiplexers outputting a data signal to be applied to a corresponding data signal line and the bias voltage, to the corresponding data signal line in a time division manner, wherein

- the write control switching element constitutes the bias application circuit, and
- the scanning-side drive circuit,
- in each refresh frame period, in each pixel circuit of the plurality of pixel circuits, with a predetermined period in which a data signal is applied to a data signal line corresponding to the pixel circuit set as the data write period, controls the write control switching element to be in ON state during the data write period, and controls the write control switching element to be in ON state during a predetermined period in which the bias voltage is applied to the data signal line corresponding to the each pixel circuit such that the bias voltage is applied to the driving transistor during said predetermined period, and in each non-refresh frame period, in each pixel circuit of the plurality of pixel circuits, with a predetermined period in which the bias voltage is to be applied to the data signal line corresponding to the each pixel circuit set as the bias period, controls the write control switching element to be in ON state during the bias period.

Several embodiments of the disclosure provide a drive method of a display device having at least two operation modes including a low refresh mode and a high refresh mode, wherein the display device includes a display portion including a plurality of data signal lines, a plurality of control scanning lines, and a plurality of pixel circuits arranged along the plurality of data signal lines and the plurality of control scanning lines, each pixel circuit of the plurality of pixel circuits corresponding to one of the plurality of data signal lines, including: a display element driven by a current; a holding capacitor; a driving transistor for controlling a supply amount of a current to the display element; a write control switching element for controlling whether to write a voltage of a corresponding data signal line as a data voltage to the holding capacitor; and a bias application circuit for applying, to the driving transistor, a bias voltage for reducing an influence of a hysteresis characteristic of the driving transistor on luminance of the display element, and being configured to apply the bias voltage from the bias application circuit to the driving transistor simultaneously or concurrently in the each pixel circuit when a voltage of a data signal line corresponding to the each pixel circuit is written as a data voltage to the holding capacitor of another pixel circuit, the drive method including:

a data-side driving step of generating a plurality of data signals based on image data input from the outside and applying the plurality of data signals to the plurality of data signal lines; and a scanning-side driving step of controlling the plurality of pixel circuits by selectively driving the plurality of control scanning lines, the scanning-side driving step including a low refresh driving step of controlling the plurality of pixel circuits in the low refresh mode such that one or a plurality of refresh frame periods during which a plurality of data voltages based on the image data is written to the plurality of pixel circuits, respectively, alternates with one or a plurality of non-refresh frame periods during which writing of the plurality of data voltages to the plurality of pixel circuits is stopped, and a high refresh driving step of controlling the plurality of pixel circuits in the high refresh mode such that the refresh frame period during which the plurality of data voltages based on the image data is written to the plurality of pixel circuits, respectively, continues, wherein in the low refresh driving step, in each refresh frame period, the write control switching element is controlled such that the voltage of the corresponding data signal line is written as a data voltage to the holding capacitor in each of the plurality of pixel circuits in a predetermined data write period, and in each non-refresh frame period, the bias application circuit is controlled such that the bias voltage is applied to the driving transistor in each of the plurality of pixel circuits during a predetermined bias period, and the scanning-side driving step further includes a mode switching driving step of controlling the write control switching element and the bias application circuit such that when new image data is input from the outside during any one of the non-refresh frame periods in the low refresh mode, a new refresh frame period is started at a predetermined time point before an end time point of the any one of the non-refresh frame periods and a plurality of data voltages based on the new image data is written to the plurality of pixel circuits, respectively, and such that in a pixel circuit in which the bias voltage is yet not applied to the driving transistor during the any one of the non-refresh frame periods among the plurality of pixel circuits, the bias voltage is applied to the driving transistor during the bias period from the predetermined time point to the end time point.

Effects of the Disclosure

According to the above several embodiments of the disclosure, in a display device provided with a plurality of pixel circuits including a display element driven by a current, a driving transistor, a write control switching element, and a holding capacitor, and having at least two operation modes including a low refresh mode and a high refresh mode, each pixel circuit further includes a bias application circuit for applying, to the driving transistor, a bias voltage for reducing an influence of a hysteresis characteristic of the driving transistor on luminance of the display element. Furthermore, each pixel circuit is configured to be able to apply the bias voltage from the bias application circuit to the driving transistor simultaneously or concurrently in the each pixel circuit when a voltage of a data signal line corresponding to the each pixel circuit is written as a data voltage to a holding capacitor of another pixel circuit. For example, in a case where a bias voltage line for supplying the bias voltage to a display portion or an initialization voltage line for supplying an initialization voltage for initializing the display element is provided, the bias application circuit in each pixel circuit is connected to the bias voltage line or the initialization voltage line, so that the bias voltage can be applied to the driving transistor in the each pixel circuit simultaneously with writing of the data voltage to the holding capacitor of the another pixel circuit. Alternatively, instead of this, for each data signal line, a multiplexer configured to output a data signal to be applied to the data signal line and the bias voltage, to the data signal line in a time division manner is provided, and the bias application circuit is constituted by the write control switching element in the pixel circuit, so that the bias voltage can be applied concurrently (in a time division manner) from the data signal line to the driving transistor in the pixel circuit when the data voltage is written to the holding capacitor of the another pixel circuit.

In the display device configured as described above, when operating in a low refresh mode in which there alternately appear one or a plurality of refresh frame periods in which a plurality of data voltages based on image data input from the outside are written in the plurality of pixel circuits and one or a plurality of non-refresh frame periods in which writing of the plurality of data voltages to the plurality of pixel circuits is stopped, in a case where new image data is input from the outside during any one of the non-refresh frame periods, a new refresh frame period is started at a predetermined time point before an end time point of the any one of the non-refresh frame periods, and a plurality of data voltages based on the new image data is written in the plurality of pixel circuits, respectively, while in a pixel circuit in which the bias voltage is yet not applied to a driving transistor during the any one of the non-refresh frame periods among the plurality of pixel circuits, the bias voltage is applied to the driving transistor during a predetermined bias period from the predetermined time point to the end time point.

According to the above several embodiments of the disclosure, when new image data for moving image display is input while a still image is displayed in the low refresh mode, it is possible to quickly switch the operation mode from the low refresh mode to the high refresh mode while suppressing occurrence of flicker by the application of the bias voltage, and to suppress a delay in switching from the still image display at the low refresh rate to the moving image display at the high refresh rate.

DESCRIPTION OF EMBODIMENTS

In the following, embodiments will be described with reference to the accompanying drawings. In each transistor mentioned below, a gate terminal corresponds to a control terminal, one of a drain terminal and a source terminal corresponds to a first conductive terminal, and the other corresponds to a second conductive terminal. In addition, although the transistor in each of the following embodiments is, for example, a thin film transistor, the disclosure is not limited thereto. Furthermore, "connection" in the present specification means "electrical connection" unless otherwise specified, and includes not only a case of meaning direct connection but also a case of meaning indirect connection via another element within the scope not departing from the gist of the disclosure.

1. First Embodiment

<1.1 Overall Configuration>

Figure 1:
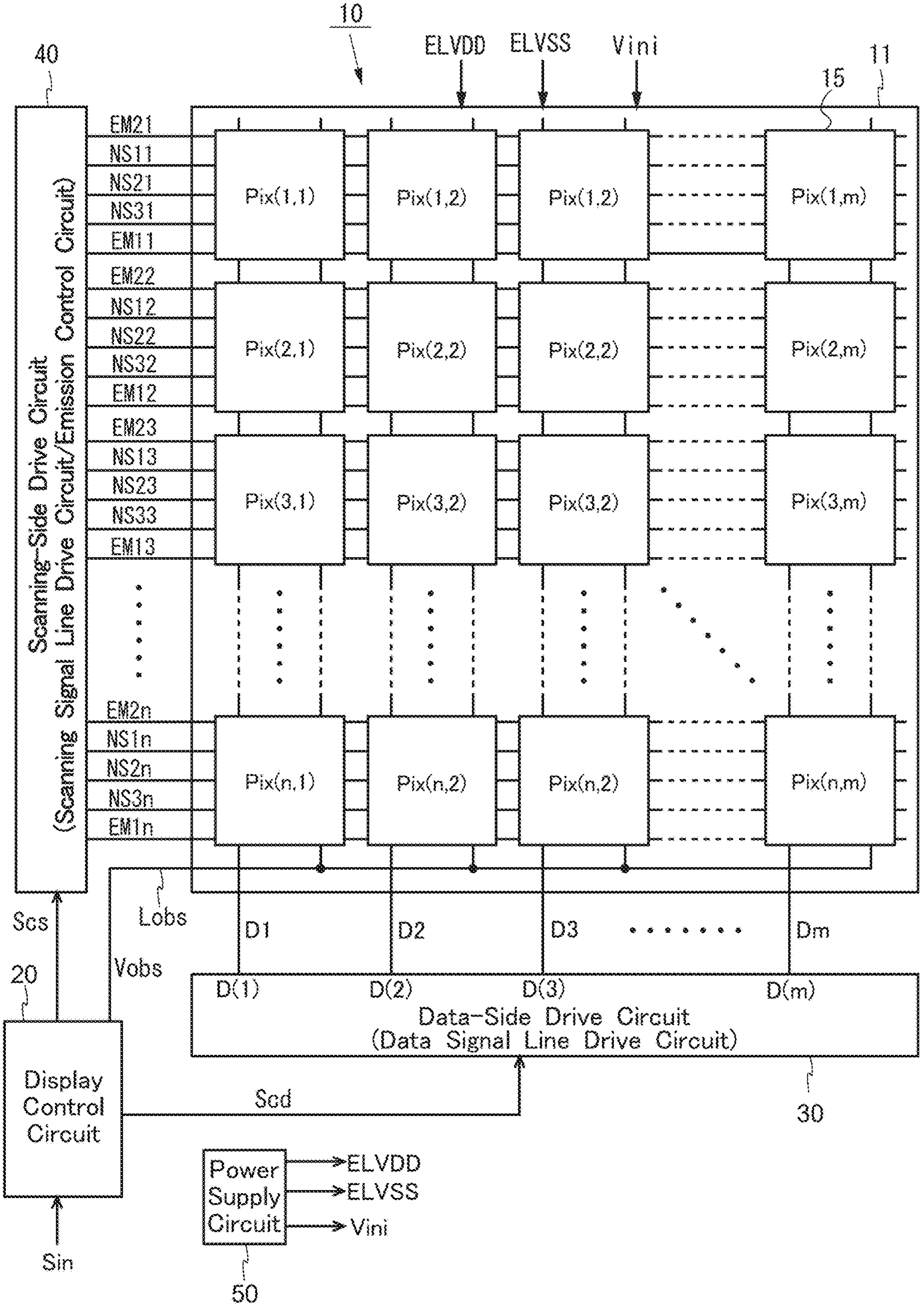
FIG. 1 is a block diagram illustrating an overall configuration of a display device according to a first embodiment.

FIG. 1 is a block diagram illustrating an overall configuration of a display device 10 according to a first embodiment. The display device 10 is an organic EL display device that performs internal compensation. Specifically, in the display device 10, each pixel circuit 15 has a function of compensating for variation and shift in a threshold voltage of a driving transistor therein. In addition, the display device adopts a variable refresh rate system (VRR system), and can change a refresh rate by appropriately inserting a non-refresh frame period between adjacent refresh frame periods according to contents to be displayed (e.g., a still image or a moving image).

In the following, the display device 10 is configured to switch a refresh rate between a low refresh rate for displaying a still image and a high refresh rate for displaying a moving image. It is assumed that at the high refresh rate, only the refresh frame period (RF frame period) continues, and the non-refresh frame period (NRF frame period) is not inserted. Note that the disclosure is not limited thereto, and the display device 10 may be configured to switch between three or more refresh rates according to an image to be displayed. In the following description, an operation mode corresponding to the refresh rate is introduced. Specifically, the display device is assumed to have at least two operation modes including a low refresh mode in which display operation is performed at a low refresh rate and a high refresh mode in which display operation is performed in a high refresh mode.

As illustrated in FIG. 1, the display device 10 includes a display portion 11, a display control circuit 20, a data-side drive circuit 30, a scanning-side drive circuit 40, and a power supply circuit 50. The data-side drive circuit 30 functions as a data signal line drive circuit (also referred to as a "data driver"). The scanning-side drive circuit 40 functions as a scanning signal line drive circuit (also referred to as a "gate driver") and a light emission control circuit (also referred to as an "emission driver"). In the configuration illustrated in FIG. 1, although two circuits on a scanning-side are implemented as one scanning-side drive circuit 40, the two circuits may be appropriately separated, or the two circuits may be separately arranged on one side and the other side of the display portion 11. In addition, at least a part of the data-side drive circuit and the scanning-side drive circuit may be integrally formed with the display portion 11. The same applies to other embodiments and variants to be described later. The power supply circuit 50 generates a high level power supply voltage ELVDD, a low level power supply voltage ELVSS, and an initialization voltage Vini, which are to be described later and to be supplied to the display portion 11, and a power supply voltage (not illustrated) to be supplied to the display control circuit 20, the data-side drive circuit 30, and the scanning-side drive circuit 40.

In the display portion 11, there are disposed m (m is an integer of two or more) data signal lines D1, D2, . . . , and Dm, n (n is an integer of two or more) first scanning signal lines NS11, N12, and NS1*n*, *n* second scanning signal lines NS21, NS22, and NS2*n*, and n third scanning signal lines NS31, NS32, and NS3*n* intersecting these data lines. In addition, n first light emission control lines (first emission lines) EM11 to EM1*n* are disposed along the n first scanning signal lines NS11 to NS1*n*, respectively, and n second light emission control lines (second emission lines) EM21 to EM2*n* are further disposed along the n first scanning signal lines NS11 to NS1*n*, respectively.

In addition, the display portion 11 is provided with m×n pixel circuits 15 arranged in a matrix along the m data signal lines D1 to Dm and the n first scanning signal lines NS11 to NS1*n*. Each pixel circuit 15 corresponds to one of the m data signal lines D1 to Dm and corresponds to one of the n first scanning signal lines NS11 to NS1*n* (hereinafter, in a case of distinguishing each pixel circuit 15 from another, a pixel circuit corresponding to the i-th first scanning signal line NS1*i* and the j-th data signal line Dj is referred to as "pixel circuit of the i-th row and the j-th column", and is indicated by a reference sign "Pix(i, j)"). Each pixel circuit 15 also corresponds to one of the n second scanning signal lines NS21 to NS2*n*, corresponds to one of the n third scanning signal lines NS31 to NS3*n*, corresponds to one of the n first light emission control lines EM11 to EM1*n*, and corresponds to one of the n second light emission control lines EM21 to EM2*n*.

In the display portion 11, power supply lines (not illustrated) common to each pixel circuits 15 are disposed. Specifically, there are disposed a first power supply line (hereinafter, referred to as a "high level power supply line", and indicated by a reference sign "ELVDD" similarly to the high level power supply voltage) as a fixed voltage line for supplying the high level power supply voltage ELVDD for driving an organic EL element to be described later, and a second power supply line (hereinafter, referred to as a "low level power supply line", and indicated by a reference sign "ELVSS" similarly to the low level power supply voltage) as a fixed voltage line for supplying the low level power supply voltage ELVSS for driving the organic EL element. Furthermore, in the display portion 11, there are disposed an initialization voltage line Lini as a fixed voltage line (not illustrated) for supplying the initialization voltage Vini for use in reset operation (also referred to as "initialization operation") for initializing each pixel circuit 15, and an on-bias voltage line Lobs for supplying an on-bias voltage Vobs to each pixel circuit 15. The high level power supply voltage ELVDD, the low level power supply voltage ELVSS, and the initialization voltage *Vini* are supplied from the power supply circuit 50. Although in the present embodiment, the on-bias voltage Vobs is supplied from the display control circuit 20, it may be supplied from the power supply circuit 50.

The display control circuit 20 receives an input signal Sin including image information representing an image to be displayed and timing control information for image display from the outside of the display device 10, generates a data-side control signal Scd and a scanning-side control signal Scs based on the input signal Sin, and outputs the data-side control signal Scd to the data-side drive circuit 30 and the scanning-side control signal Scs to the scanning-side drive circuit 40. Note that, in the following, it is assumed that the display control circuit 20 controls the data-side drive circuit 30 and the scanning-side drive circuit 40 so as to operate in the high refresh mode when new image data is input as image information in the input signal Sin, and then switch the operation mode to the low refresh mode when a state in which no new image data is input continues for a predetermined time or more. However, instead of or in addition to this, an operation mode signal Sm indicating which operation mode of the low refresh mode and the high refresh mode is used to drive the display portion 11 may be included in the input signal Sin, and the display control circuit 20 may control the data-side drive circuit 30 and the scanning-side drive circuit 40 such that the display portion 11 is driven in an operation mode indicated by the operation mode signal Sm.

The data-side drive circuit 30 drives the data signal lines D1 to Dm based on the data-side control signal Scd from the display control circuit 20. Specifically, the data-side drive circuit 30 generates m data signals D(1) to D(m) representing images to be displayed and applies the data signals D(1) to D(m) to the data signal lines D1 to Dm, respectively, based on the data-side control signal Scd.

The scanning-side drive circuit 40 selectively drives control scanning lines including the first scanning signal lines NS11 to NS1*n*, the second scanning signal lines NS21 to NS2*n*, the third scanning signal lines NS31 to NS3*n*, the first light emission control lines EM11 to EM1*n*, and the second light emission control lines EM21 to EM2*n*, thereby controlling the m×n pixel circuits 15 in the display portion 11 (in more detail, each transistor functioning as a switching element in each pixel circuit 15 is controlled). For this purpose, based on the scanning-side control signal Scs from the display control circuit 20, the scanning-side drive circuit 40 generates and applies first scanning signals NS1(1) to NS1(*n*) to the first scanning signal lines NS11 to NS1*n*, respectively, generates and applies second scanning signals NS2(1) to NS2(*n*) to the second scanning signal lines NS21 to NS2*n*, respectively, generates and applies third scanning signals NS3(1) to NS3(*n*) to the third scanning signal lines NS31 to NS3*n*, respectively, generates and applies first light emission control signals EM1(1) to EM1(*n*) to the first light emission control lines EM11 to EM1*n*, respectively, and generates and applies second light emission control signals EM2(1) to EM2(*n*) to the second light emission control lines EM21 to EM2*n*, respectively. As a result, the scanning-side drive circuit 40 functions as a scanning signal line drive circuit that drives the first scanning signal lines NS11 to NS1*n*, the second scanning signal lines NS21 to NS2*n*, and the third scanning signal lines NS31 to NS3*n*, and also functions as a light emission control circuit that drives the first light emission control lines EM11 to EM1*n* and the second light emission control lines EM21 to EM2*n*.

Figure 10:
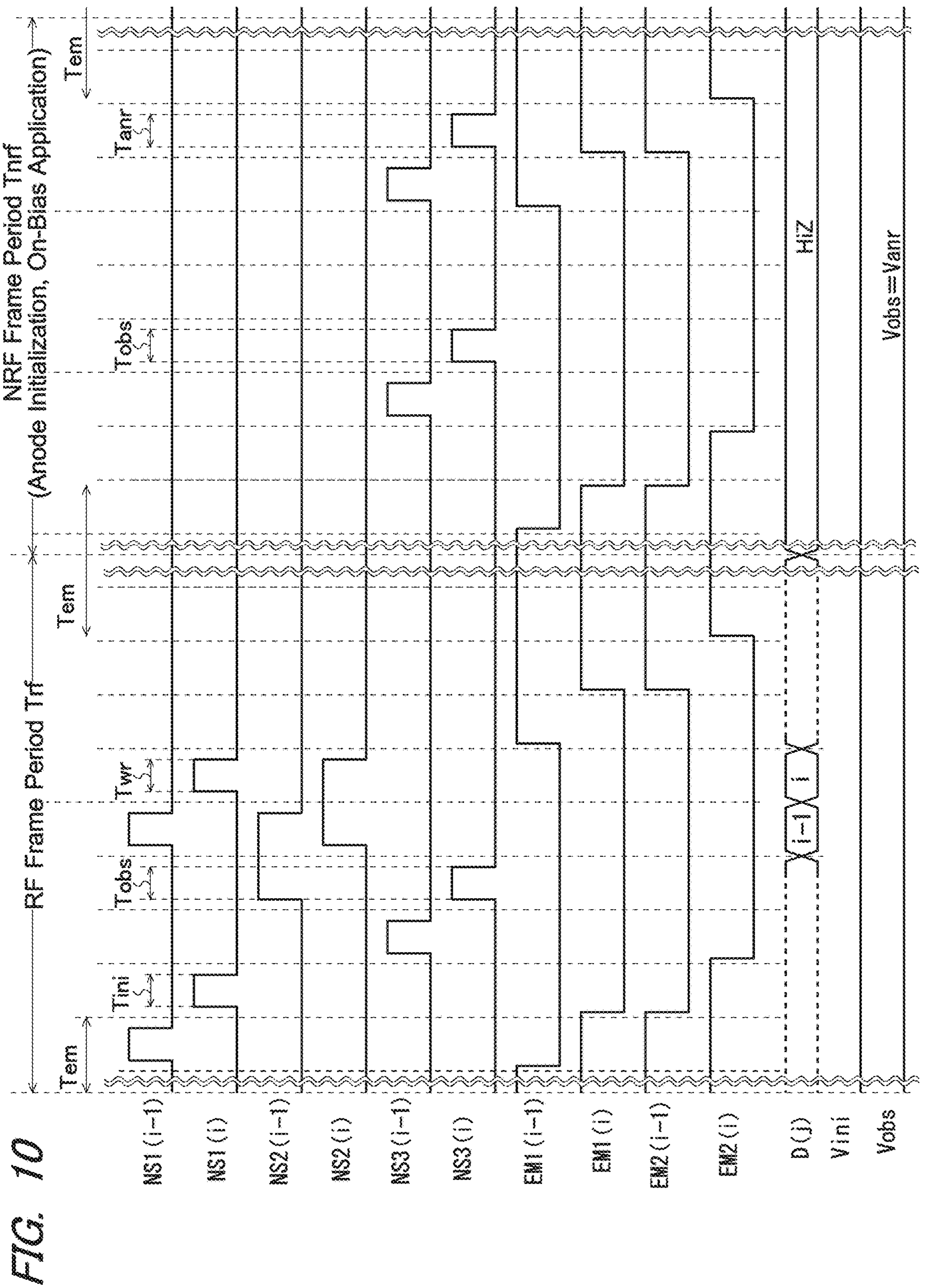
FIG. 10 is a timing chart for describing a first drive example of the pixel circuit in the first embodiment.

More specifically, in a refresh frame period Trf, as the scanning signal line drive circuit, the scanning-side drive circuit 40 sequentially selects the n first scanning signal lines NS11 to NS1*n* each for a predetermined period corresponding to one horizontal period, sequentially selects the n second scanning signal lines NS21 to NS2*n* each for a predetermined period corresponding to one horizontal period, and sequentially selects the n third scanning signal lines NS31 to NS3*n* each for a predetermined period corresponding to one horizontal period by the first scanning signals NS1(1) to NS1(*n*), the second scanning signals NS2(1) to NS2(*n*), and the third scanning signals NS3(1) to NS3(*n*) generated based on the scanning-side control signal Scs (details of selection timings thereof will be described later with reference to FIG. 10). As a result, m pixel circuits Pix(k, 1) to Pix(k, m) corresponding to a selected first scanning signal line NS1*k* are collectively selected. Then, when a second scanning signal line NS2*k* is selected together with the first scanning signal line NS1*k*, voltages (hereinafter, these voltages may be simply referred to as "data voltage" without distinction) of the m data signals D(1) to D(m) applied from the data-side drive circuit 30 to the data signal lines D1 to Dm are written as pixel data into the pixel circuits Pix(k, 1) to Pix(k, m), respectively. Furthermore, when a third scanning signal NS3*k* is selected, the on-bias voltage Vobs is applied to (a source terminal of) the driving transistor included in each of the pixel circuits Pix(k, 1) to Pix(k, m).

In addition, in the RF frame period Trf, the scanning-side drive circuit 40 drives the first light emission control lines EM11 to EM1*n* and the second light emission control lines EM21 to EM2*n* such that they are selectively deactivated in conjunction with the driving of the first scanning signal lines NS11 to NS1*n*, the second scanning signal lines NS21 to NS2*n*, and the third scanning signal lines NS31 to NS3*n*. Specifically, as the light emission control circuit, the scanning-side drive circuit 40 sets an i-th first light emission control line EM1*i* to an inactive state for a predetermined period including an i-th horizontal period and sets the same to an active state for the remaining period, and sets an i-th second light emission control line EM2*i* to the inactive state for a predetermined period including the i-th horizontal period and sets the same to the active state for the remaining period (i is an integer satisfying 1≤i≤n) by the first light emission control signals EM1(1) to EM1(*n*) and the second light emission control signals EM2(1) to EM2(*n*) generated based on the scanning-side control signal Scs. The period during which the i-th first light emission control line EM1*i* is in the active state is slightly different from the period during which the i-th second light emission control line EM2*i* is in the active state (see FIG. 10 to be described later for details). While both the i-th first light emission control line EM1*i* and second light emission control line EM2*i* are in the active state, organic EL elements in pixel circuits Pix(i, 1) to Pix(i, m) corresponding to the i-th first scanning signal line NS1*i* (also referred to as "pixel circuits in an i-th row") emit light with luminance corresponding to the data voltages respectively written in the pixel circuits (i, 1) to Pix(i, m) in the i-th row.

On the other hand, in an NRF frame period Tnrf, the scanning-side drive circuit 40 stops driving the first scanning signal lines NS11 to NS1*n* and the second scanning signal lines NS21 to NS2*n*, but drives the third scanning signal lines NS31 to NS3*n*, the first light emission control lines EM11 to EM1*n*, and the second light emission control lines EM21 to EM2*n* similarly to the refresh frame period Trf (see FIG. 10 to be described later).

<1.2 Comparative Example>

Figure 2:
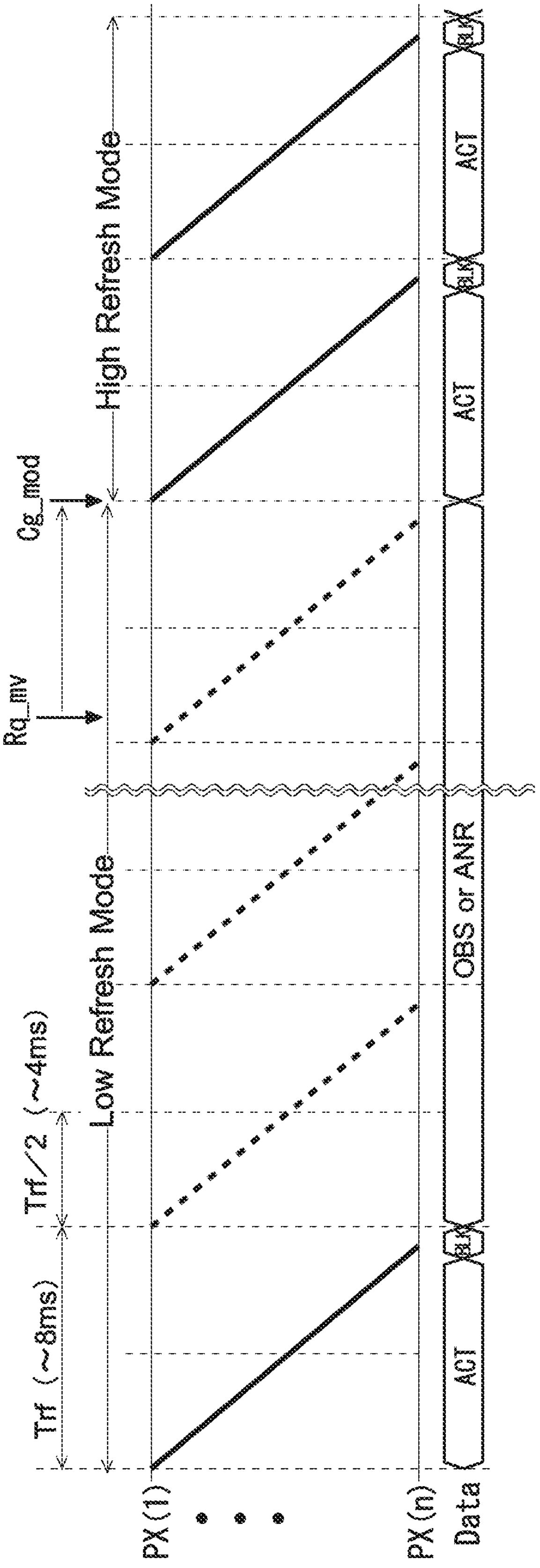
FIG. 2 is a timing chart for describing schematic operation of a display device as a comparative example of a variable refresh rate system.

Before describing operation of the display device 10 according to the present embodiment, schematic operation of a known display device will be described below as a comparative example with reference to FIG. 2. FIG. 2 is a timing chart for describing schematic operation of the display device as a comparative example of a variable refresh rate system (VRR system). In FIG. 2, PX(i) represents pixel circuits Pix(i, 1) to Pix(i, m) in an i-th row (i=1 to n), Data represents data signals D(1) to D(n) collectively, "ACT" represents a signal state for data writing (data voltage), "BLK" represents a signal state of blanking, "OBS" represents a signal state for applying an on-bias (on-bias voltage Vobs), and "ANR" represents a signal state for anode initialization (anode initialization voltage Vanr) of an organic EL element. Furthermore, a bold solid line extending in an oblique direction in a refresh frame period Trf indicates timing at which data writing is performed in the pixel circuits PX(i)=Pix(i, 1) to Pix(i, m) in each row (i=1 to n), and a bold dotted line extending in an oblique direction in a non-refresh frame period Inrf indicates timing at which on-bias application or anode initialization is performed in the pixel circuit PX(i) in each row (i=1 to n).

The example shown in FIG. 2 illustrates operation of the display device in a case where a refresh request Rq_mv for moving image display occurs during operation in a low refresh mode in which the RF frame period Trf is followed by a plurality of NRF frame periods Tnrf. In this example, the refresh request Rq_mv for moving image display occurs in the middle of the NRF frame period Inrf. Note that the operation mode of the display device as the comparative example is switched to a high refresh mode at an end time point (the time point indicated by Cg_mod in FIG. 2) of the NRF frame period Inrf, and the RF frame period Trf starts at the end time point. Thereafter, during the operation in the high refresh mode, the RF frame period Trf continues. As described above, when the refresh request for moving image display occurs in the NRF frame period Inrf in the low refresh mode, the above-described display device as the comparative example cannot immediately shift to the high refresh mode to start the RF frame period Trf. Reasons will be described in the following.

Figure 3:
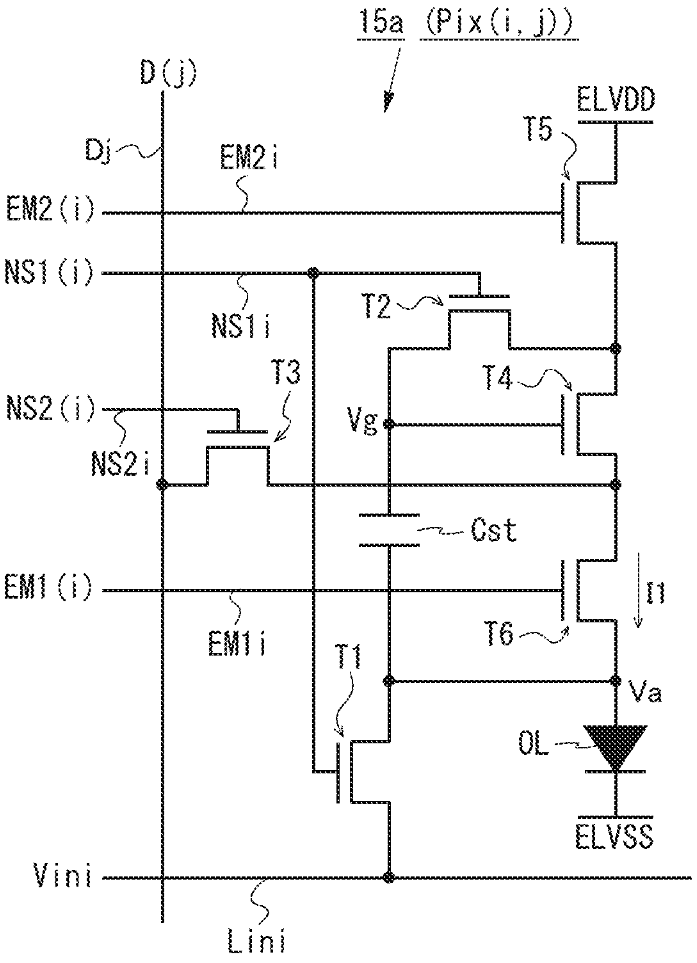
FIG. 3 is a circuit diagram illustrating a configuration of a pixel circuit in the display device as the comparative example of the variable refresh rate system.

FIG. 3 is a circuit diagram illustrating a configuration of a pixel circuit 15*a* in the display device as the comparative example, and in more detail, is a circuit diagram illustrating a configuration of the pixel circuit 15*a* corresponding to an i-th first scanning signal line NS1*i* and a j-th data signal line Dj, i.e., a pixel circuit Pix(i, j) in an i-th row and a j-th column (1≤i≤n, 1≤j≤m). The pixel circuit 15*a* is a pixel circuit of an internal compensation system, and includes one organic EL element OL as a display element, six transistors T1 to T6 (hereinafter, referred to as an "initialization transistor T1", a "threshold compensation transistor T2", a "write control transistor T3", a "driving transistor T4", a "second light emission control transistor T5", and a "first light emission control transistor T6", respectively), and a holding capacitor Cst as illustrated in FIG. 3.

In the pixel circuit 15*a*, the transistors T1 to T6 are N-channel transistors. As the N-channel transistors T1 to T6, thin film transistors in which a channel layer is formed of an oxide semiconductor (hereinafter referred to as "oxide TFT") are used. As the oxide TFT, a thin film transistor (hereinafter referred to as "IGZO-TFT") containing indium gallium zinc oxide (InGaZnO) can be used. Note that the transistors T1 to T3, T5, and T6 other than the driving transistor T4 operate as switching elements.

As shown in FIG. 3, there are connected to the pixel circuit Pix(i, j) in the above-described comparative example, a first scanning signal line NS1*i* corresponding to the pixel circuit (which is hereinafter also referred to as "corresponding first scanning signal line" in the description focusing on a pixel circuit), a second scanning signal line NS2*i* corresponding to the pixel circuit (which is hereinafter also referred to as "corresponding second scanning signal line" in the description focusing on the pixel circuit), a third scanning signal line NS3*i* corresponding to the pixel circuit (which is hereinafter also referred to as "corresponding third scanning signal line" in the description focusing on the pixel circuit), a first light emission control line EM1*i* corresponding to the pixel circuit (which is hereinafter also referred to as "corresponding first light emission control line" in the description focusing on the pixel circuit), a second light emission control line EM2*i* corresponding to the pixel circuit (hereinafter, also referred to as "corresponding second light emission control line" in the description focusing on the pixel circuit), a data signal line Dj corresponding to the pixel circuit (which is hereinafter also referred to as "corresponding data signal line" in the description focusing on the pixel circuit), an initialization voltage line Lini, a high level power supply line ELVDD, and a low level power supply line ELVSS. Note that, in the above-described comparative example, the unlike above-described first embodiment illustrated in FIG. 1, the on-bias voltage Vobs is supplied to each pixel circuit Pix(i, j) via the data signal line Dj, and the on-bias voltage line Lobs for supplying the on-bias voltage Vobs is not provided in the display portion 11.

As shown in FIG. 3, in the pixel circuit Pix(i, j) in the above comparative example, a drain terminal as a first conductive terminal of the driving transistor T4 is connected to the high level power supply line ELVDD via the second light emission control transistor T5. A source terminal as a second conductive terminal of the driving transistor T4 is connected to an anode electrode as a first terminal of the organic EL element OL via the first light emission control transistor T6, and is connected to the corresponding data signal line Dj via the write control transistor T3. A gate terminal as a control terminal of the driving transistor T4 is connected to the first terminal of the organic EL element OL via the holding capacitor Cst, and is connected to the drain terminal of the driving transistor via the threshold compensation transistor T2. In addition, the anode electrode of the organic EL element OL is also connected to the initialization voltage line Lini via the initialization transistor T1, and a cathode electrode as a second terminal of the organic EL element OL is connected to the low level power supply line ELVSS. Gate terminals of the initialization transistor T1 and the threshold compensation transistor T2 are both connected to the corresponding first scanning signal line NS1*i*, a gate terminal of the write control transistor T3 is connected to the corresponding second scanning signal line NS2*i*, a gate terminal of the first light emission control transistor T6 is connected to the corresponding first light emission control line EM1*i*, and a gate terminal of the second light emission control transistor T5 is connected to the corresponding second light emission control line EM2*i*.

Figure 4:
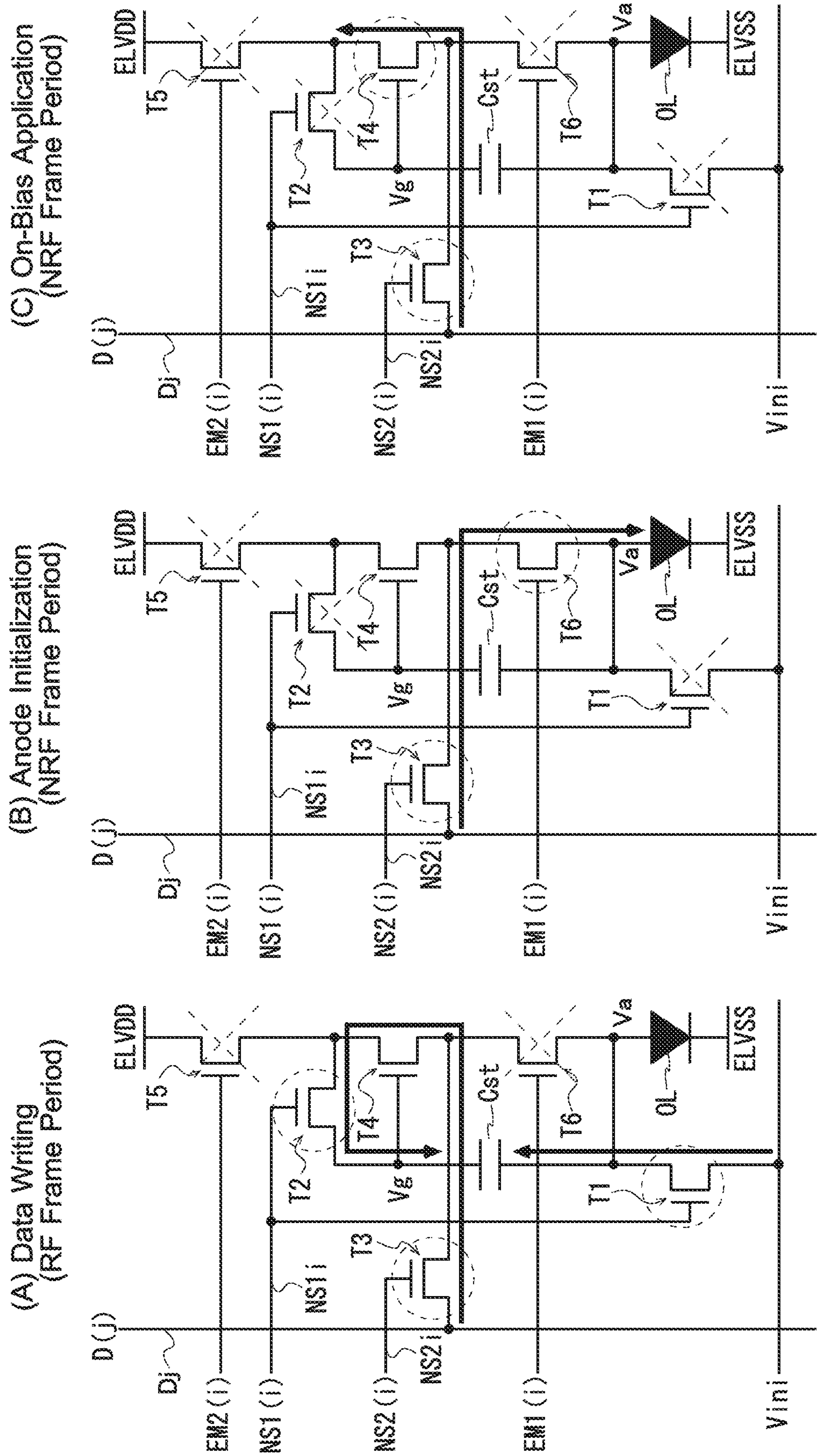
FIG. 4 provides circuit diagrams (A), (B), and (C) for describing data writing operation, anode initialization operation, and on-bias application operation of the pixel circuit in the comparative example.

Next, operation of the pixel circuit 15*a* illustrated in FIG. 3, i.e., the pixel circuit Pix(i, j) in the i-th row and the j-th column in the comparative example will be described with reference to FIG. 3 and FIG. 4. Note that only operation related to change of a refresh rate will be described here. In FIG. 4, a dotted circle represents that a transistor therein is in ON state, and a dotted cross represents that a transistor to which the dotted circle is attached is in OFF state. Such an expression manner is also adopted in FIGS. 8, 9, 18, 20, 24, 25, and 28.

(A) of FIG. 4 illustrates a circuit state in a data write period Twr(i) in which a voltage of the corresponding data signal line Dj (a voltage of the data signal D(j)) is written as a data voltage to the pixel circuit Pix(i, j) in the RF frame period. During this data write period Twr(i), the write control transistor T3, the threshold compensation transistor T2, and the initialization transistor T1 are in ON state, and the first light emission control transistor T6 and the second light emission control transistor T5 are in OFF state. As a result, the voltage of the corresponding data signal line Dj is written as a data voltage Vdata into the holding capacitor Cst via the driving transistor T4 that is brought into a diode connected state by the threshold compensation transistor T2 in ON state, and a voltage corresponding to a difference Vdata-*Vini* between the data voltage Vdata and an initialization voltage (to be precise, a voltage Vdata+Vth-Vini corresponding to a difference between a data voltage subjected to the threshold compensation and the initialization voltage) is held in the holding capacitor Cst.

(B) of FIG. 4 illustrates a circuit state in an anode initialization period (also referred to as "anode reset period" or "display element initialization period") Tanr(i) in which the anode electrode of the organic EL element OL in the pixel circuit Pix(i, j) is initialized in the NRF frame period. During the anode initialization period Tanr(i), the write control transistor T3 and the first light emission control transistor T6 are in ON state, and the second light emission control transistor T5, the threshold compensation transistor T2, and the initialization transistor T1 are in OFF state. As a result, the voltage of the corresponding data signal line Dj is applied to the anode electrode of the organic EL element OL via the write control transistor T3 and the first light emission control transistor T6 as the anode initialization voltage Vanr to initialize a voltage Va of the anode electrode (hereinafter referred to as "anode voltage") of the organic EL element OL. As a result, an influence of a past display history on light emitting operation of the organic EL element OL is blocked.

(C) of FIG. 4 illustrates a circuit state in an on-bias period Tobs (i) in which the on-bias voltage Vobs is applied to the source terminal of the driving transistor T4 in the pixel circuit Pix(i, j) in the NRF frame period. During the on-bias period Tobs (i), the write control transistor T3 is in ON state, and the first light emission control transistor T6, the second light emission control transistor T5, the threshold compensation transistor T2, and the initialization transistor T1 are in OFF state. As a result, the voltage of the corresponding data signal line Dj is applied as the on-bias voltage Vobs to the source terminal of the driving transistor T4 via the write control transistor T3. This reduces an influence of a hysteresis characteristic of the driving transistor T4 on display luminance.

Figure 5:
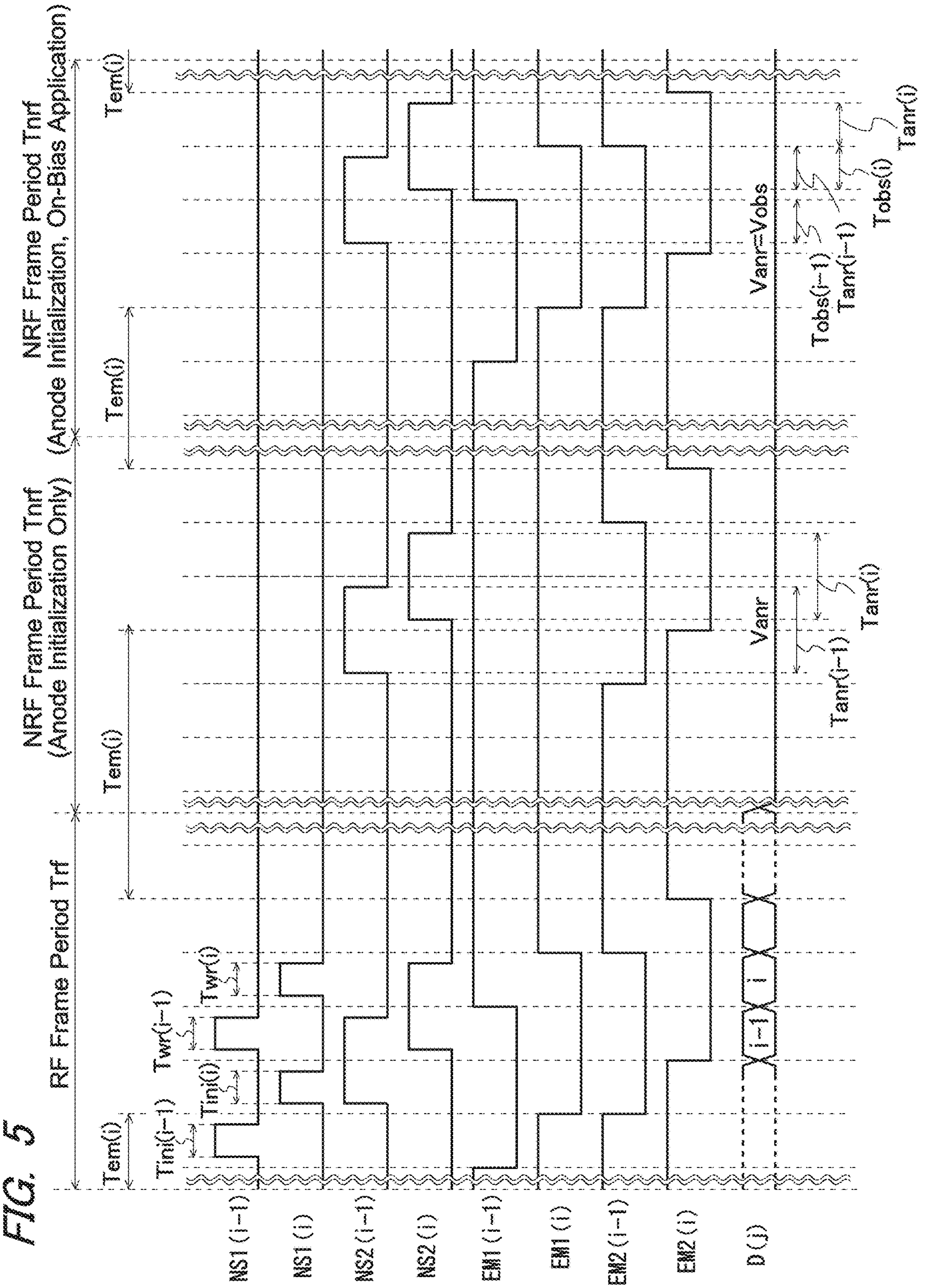
FIG. 5 is a timing chart for describing driving of the pixel circuit in the comparative example.

FIG. 5 is a timing chart illustrating changes in the drive signals for operating each pixel circuit Pix(i, j) as illustrated in FIG. 4, i.e., changes in first scanning signals NS1(*i*) and NS1(*i*-1), second scanning signals NS2(*i*) and NS2(*i*-1), first light emission control signals EM1(*i*) and EM1(*i*-1), second light emission control signals EM2(*i*) and EM2(*i*-1), and the data signal D(j). In FIG. 5, a reference sign "Tini (k)" indicates a data initialization period of a pixel circuit PX(k) =Pix(k, 1) to Pix(k, m) in a k-th row, a reference sign "Twr(k)" indicates a data write period of the pixel circuit PX(k) in the k-th row, a reference sign "Tanr(k)" indicates an anode initialization period of the pixel circuit PX(k) in the k-th row, and a reference sign "Tem(k)" indicates a light emission period of the pixel circuit PX(k) in the k-th row.

In the RF frame period Trf, first scanning signal lines NS11 to NS1*n*, second scanning signal lines NS21 to NS2*n*, first light emission control lines EM11 to EM1*n*, and second light emission control lines EM21 to EM2*n* are selectively driven by the changes of the drive signals as illustrated in FIG. 5, and data voltages to be written in the pixel circuits Pix(i, 1) to Pix(i, m) are applied to data signal lines D1 to Dm (i=1 to n), respectively. By such drive signals, the holding capacitor Cst in the pixel circuit Pix(i, j) is initialized (data initialization) in a data initialization period Tini (i) included in the RF frame period Trf, and the voltage of the data signal D(j) is written as the data voltage Vdata to the pixel circuit Pix(i, j) in the data write period Twr(i) included in the RF frame period Trf (see (A) of FIG. 4).

In the NRF frame period Inrf in which only the anode initialization is performed, as shown in FIG. 5, while the driving of the first scanning signal lines NS11 to NS1*n* and the first light emission control lines EM11 to EM1*n* is stopped, the driving of the second scanning signal lines NS21 to NS2*n* and the second light emission control lines EM21 to EM2*n* is continued, and the anode initialization voltage Vanr is applied to the data signal lines D1 to Dm. As a result, the anode voltage Va of the organic EL element OL in the pixel circuit Pix(i, j) is initialized in the anode initialization period Tanr(i) (see (B) of FIG. 4).

In the NRF frame period Inrf in which the anode initialization and the on-bias application are performed, as illustrated in FIG. 5, while the driving of the first scanning signal lines NS11 to NS1*n* is stopped, the second scanning signal lines NS21 to NS2*n*, the first light emission control lines EM11 to EM1*n*, and the second light emission control lines EM21 to EM2*n* are selectively driven, and the anode initialization voltage Vanr and the on-bias voltage Vobs are applied to the data signal lines D1 to Dm as the same voltage. As a result, the voltage of the data signal D(j) is applied as the on-bias voltage Vobs to the source terminal of the driving transistor T4 in the pixel circuit Pix(i, j) in the on-bias period Tobs (i) (see (C) of FIG. 4), and the anode voltage Va of the organic EL element OL in the pixel circuit Pix(i, j) is initialized in the anode initialization period Tanr(i) (see (B) of FIG. 4).

Next, problems in a case where the refresh request Rq_mv for moving image display occurs in the middle of the NRF frame period Inrf in the low refresh mode in the display device as the comparative example as described above will be described with reference to FIG. 6. Here, an operation example is assumed in which, in a case where the refresh request Rq_mv for moving image display occurs in the middle of the NRF frame period Tnrf as described above, the mode shifts to the high refresh mode before a time point (a time point indicated by Cg_mod) before the end of the NRF frame period Inrf without waiting for the end thereof, and the RF frame period Trf starts at the time point as illustrated in FIG. 6.

Figure 6:
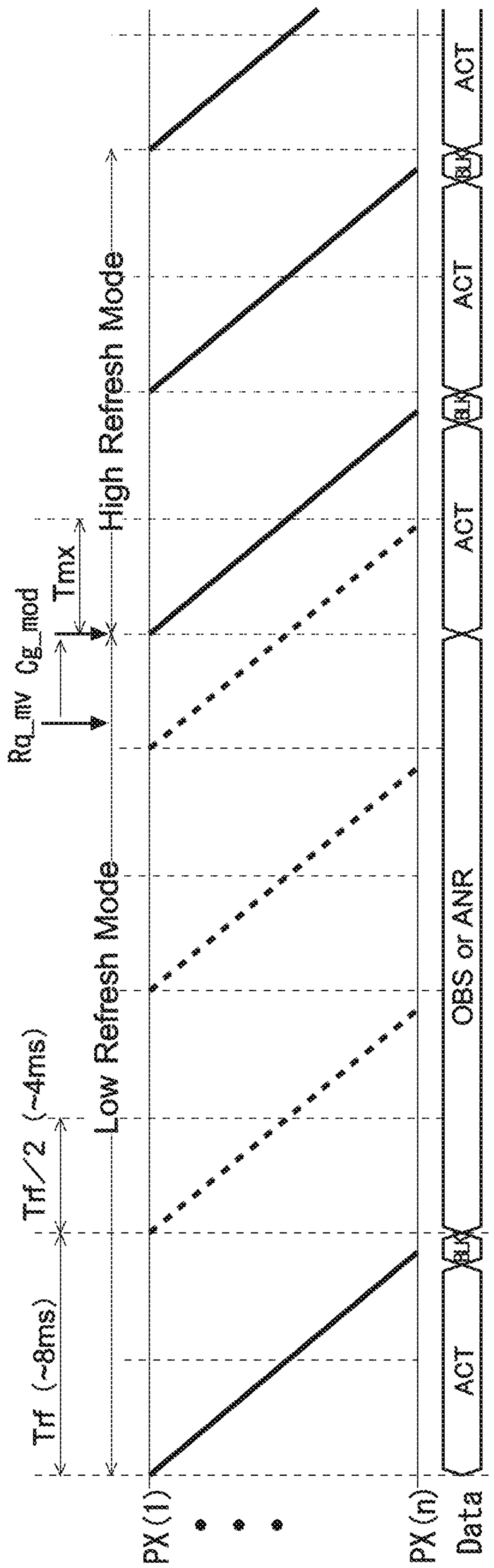
FIG. 6 is a timing chart for describing a problem of the display device according to the comparative example.

In such an operation example, as illustrated in FIG. 6, in a period Tmx from when the mode is switched to the high refresh mode in the middle of the NRF frame period Inrf to the end time point of the NRF frame period Inrf, it is necessary to perform the anode initialization and the data writing concurrently. In other words, in this period Tmx, in pixel circuits Pix(1, j) to Pix(n, j) in the same column, a pixel circuit Pix(i1, j) to which data is written and a pixel circuit Pix(i2, j) in which anode initialization or on-bias application is performed need to be mixed (1≤i1≤i2≤n). Note that as illustrated in FIGS. 4 and 5, all of the anode initialization voltage Vanr, the on-bias voltage Vobs, and the data voltage Vdata are applied to the pixel circuit Pix(i, j) in the comparative example via the data signal line Dj. Therefore, in the pixel circuits Pix(1, j) to Pix(n, j) connected to the same data signal line Dj, i.e, the pixel circuits Pix(1, j) to Pix(n, j) in the same column, the pixel circuit Pix(i1, j) to which data is written and the pixel circuit Pix(i2, j) in which the anode initialization or the on-bias application is performed cannot be mixed. Therefore, the display device according to the comparative example cannot shift to the high refresh mode in the middle of the NRF frame period Inrf as illustrated in FIG. 6, and is switched to the high refresh mode at the end time point of the NRF frame period Tnrf as illustrated in FIG. 2.

As described above, in the display device according to the comparative example, even when the refresh request Rq_mv for moving image display occurs while a still image is displayed in the low refresh mode, the mode cannot be immediately shifted to the high refresh mode to start the refresh operation. As a result, there is a problem that switching to moving image display in the high refresh mode is delayed when a still image is displayed in the low refresh mode. Therefore, the display device according to the present embodiment is configured to be able to simultaneously perform data writing and anode initialization or on-bias application in the pixel circuits Pix(1, j) to Pix(n, j) in the same column so as to quickly switch to moving image display in the high refresh mode when a still image is displayed in the low refresh mode. In the following, such a pixel circuit in the present embodiment will be described.

<1.3 Configuration and Operation of Pixel Circuit in First Embodiment>

Figure 7:
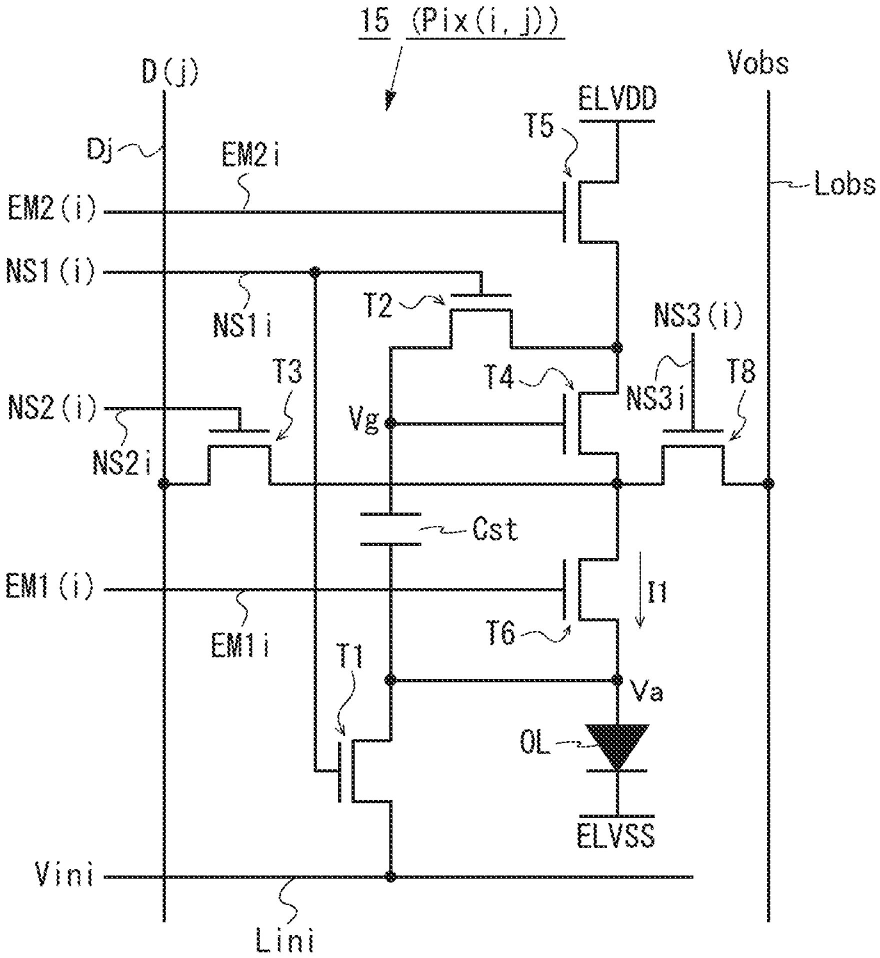
FIG. 7 is a circuit diagram illustrating a configuration of a pixel circuit in the first embodiment.

FIG. 7 is a circuit diagram illustrating a configuration of the pixel circuit 15 in the present embodiment, and in more detail, is a circuit diagram illustrating a configuration of the pixel circuit 15 corresponding to the i-th first scanning signal line NS1*i* and the j-th data signal line Dj, i.e., the pixel circuit Pix(i, j) in the i-th row and the j-th column (1≤i≤n, 1≤j≤m). Similarly to the pixel circuit 15*a* in the comparative example illustrated in FIG. 3, the pixel circuit includes one organic EL element OL as a display element, an initialization transistor T1, a threshold compensation transistor T2, a write control transistor T3, a driving transistor T4, a first light emission control transistor T6, a second light emission control transistor T5, and a holding capacitor Cst. The transistors T1 to T6 are N-channel thin film transistors (in more detail, oxide TFT), and the transistors T1 to T3, T5, and T6 other than the driving transistor T4 operate as switching elements.

As can be seen from comparison of FIG. 7 with FIG. 3, the pixel circuit 15 according to the present embodiment further includes a bias control transistor T8 that is an N-channel thin film transistor (in more detail, an oxide TFT) operating as a switching element, unlike the pixel circuit 15*a* according to the above comparative example.

As illustrated in FIG. 7, similarly to the pixel circuit Pix(i, j) in the comparative example of FIG. 3, there are connected to the pixel circuit Pix(i, j) in the present embodiment, the first scanning signal line NS1*i* corresponding to the pixel circuit (corresponding first scanning signal line), a second scanning signal line NS2*i* corresponding to the pixel circuit (corresponding second scanning signal line), the first light emission control line EM1*i* corresponding to the pixel circuit (corresponding first light emission control line), the second light emission control line EM2*i* corresponding to the pixel circuit (corresponding second light emission control line), the data signal line Dj corresponding to the pixel circuit (corresponding data signal line), the initialization voltage line Lini, the high level power supply line ELVDD, and the low level power supply line ELVSS. In addition, also connected to the pixel circuit Pix(i, j) in the present embodiment are a third scanning signal line NS3*i* corresponding to the pixel circuit (which is hereinafter also referred to as "corresponding third scanning signal line" in the description focusing on the pixel circuit), and the on-bias voltage line Lobs (see FIGS. 1 and 7).

A connection relationship among the components T1 to T6, Cst, and OL in the pixel circuit Pix(i, j) in the present embodiment, and a connection relationship between the signal lines NS1*i*, NS2*i*, EM1*i*, EM2*i*, Dj, the power supply lines ELVDD and ELVSS, and the initialization voltage line Lini that are connected to the pixel circuit Pix(i, j), and the components T1 to T6, Cst, and OL are as illustrated in FIG. 7, and are similar to the connection relationship in the pixel circuit Pix(i, j) in the comparative example (see FIG. 3).

As illustrated in FIG. 7, the bias control transistor T8 as a switching element provided in the pixel circuit 15 in the present embodiment has a first conductive terminal connected to the on-bias voltage line Lobs, a second conductive terminal connected to a source terminal as a second conductive terminal of the driving transistor T4, and a gate terminal as a control terminal connected to the corresponding third scanning signal line NS3*i*. In the present embodiment, the bias control transistor T8 constitutes a bias application circuit for reducing an influence of a hysteresis characteristic of the driving transistor T4 on display luminance.

Next, operation in the pixel circuit 15 illustrated in FIG. 7, i.e., the pixel circuit Pix(i, j) in the i-th row and the j-th column in the present embodiment will be described with reference to FIGS. 8 and 9 together with FIG. 7.

Figure 8:
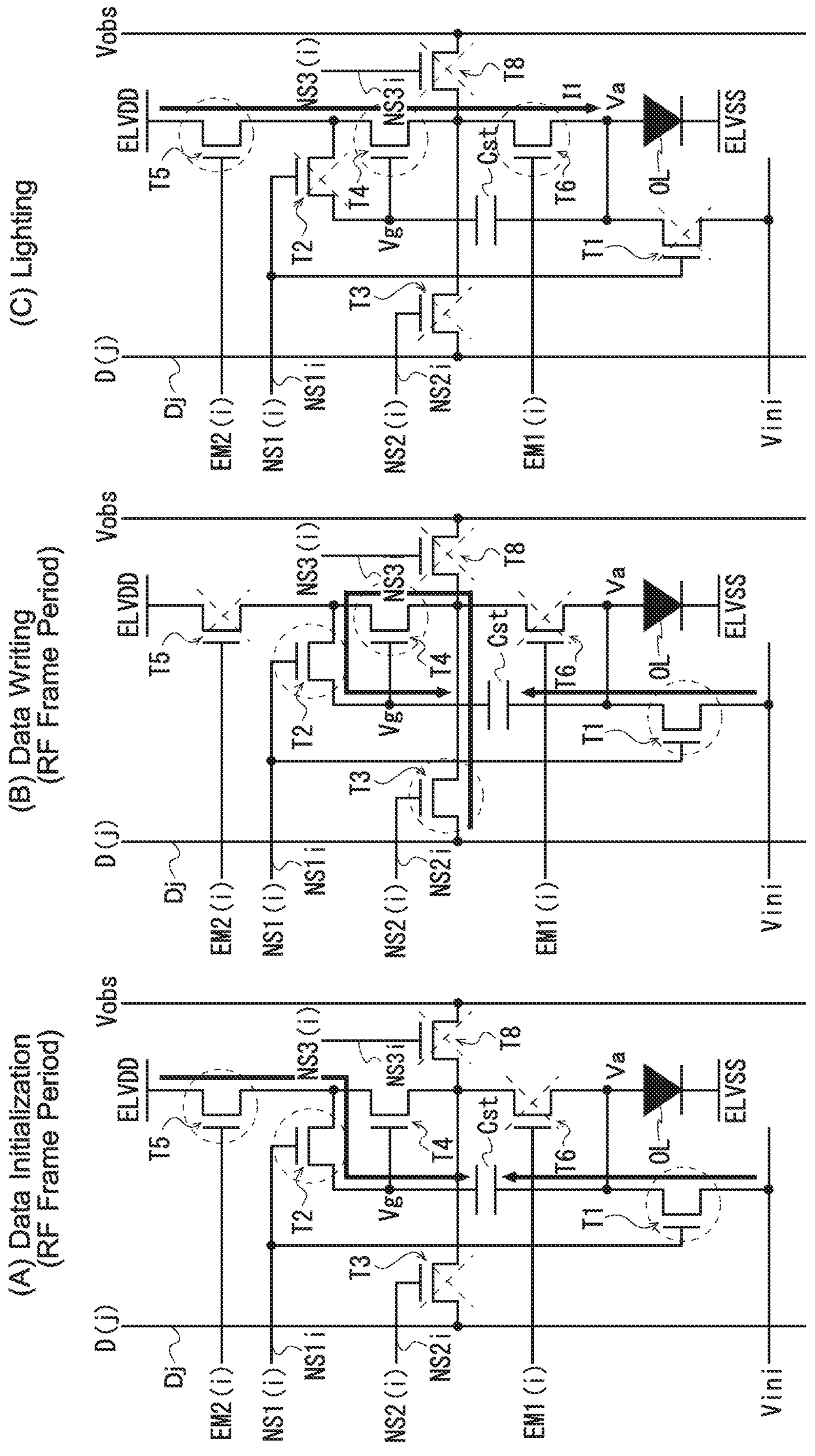
FIG. 8 provides circuit diagrams (A), (B), and (C) for describing data initialization operation, data writing operation, and lighting operation of the pixel circuit in the first embodiment.

(A) of FIG. 8 illustrates a circuit state of the pixel circuit Pix(i, j) in a data initialization period Tini in the RF frame period Trf. The data initialization period Tini is a period for initializing the voltage held in the holding capacitor Cst of the pixel circuit Pix(i, j), and the initialization of the voltage held in the holding capacitor Cst corresponds to initialization of a voltage Vg of the gate terminal of the driving transistor T4. During the data initialization period Tini, the second light emission control transistor T5, the threshold compensation transistor T2, and the initialization transistor T1 are in ON state, and the write control transistor T3, the first light emission control transistor T6, and the bias control transistor T8 are in OFF state. As a result, the holding capacitor Cst is initialized to a voltage ELVDD-Vini, which is a difference between the high level power supply voltage ELVDD and the initialization voltage Vini, and the voltage Vg of the gate terminal (hereinafter referred to as "gate voltage") of the driving transistor T4 is initialized to the high level power supply voltage ELVDD. At this time, a voltage Va of an anode electrode (anode voltage) of the organic EL element OL is also initialized to the initialization voltage *Vini* by the initialization transistor T1 in ON state.

(B) of FIG. 8 illustrates a circuit state of the pixel circuit Pix(i, j) in a data write period Twr in the RF frame period Trf. During the data write period Twr, the write control transistor T3, the threshold compensation transistor T2, and the initialization transistor T1 are in ON state, and the first light emission control transistor T6, the second light emission control transistor T5, and the bias control transistor T8 are in OFF state. As a result, a voltage of the corresponding data signal line Dj is written as data voltage Vdata into the holding capacitor Cst via the driving transistor T4 that is brought into a diode connected state by the threshold compensation transistor T2 in ON state, and a voltage corresponding to a difference Vdata-*Vini* between a data voltage and an initialization voltage (to be precise, a voltage Vdata+Vth-*Vini* corresponding to a difference between a data voltage subjected to the threshold compensation and the initialization voltage) is held in the holding capacitor Cst (Vth>0). In the data write period Twr, the anode voltage Va of the organic EL element OL is also initialized to the initialization voltage *Vini* by the initialization transistor T1 in ON state.

(C) of FIG. 8 illustrates a circuit state of the pixel circuit Pix(i, j) in a light emission period Tem in the RF frame period Trf and the NRF frame period Tnrf. The light emission period Tem is a period in which the organic EL element OL in the pixel circuit Pix(i, j) lights. During the emission period Tem, the first light emission control transistor T6 and the second light emission control transistor T5 are in ON state, and the write control transistor T3, the threshold compensation transistor T2, the initialization transistor T1, and the bias control transistor T8 are in OFF state. As a result, a current I1 of an amount corresponding to a voltage held in the holding capacitor Cst flows from the high level power supply line ELVDD to the low level power supply line ELVSS via the second light emission control transistor T5, the driving transistor T4, the first light emission control transistor T6, and the organic EL element OL, so that the organic EL element OL emits light with luminance corresponding to the current I1.

Figure 9:
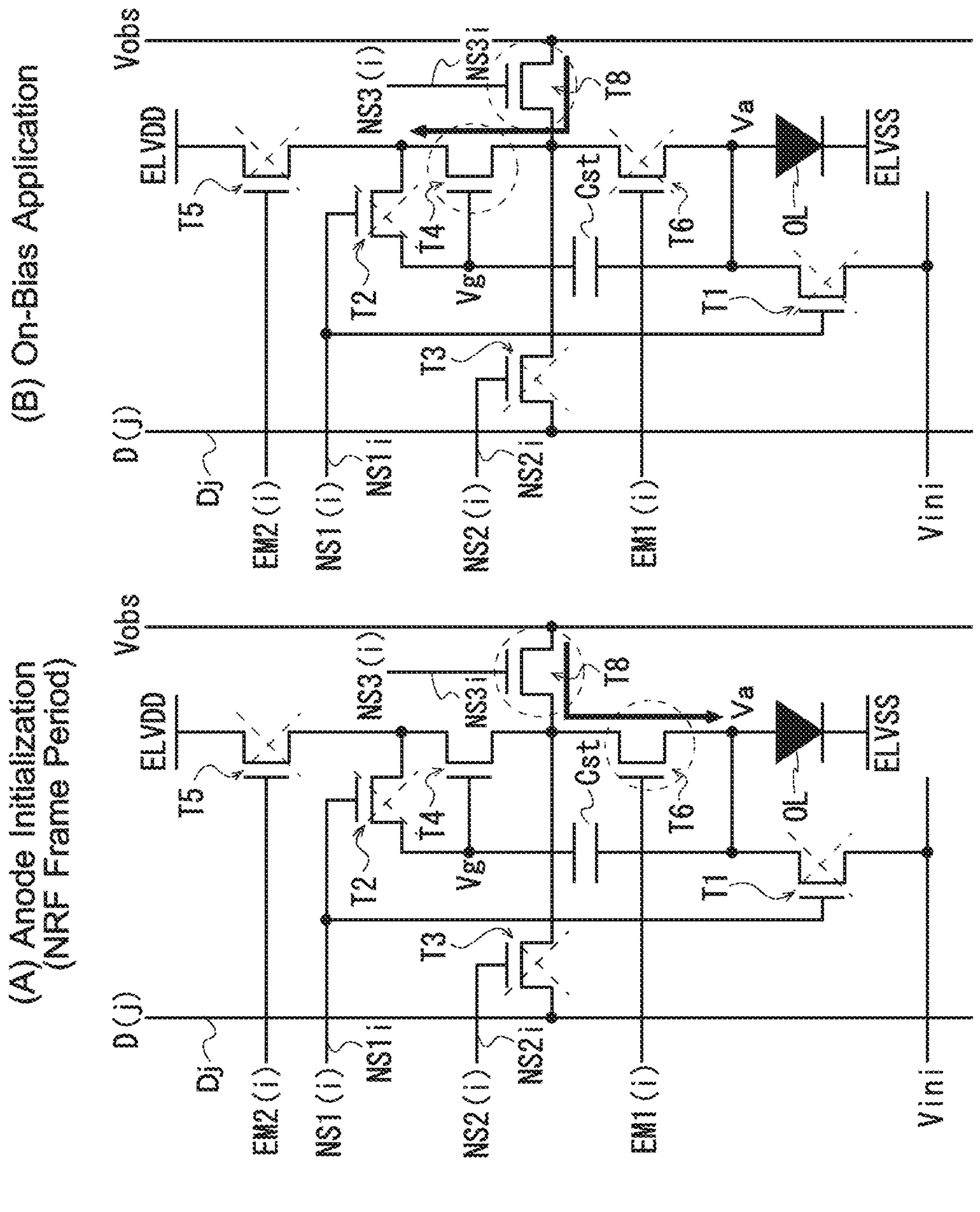
FIG. 9 provides circuit diagrams (A) and (B) for describing anode initialization operation and on-bias application operation of the pixel circuit in the first embodiment.

(A) of FIG. 9 illustrates a circuit state of the pixel circuit Pix(i, j) in an anode initialization period Tanr as a display element initialization period in the NRF frame period Tnrf. During the anode initialization period Tanr, the bias control transistor T8 and the first light emission control transistor T6 are in ON state, and the second light emission control transistor T5, the threshold compensation transistor T2, the initialization transistor T1, and the write control transistor T3 are in OFF state. As described above, in the anode initialization period Tanr in the present embodiment, unlike the circuit state ((B) of FIG. 4) in the anode initialization period Tanr(i) in the comparative example, the write control transistor is in OFF state, and the bias control transistor T8 is in ON state. As a result, the voltage Vobs of the on-bias voltage line Lobs is applied as an anode initialization voltage Vanr to the anode electrode of the organic EL element OL via the bias control transistor T8 and the first light emission control transistor T6 to initialize the anode voltage Va of the organic EL element OL. By such initialization of the anode voltage Va, an influence of a past display history on light emitting operation of the organic EL element OL is blocked and degradation of display quality is suppressed.

(B) of FIG. 9 illustrates a circuit state of the pixel circuit Pix(i, j) in an on-bias period Tobs in the RF frame period Trf and the NRF frame period Inrf. During the on-bias period Tobs, the bias control transistor T8 is in ON state, and the first light emission control transistor T6, the second light emission control T5, transistor the threshold compensation transistor T2, the initialization transistor T1, and the write control transistor T3 are in OFF state. As described above, during the on-bias period Tobs in the present embodiment, unlike the circuit state ((C) of FIG. 4) during the on-bias period Tobs (i) in the above-described comparative example, the write control transistor is in OFF state and the bias control transistor T8 is in ON state. This brings the voltage of the on-bias voltage line Lobs to be applied as the on-bias voltage Vobs to the source terminal of the driving transistor T4 via the bias control transistor T8. As a result, an influence of a hysteresis characteristic of the driving transistor T4 on display luminance is reduced. In this way, even when display is performed while switching the refresh rate, it is possible to obtain excellent display in which no flicker is visually recognized.

<1.3.1 First Drive Example>

FIG. 10 is a timing chart for describing a first drive example for operating each pixel circuit Pix(i, j) as illustrated in FIGS. 8 and 9, and illustrates changes in the drive signals in the first drive example, i.e., changes in the first scanning signals NS1(*i*) and NS1(*i*-1), the second scanning signals NS2(*i*) and NS2(*i*-1), the third scanning signal NS3 (*i*), the first light emission control signals EM1(*i*) and EM1(*i*-1), the second light emission control signals EM2(*i*) and EM2(*i*-1), and the data signal D(j). In the present drive example, the scanning-side drive circuit 40 includes a first scanning signal line drive circuit, a second scanning signal line drive circuit, and a third scanning signal line drive circuit that constitute the scanning signal line drive circuit, and further includes a first light emission control circuit and a second light emission control circuit. Each of the first scanning signal line drive circuit, the second scanning signal line drive circuit, the third scanning signal line drive circuit, the first light emission control circuit, and the second light emission control circuit has n-stage bistable circuits (hereinafter referred to as "unit circuits") connected in cascade, and these unit circuits and each pixel circuit are connected in a manner as illustrated in (A) of FIG. 13. Specifically, unit circuits NS1(Uk), NS2(Uk), NS3(Uk), EM1(Uk), and EM2 (Uk) in the k-th stage in the first scanning signal line drive circuit, the second scanning signal line drive circuit, the third scanning signal line drive circuit, the first light emission control circuit, and the second light emission control circuit are connected to the pixel circuits Pix(k, 1) to Pix(k, m) in the k-th row (k=1 to n). Note that, for convenience of description, FIG. 10 illustrates the changes of the drive signals in one RF frame period Trf and one subsequent NRF frame period Tnrf. Usually, a large number of NRF frame periods Inrf continue, and a plurality of RF frame periods Trf may also continue. The same applies to FIGS. 11 and 12 for describing other drive examples.

In the RF frame period Trf, the first scanning signal lines NS11 to NS1*n*, the second scanning signal lines NS21 to NS2*n*, the third scanning signal lines NS31 to NS3*n*, the first light emission control lines EM11 to EM1*n*, and the second light emission control lines EM21 to EM2*n* are selectively driven by the changes of the drive signals as illustrated in FIG. 10, and data voltages to be written in the pixel circuits Pix(i, 1) to Pix(i, m) are respectively applied to the data signal lines D1 to Dm (i=1 to n). By such drive signals, the holding capacitor Cst in the pixel circuit Pix(i, j) is initialized (data initialization) in the data initialization period Tini, and a voltage of the data signal D(j) is written as the data voltage Vdata to the pixel circuit Pix(i, j) in the data write period Twr(see (B) of FIG. 8). In the present drive example, as illustrated in FIG. 10, in the RF frame period Trf, the on-bias period Tobs is provided between the data initialization period Tini and the data write period Twr. During the on-bias period Tobs in each pixel circuit Pix(i, j), all of the signal NS1(*i*) of the corresponding first scanning signal line NS1*i*, the signal NS2(*i*) of the corresponding second scanning signal line NS2*i*, the signal EM1(*i*) of the corresponding first light emission control line EM1*i*, and the signal EM2(*i*) of the corresponding second light emission control line EM2*i* are at L level (inactive), and the signal NS3(*i*) of the corresponding third scanning signal line NS3*i* is at H level (active). This brings the pixel circuit Pix(i, j) to operate as illustrated in (B) of FIG. 9, so that the voltage of the on-bias voltage line Lobs is applied as the on-bias voltage Vobs to the source terminal of the driving transistor T4.

In the NRF frame period Inrf, the first scanning signal lines NS11 to NS1*n*, the second scanning signal lines NS21 to NS2*n*, the third scanning signal lines NS31 to NS3*n*, the first light emission control lines EM11 to EM1*n*, and the second light emission control lines EM21 to EM2*n* are selectively driven by the changes of the drive signals as illustrated in FIG. 10, and the data signal lines D1 to Dm are maintained in a high impedance state. By such drive signals, the on-bias period Tobs and the anode initialization period Tanr are provided in the NRF frame period Inrf for each pixel circuit Pix(i, j). During the on-bias period Tobs, similarly to the on-bias period Tobs included in the RF frame period Trf, all of the signal NS1(*i*) of the corresponding first scanning signal line NS1*i*, the signal NS2(*i*) of the corresponding second scanning signal line NS2*i*, the signal EM1 (*i*) of the corresponding first light emission control line EM1*i*, and the signal EM2(*i*) of the corresponding second light emission control line EM2*i* are at L level (inactive), and the signal NS3(*i*) of the corresponding third scanning signal line NS3*i* is at H level (active). This brings the pixel circuit Pix(i, j) to operate as illustrated in (B) of FIG. 9, so that the voltage of the on-bias voltage line Lobs is applied as the on-bias voltage Vobs to the source terminal of the driving transistor T4. During the anode initialization period Tanr, the signal NS1(*i*) of the corresponding first scanning signal line NS1*i*, the signal NS2(*i*) of the corresponding second scanning signal line NS2*i*, and the signal EM2(*i*) of the corresponding second light emission control line EM2*i* are all at L level (inactive), and the signal NS3(*i*) of the corresponding third scanning signal line NS3*i* and the signal EM1(*i*) of the corresponding first light emission control line EM1*i* are at H level (active). As a result, the pixel circuit Pix(i, j) operates as illustrated in (A) of FIG. 9, and the voltage of the on-bias voltage line Lobs is applied as the anode initialization voltage Vanr to the anode electrode of the organic EL element OL via the bias control transistor T8 to initialize the anode voltage Va.

<1.3.2 Second Drive Example>

Figure 11:
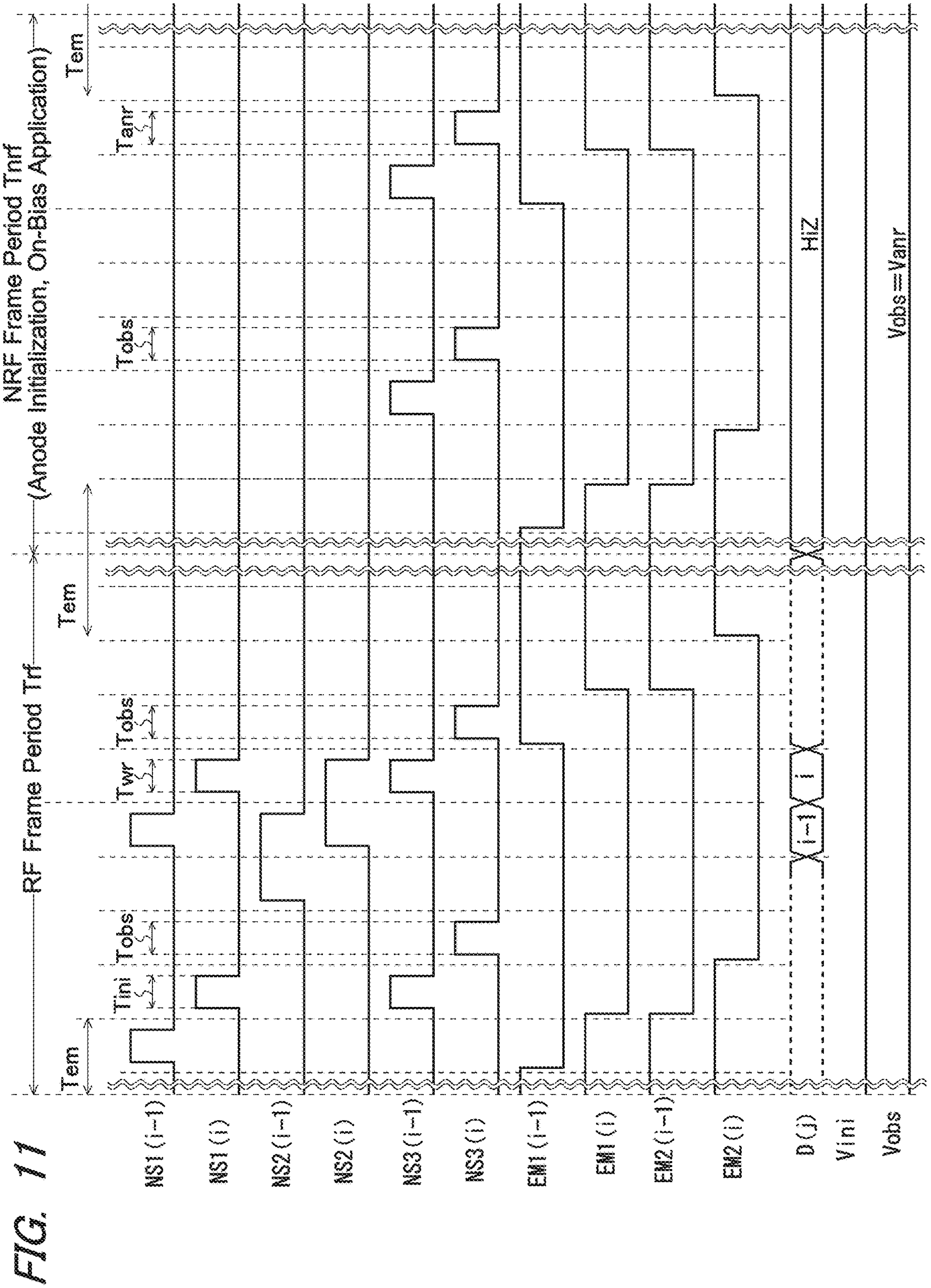
FIG. 11 is a timing chart for describing a second drive example of the pixel circuit in the first embodiment.

FIG. 11 is a timing chart for describing a second drive example for operating each pixel circuit Pix(i, j) as illustrated in FIGS. 8 and 9, and illustrates changes in the drive signals in the second drive example, i.e., changes in the first scanning signals NS1(*i*) and NS1(*i*-1), the second scanning signals NS2(*i*) and NS2(*i*-1), the third scanning signal NS3(*i*), the first light emission control signals EM1(*i*) and EM1(*i*-1), the second light emission control signals EM2(*i*) and EM2(*i*-1), and the data signal D(j). Also in the present drive example, as illustrated in (A) of FIG. 13, the unit circuits NS1(Uk), NS2(Uk), NS3(Uk), EM1(Uk), and EM2(Uk) in the k-th stage in the first scanning signal line drive circuit, the second scanning signal line drive circuit, the third scanning signal line drive circuit, the first light emission control circuit, and the second light emission control circuit are connected to the pixel circuits Pix(k, 1) to Pix(k, m) in the k-th row (k=1 to n).

In the RF frame period Trf, the first scanning signal lines NS11 to NS1*n*, the second scanning signal lines NS21 to NS2*n*, the third scanning signal lines NS31 to NS3*n*, the first light emission control lines EM11 to EM1*n*, and the second light emission control lines EM21 to EM2*n* are selectively driven by the changes of the drive signals as illustrated in FIG. 11, and data voltages to be written in the pixel circuits Pix(i, 1) to Pix(i, m) are respectively applied to the data signal lines D1 to Dm (i=1 to n). By such drive signals, similarly to the first drive example, the holding capacitor Cst in the pixel circuit Pix(i, j) is initialized (data initialization) in the data initialization period Tini (see (A) of FIG. 8), and the voltage of the data signal D(j) is written as the data voltage Vdata to the pixel circuit Pix(i, j) in the data write period Twr(see (B) of FIG. 8).

In the present drive example, unlike the first drive example, two on-bias periods Tobs are provided in the RF frame period Trf as illustrated in FIG. 11. Specifically, in the RF frame period Trf, not only the on-bias period Tobs is provided between the data initialization period Tini and the data write period Twr, but also the on-bias period Tobs is provided after the data write period Twr. For each pixel circuit Pix(i, j), during any of these two on-bias periods Tobs, the signal NS1(*i*) of the corresponding first scanning signal line NS1*i*, the signal NS2(*i*) of the corresponding second scanning signal line NS2*i*, the signal EM1(*i*) of the corresponding first light emission control line EM1*i*, and the signal EM2(*i*) of the corresponding second light emission control line EM2*i* are at L level (inactive), and the signal NS3(*i*) of the corresponding third scanning signal line NS3*i* is at H level (active). This brings the pixel circuit Pix(i, j) to operate as illustrated in (B) of FIG. 9, so that the voltage of the on-bias voltage line Lobs is applied as the on-bias voltage Vobs to the driving transistor T4. Therefore, according to the present drive example, the influence of the hysteresis characteristic of the driving transistor T4 on display luminance can be further reduced as compared with the first drive example.

In the NRF frame period Inrf, similarly to the first drive example (FIG. 10), the first scanning signal lines NS11 to NS1*n*, the second scanning signal lines NS21 to NS2*n*, the third scanning signal lines NS31 to NS3*n*, the first light emission control lines EM11 to EM1*n*, and the second light emission control lines EM21 to EM2*n* are selectively driven by the changes of the drive signals as illustrated in FIG. 11, and the data signal lines D1 to Dm are maintained in the high impedance state. By such drive signals, for each pixel circuit Pix(i, j), the on-bias period Tobs and the anode initialization period Tanr are provided in the NRF frame period Inrf, and similarly to the first drive example, in the pixel circuit Pix(i, j), the on-bias voltage Vobs is applied to the source terminal of the driving transistor T4 in the on-bias period Tobs (see (B) of FIG. 9), and the anode initialization voltage Vanr (=Vobs) is applied to the anode electrode of the organic EL element OL in the anode initialization period Tanr(see (A) of FIG. 9).

<1. 3.3 Third Drive Example>

Figure 12:
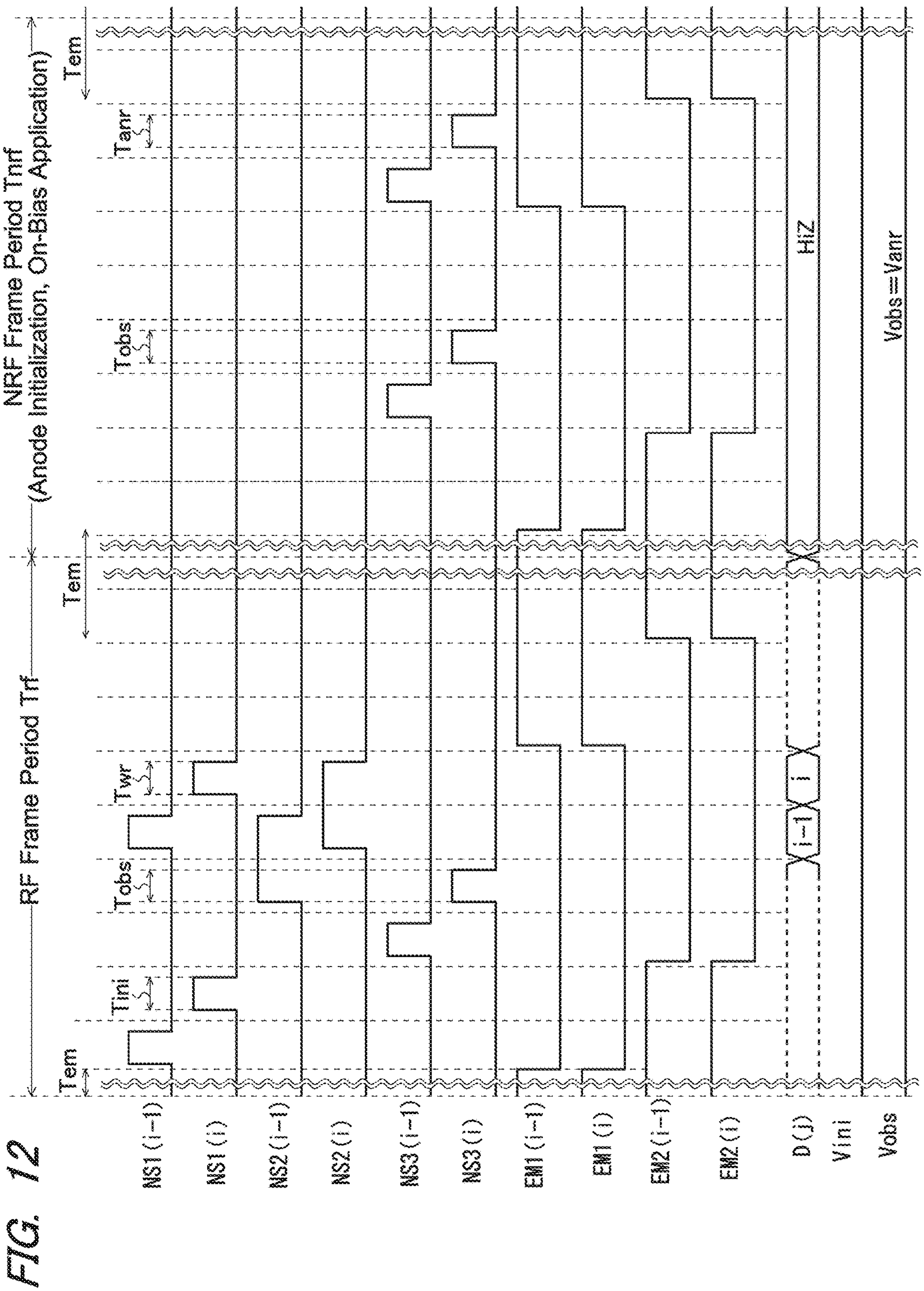
FIG. 12 is a timing chart for describing a third drive example of the pixel circuit in the first embodiment.

FIG. 12 is a timing chart for describing a third drive example for operating each pixel circuit Pix(i, j) as illustrated in FIGS. 8 and 9, and illustrates changes in the drive signals in the third drive example, i.e., changes in the first scanning signals NS1(*i*) and NS1(*i*-1), the second scanning signals NS2(*i*) and NS2(*i*-1), the third scanning signal NS3(*i*), the first light emission control signals EM1(*i*) and EM1(*i*-1), the second light emission control signals EM2(*i*) and EM2(*i*-1), and the data signal D(j). In the present drive example, among the first scanning signal line drive circuit, the second scanning signal line drive circuit, the third scanning signal line drive circuit, the first light emission control circuit, and the second light emission control circuit in the scanning-side drive circuit 40, while each of the first scanning signal line drive circuit, the second scanning signal line drive circuit, and the third scanning signal line drive circuit has n stage bistable circuits (unit circuits) connected in cascade similarly to the first drive example, each of the first light emission control circuit and the second light emission control circuit has n/2 stage bistable circuits (hereinafter, also referred to as "unit circuits") connected in cascade (here, n is an even number), and these unit circuits and each pixel circuit are connected as illustrated in (B) of FIG. 13. Specifically, unit circuits NS1(U2*k*-1), NS2(U2*k*-1), and NS3(U2*k*-1) in a 2k-1-th stage in the first scanning signal line drive circuit, the second scanning signal line drive circuit, and the third scanning signal line drive circuit as well as unit circuits EM1(Uk) and EM2(Uk) in a k-th stage in the first light emission control circuit and the second light emission control circuit are connected to pixel circuits Pix(2*k*-1,1) to Pix(2*k*-1,*m*) in a 2k-1-th row. Also, unit circuits NS1(U2*k*), NS2(U2*k*), and NS3(U2*k*) in a 2k-th stage in the first scanning signal line drive circuit, the second scanning signal line drive circuit, and the third scanning signal line drive circuit as well as the unit circuits EM1(Uk) and EM2(Uk) in the k-th stage in the first light emission control circuit and the second light emission control circuit are connected to pixel circuits Pix(2*k*, 1) to Pix(2*k*, *m*) in a 2k-th row (k=1 to n/2).

In the RF frame period Trf, the first scanning signal lines NS11 to NS1*n*, the second scanning signal lines NS21 to NS2*n*, the third scanning signal lines NS31 to NS3*n*, the first light emission control lines EM11 to EM1*n*, and the second light emission control lines EM21 to EM2*n* are selectively driven by the changes of the drive signals as illustrated in FIG. 12, and the data voltages to be written in the pixel circuits Pix(i, 1) to Pix(i, m) are respectively applied to the data signal lines D1 to Dm (i=1 to n). As illustrated in FIG. 12, in the present drive example, the first light emission control signal EM1(*i*) and the second light emission control signal EM2(*i*) change at different timing from that in the first drive example. Note that levels of the drive signals NS1(*i*), NS2(*i*), NS3(*i*), EM1(*i*), and EM2(*i*) in the data initialization period Tini, the data write period Twr, and the on-bias period Tobs in the present drive example are the same as levels (see FIG. 10) of the drive signals NS1(*i*), NS2(*i*), NS3(*i*), EM1(*i*), and EM2(*i*) in the data initialization period Tini, the data write period Twr, and the on-bias period Tobs in the first drive example, respectively. Therefore, similarly to the first drive example, the holding capacitor Cst in the pixel circuit Pix(i, j) is initialized (data initialization) in the data initialization period Tini (see (A) of FIG. 8), the voltage of the data signal D(j) is written as the data voltage Vdata to the pixel circuit Pix(i, j) in the data write period Twr(see (B) of FIG. 8), and the on-bias voltage Vobs is applied to the source terminal of the driving transistor T4 in the pixel circuit Pix(i, j) in the on-bias period Tobs (see (B) of FIG. 9).

Also in the NRF frame period Inrf, as illustrated in FIG. 12, the first light emission control signal EM1(*i*) and the second light emission control signal EM2(*i*) change at timing different from that in the first drive example. Note that levels of the drive signals NS1(*i*), NS2(*i*), NS3(*i*), EM1(*i*), and EM2(*i*) during the on-bias period Tobs and the anode initialization period Tanr in the present drive example are the same as the levels (see FIG. 10) of the drive signals NS1(*i*), NS2(*i*), NS3(*i*), EM1(*i*), and EM2(*i*) during the on-bias period Tobs and the anode initialization period Tanr in the first drive example, respectively. Therefore, similarly to the first drive example, the on-bias voltage Vobs is applied to the source terminal of the driving transistor T4 in the pixel circuit Pix(i, j) in the on-bias period Tobs (see (B) of FIG. 9), and the voltage of the on-bias voltage line Lobs is applied to the anode electrode of the organic EL element OL in the pixel circuit Pix(i, j) as the anode initialization voltage Vanr in the anode initialization period Tanr(see (A) of FIG. 9).

Figure 13:
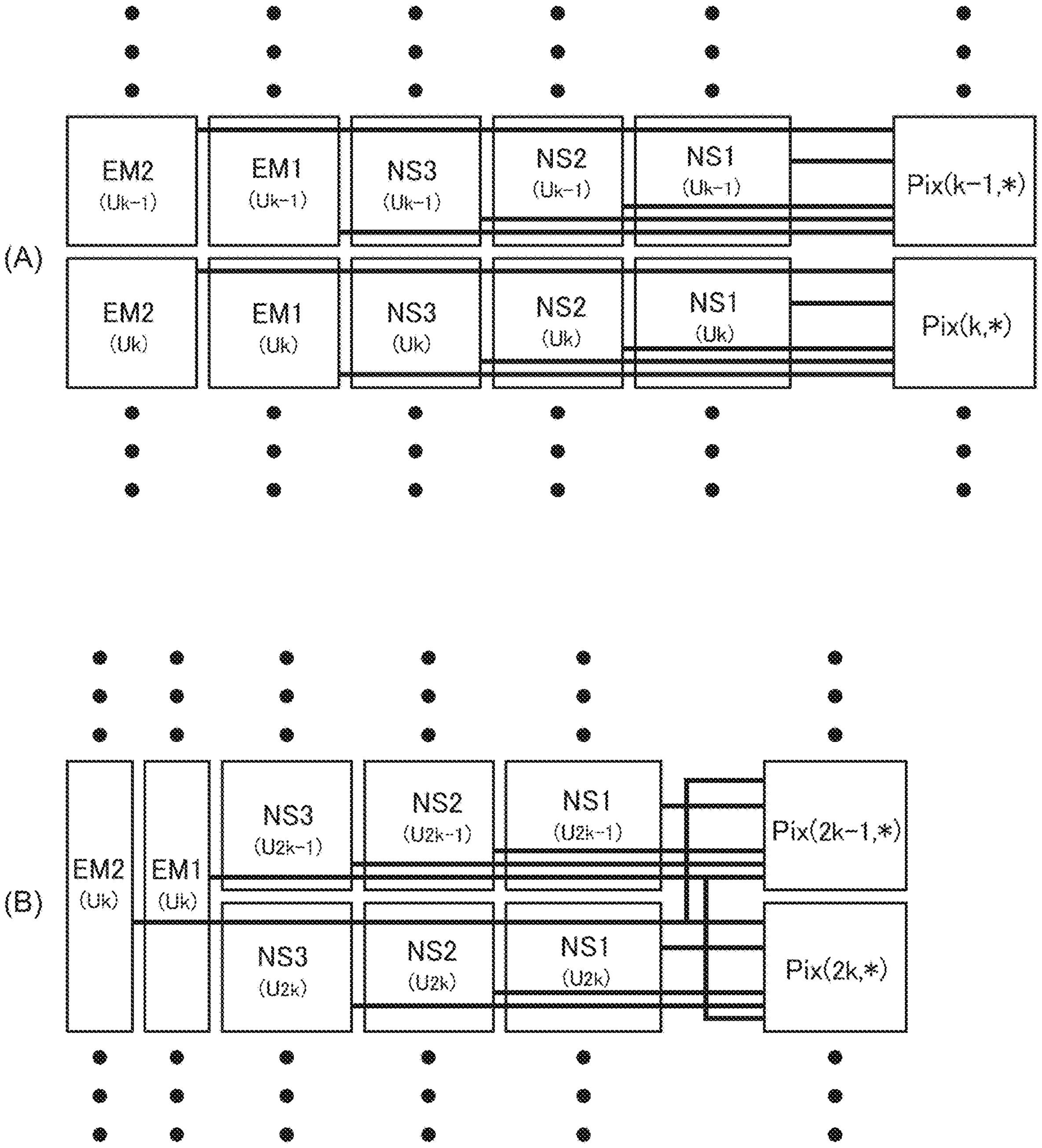
FIG. 13 provides block diagrams (A) and (B) illustrating a connection relationship with a drive circuit for driving the pixel circuit in the first embodiment.

According to the present drive example as described above, although the pixel circuit Pix(i, j) is driven in the same manner as in the first drive example, since each of the first light emission control circuit and the second light emission control circuit in the scanning-side drive circuit 40 is configured by n/2 stage unit circuits (see (B) of FIG. 13), a circuit amount of the light emission control circuit is reduced (to about ½) as compared with the first drive example (see (A) of FIG. 13).

<1.4 Operation of Display Device according to First Embodiment>

Next, operation of the display device according to the present embodiment will be described with reference to FIGS. 14 to 16.

<1.4.1 First Operation Example>

Figure 14:
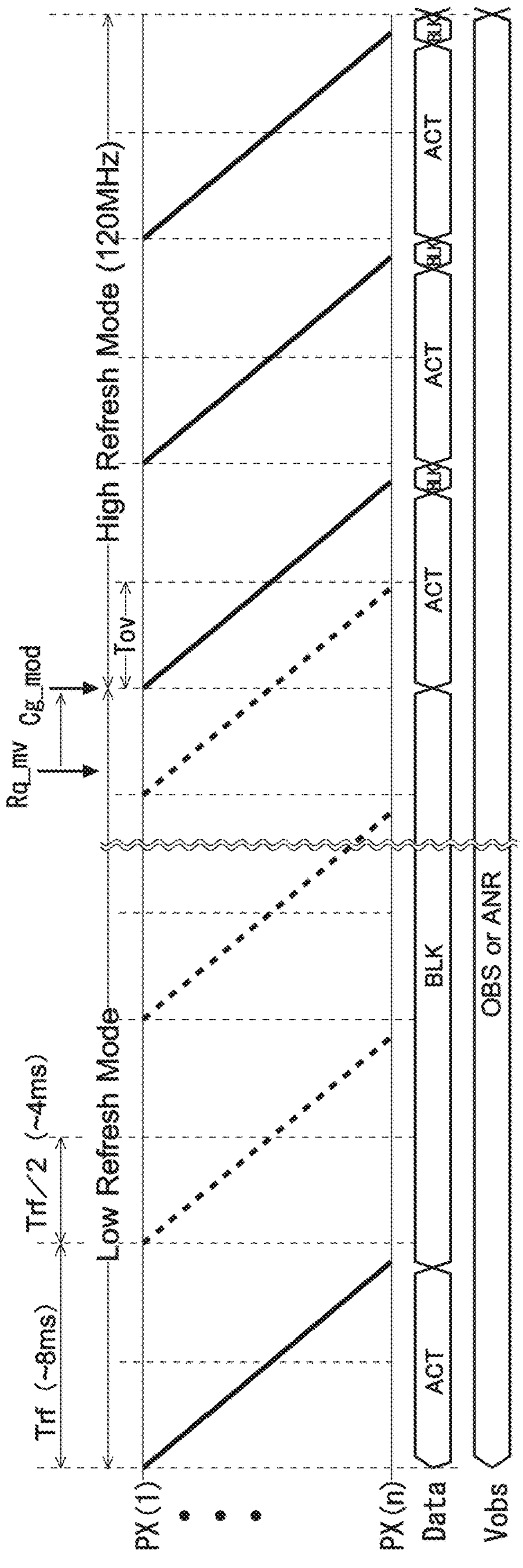
FIG. 14 is a timing chart for describing a first operation example of the display device according to the first embodiment.

FIG. 14 is a timing chart for describing a first operation example of the display device according to the present embodiment. In the present operation example, it is assumed that the display device according to the present embodiment is configured such that the refresh rate can be changed on a ½ frame period basis. Also in FIG. 14, similarly to the timing chart of the comparative example illustrated in FIG. 2, "PX(i)" represents the pixel circuits Pix(i, 1) to Pix(i, m) in the i-th row (i=1 to n), "Data" collectively represents the data signals D(1) to D(n), "ACT" represents a signal state (data voltage) for data writing, and "BLK" represents a signal state of blanking. In the present embodiment, unlike the comparative example, the on-bias voltage Vobs and the anode initialization voltage Vanr are applied to each pixel circuit Pix(i, j) from the on-bias voltage line Lobs provided separately from the data signal line Dj (see (A) and (B) of FIG. 9). Therefore, in FIG. 14, "OBS" indicates that the voltage of the on-bias voltage line Lobs is used as the on-bias voltage Vobs for on-bias application to the driving transistor T4, and "ANR" indicates that the voltage of the on-bias voltage line Lobs is used as the anode initialization voltage Vanr for anode initialization of the organic EL element. Furthermore, similarly to the timing chart of the comparative example illustrated in FIG. 2, a bold solid line extending in an oblique direction in the refresh frame period Trf indicates timing at which data writing is performed in the pixel circuits PX(i)=Pix(i, 1) to Pix(i, m) in each row (i=1 to n), and a bold dotted line extending in an oblique direction in the non-refresh frame period Tnrf indicates timing at which on-bias application or anode initialization is performed in the pixel circuit PX(i) in each row (i=1 to n). Note that an expression manner for use in FIG. 14 to illustrate the operation example of the display device is also used in FIGS. 15, 16, and (B) of FIG. 30 to be described later.

The example shown in FIG. 14 illustrates operation of the display device in a case where a refresh request Rq_mv for moving image display occurs within a first half period of a certain NRF frame period Tnrf during operation in the low refresh mode in which the RF frame period Trf is followed by a plurality of NRF frame periods Tnrf. Since the display device in the present operation example is configured such that the refresh rate can be changed on a ½ frame period basis, in this case, as illustrated in FIG. 14, the operation mode of the display device is switched to the high refresh mode at an end time point Cg_mod of the first half period of the NRF frame period Tnrf. In other words, the RF frame period Trf starts at the end time point, and the RF frame period Trf continues while the operation is performed in the high refresh mode. Therefore, in the present operation example, switching to the high refresh mode is advanced by the ½ frame period as compared with the operation example (FIG. 2) of the above-described comparative example in which the operation mode of the display device is switched to the high refresh mode at the end time point of the NRF frame period Tnrf.

As illustrated in FIG. 14, the refresh request Rq_mv for moving image display occurs in the first half period of the NRF frame period Tnrf, and the operation mode is switched to the high refresh mode at the end time point Cg_mod in the first half period. Note that the on-bias application and the anode initialization performed in the first half period are also performed in a second half period of the NRF frame period Tnrf. In other words, as illustrated in FIG. 14, the second half period of the NRF frame period Inrf and a first half period of the first RF frame period Trf after the operation mode is switched overlap with each other. In this overlap period Tov, among pixel circuits Pix(1, j) to Pix(n, j) in the same column, a pixel circuit Pix(i1, j) to which data is written and a pixel circuit Pix(i2, j) in which the anode initialization or the on-bias application is performed are mixed. As has been described above, in the above-described comparative example, since the on-bias voltage Vobs and the anode initialization voltage Vanr are supplied from the data signal line Dj to each pixel circuit Pix(i, j) (see (B) and (C) of FIG. 4), operation in such overlap period Tov cannot be implemented. By contrast, in the present embodiment, since the on-bias voltage Vobs and the anode initialization voltage Vanr are supplied from the on-bias voltage line Lobs to each pixel circuit Pix(i, j) (see (A) and (B) of FIG. 9), in the pixel circuits Pix(1, j) to Pix(n, j) in the same column, operation can be performed in the overlap period Tov in which the pixel circuit Pix(i1, j) to which data is written and the pixel circuit Pix(i2, j) in which the anode initialization or the on-bias application is performed are mixed.

Note that, in the present operation example, it is assumed that timing at which each of the first light emission control signals EM1(1) to EM1(*n*) and the second light emission control signals EM2(1) to EM2(*n*) enters the inactive state (L level) in one frame period is twice, and accordingly, switching of the operation mode from the low refresh mode to the high refresh mode is performed on a ½ frame period basis. However, by changing the number of times when each of these light emission control signals enters the inactive state in one frame period by the scanning-side control signal Scs applied from the display control circuit 20 to the scanning-side drive circuit 40, it is also possible to switch the operation mode to the high refresh mode on a shorter time basis. For example, by setting the number of times to four, the operation mode can be switched to the high refresh mode on a ¼ frame period basis, and by setting the number of times to eight, the operation mode can be switched to the high refresh mode on a ⅛ frame period basis. The same applies to other embodiments.

<1. 4.2 Second Operation Example>

Figure 15:
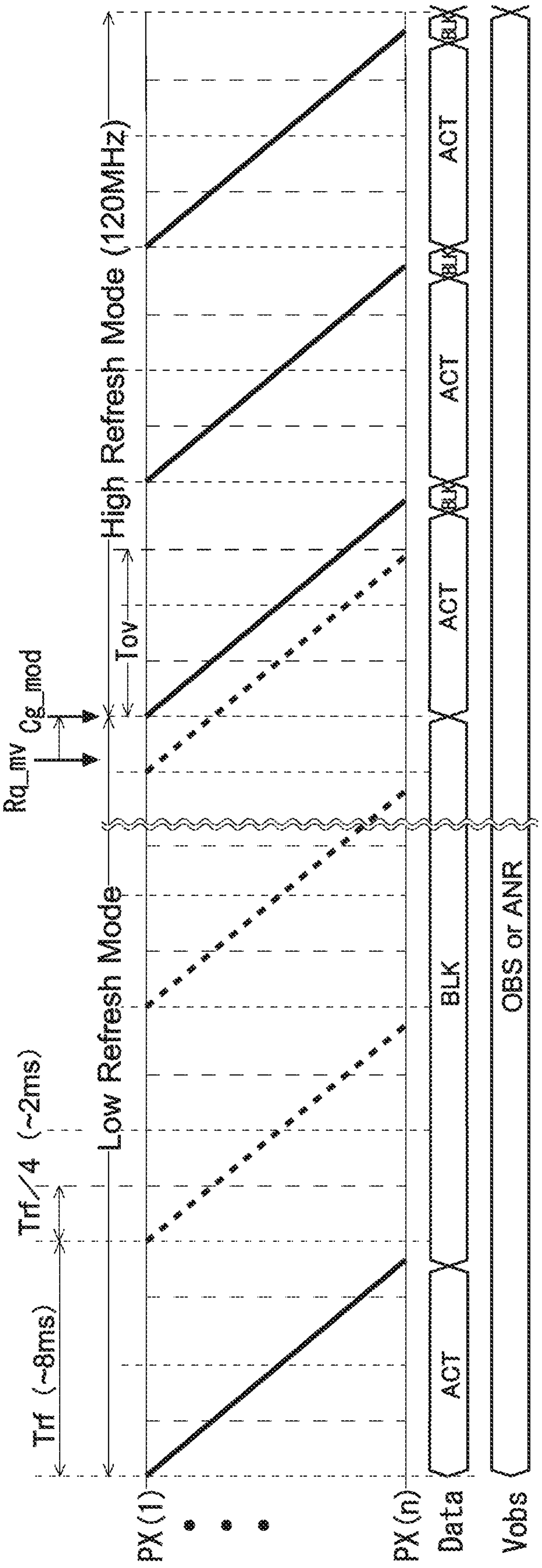
FIG. 15 is a timing chart for describing a second operation example of the display device according to the first embodiment.

FIG. 15 is a timing chart for describing a second operation example of the display device according to the present embodiment. In the present operation example, it is assumed that the display device according to the present embodiment is configured such that the refresh rate can be changed on a ¼ frame period basis.

The example shown in FIG. 15 illustrates operation of the display device in a case where the refresh request Rq_mv for moving image display occurs within a first ¼ frame period in a certain NRF frame period Inrf while operating in the low refresh mode in which the RF frame period Trf is followed by a plurality of NRF frame periods Inrf. Since the display device in the present operation example is configured such that the refresh rate can be changed on a ¼ frame period basis, in this case, as illustrated in FIG. 15, the operation mode of the display device is switched to the high refresh mode at an end time point Cg_mod in the first ¼ frame period in the NRF frame period Tnrf. In other words, the RF frame period Trf starts at the end time point, and the RF frame period Trf continues while the operation is performed in the high refresh mode. Therefore, in the present operation example, switching to the high refresh mode is advanced by a ¾ frame period as compared with the operation example (FIG. 2) of the comparative example in which the operation mode of the display device is switched to the high refresh mode at the end time point of the NRF frame period Tnrf.

As illustrated in FIG. 15, in the present operation example, while the operation mode is switched to the high refresh mode at the end time point Cg_mod of the first ¼ frame period in the NRF frame period Tnrf, the on-bias application and the anode initialization performed in the first ¼ frame period are performed also in the remaining ¾ frame period in the NRF frame period Tnrf. In other words, as illustrated in FIG. 15, the remaining ¾ frame period in the NRF frame period Inrf overlaps with a ¾ frame period from a start time point in the first RF frame period Trf after the operation mode is switched. In this overlap period Tov, among pixel circuits Pix(1, j) to Pix(n, j) in the same column, a pixel circuit Pix(i1, j) to which data is written and a pixel circuit Pix(i2, j) in which the anode initialization or the on-bias application is performed are mixed. However, in the present embodiment, since the on-bias voltage Vobs and the anode initialization voltage Vanr are supplied from the on-bias voltage line Lobs to each pixel circuit Pix(i, j) (see (A) and (B) of FIG. 9), in the pixel circuits Pix(1, j) to Pix(n, j) in the same column, operation can be performed in the overlap period Tov in which the pixel circuit Pix(i1, j) to which data is written and the pixel circuit Pix(i2, j) in which the anode initialization or the on-bias application is performed are mixed.

<1.4.3 Third Operation Example>

Figure 16:
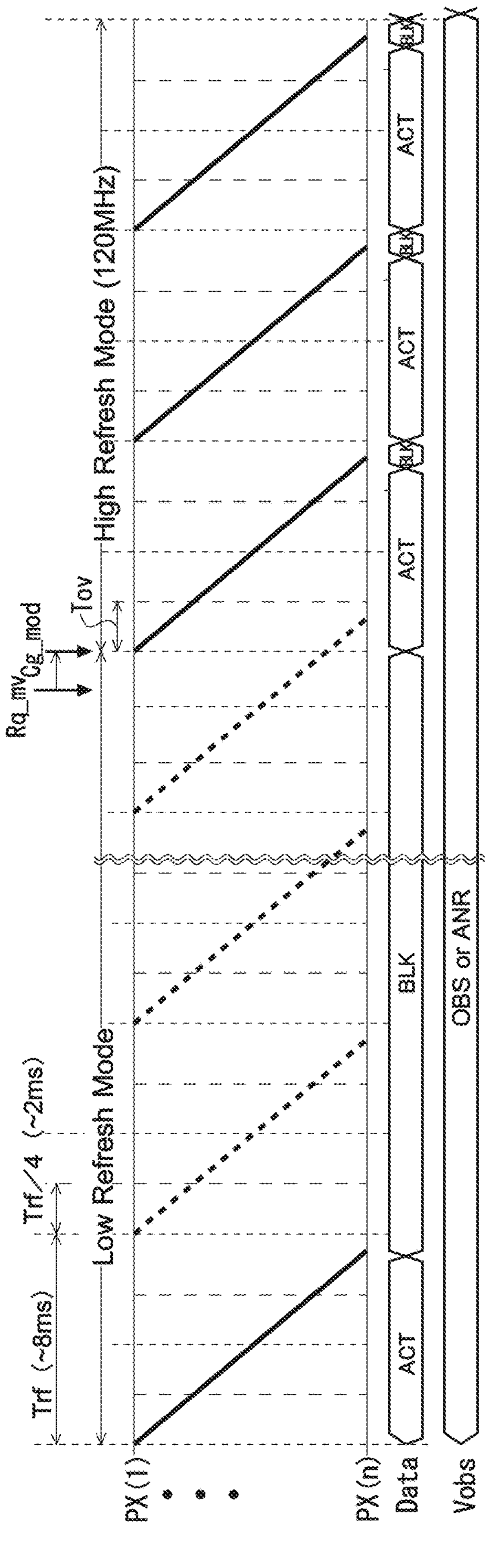
FIG. 16 is a timing chart for describing a third operation example of the display device according to the first embodiment.

FIG. 16 is a timing chart for describing a third operation example of the display device according to the present embodiment. Also in the present operation example, it is assumed that the display device according to the present embodiment is configured such that the refresh rate can be changed on a ¼ frame period basis.

The example shown in FIG. 16 illustrates operation of the display device in a case where a refresh request Rq_mv for moving image display occurs within a third ¼ frame period in a certain NRF frame period Inrf while operating in the low refresh mode in which the RF frame period Trf is followed by a plurality of NRF frame periods Tnrf. Since the display device in the present operation example is configured such that the refresh rate can be changed on a ¼ frame period basis, in this case, as illustrated in FIG. 16, the operation mode of the display device is switched to the high refresh mode at an end time point Cg_mod in the third ¼ frame period in the NRF frame period Tnrf. In other words, the RF frame period Trf starts at the end time point, and the RF frame period Trf continues while the operation is performed in the high refresh mode. Therefore, in the present operation example, switching to the high refresh mode is advanced by the ¼ frame period as compared with the operation example (FIG. 2) of the comparative example in which the operation mode of the display device is switched to the high refresh mode at the end time point of the NRF frame period Tnrf.

As illustrated in FIG. 16, in the present operation example, while the operation mode is switched to the high refresh mode at the end time point Cg_mod of the third ¼ frame period in the NRF frame period Inrf, the on-bias application and the anode initialization performed in the third ¼ frame period are performed also in the remaining ¼ frame period in the NRF frame period Tnrf. In other words, as illustrated in FIG. 16, a fourth ¼ frame period in the NRF frame period Inrf overlaps with a first ¼ frame period in the first RF frame period Trf after the operation mode is switched. In this overlap period Tov, among pixel circuits Pix(1, j) to Pix(n, j) in the same column, a pixel circuit Pix(i1, j) to which data is written and a pixel circuit Pix(i2, j) in which the anode initialization or the on-bias application is performed are mixed.

<1.5 Effects>

As described above, in the present embodiment, unlike the comparative example illustrated in FIGS. 2 to 5, the on-bias voltage Vobs and the anode initialization voltage Vanr are applied to each pixel circuit Pix(i, j) from the on-bias voltage line Lobs provided separately from the data signal line Dj (see (A) and (B) of FIG. 9). Therefore, at the time of switching the operation mode, among the pixel circuits Pix(1, j) to Pix(n, j) in the same column, the pixel circuit Pix(i1, j) to which data is written as illustrated in (B) of FIG. 8 and the pixel circuit Pix(i2, j) in which the anode initialization or the on-bias application is performed as illustrated in FIG. 9 can be mixed (see the overlap period Tov in FIGS. 14 to 16). As a result, according to the present embodiment, in a case where the variable refresh rate system is adopted to reduce power consumption in still image display or the like in a current drive system display device such as an organic EL display device, it is possible to quickly switch the operation mode from the low refresh mode to the high refresh mode while suppressing occurrence of flicker by on-bias application, and to suppress a delay in switching from still image display at the low refresh rate to moving image display at the high refresh rate.

2. Second Embodiment

In the above first embodiment, the on-bias voltage Vobs and the anode initialization voltage Vanr are applied to each pixel circuit Pix(i, j) from the on-bias voltage line Lobs provided separately from the data signal line Dj (see (A) and (B) of FIG. 9). By contrast, in a second embodiment, the on-bias voltage Vobs and the anode initialization voltage Vanr are applied to each pixel circuit Pix(i, j) from the initialization voltage line Lini without providing the on-bias voltage line Lobs. In the following, such second embodiment will be described with reference to FIGS. 17 and 18. Note that an overall configuration of a display device according to the second embodiment is basically the same as that of the display device according to the first embodiment except that the on-bias voltage line Lobs is not provided, and thus the same or corresponding parts are denoted by the same reference signs and detailed description thereof is omitted.

Figure 17:
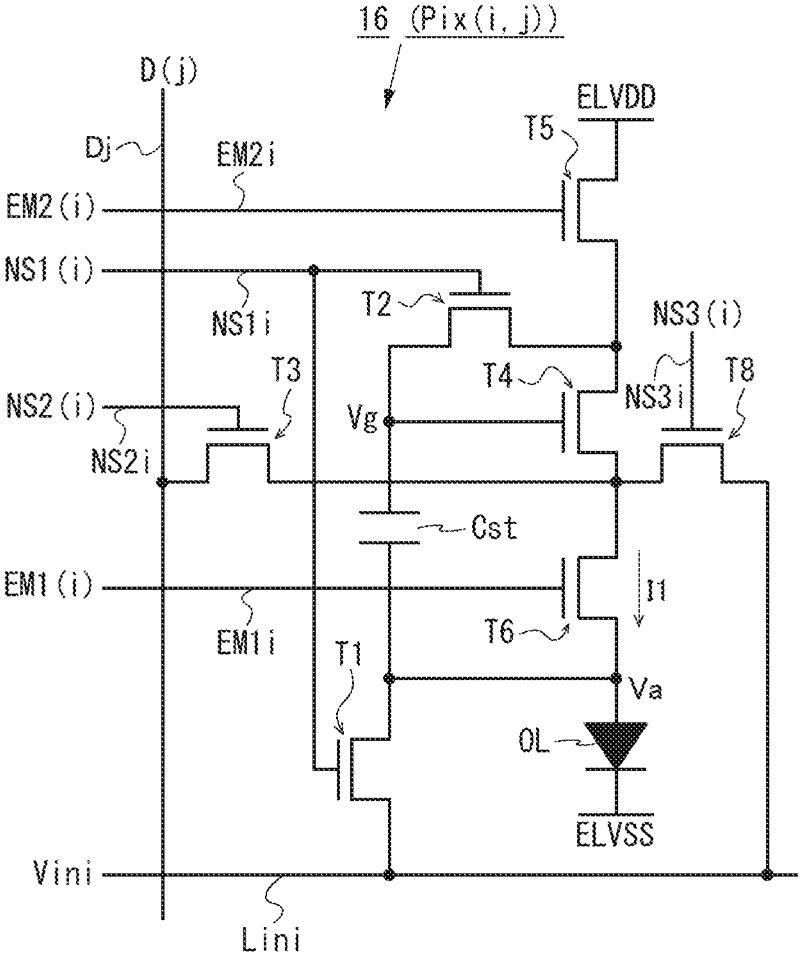
FIG. 17 is a circuit diagram illustrating a configuration of a pixel circuit in a display device according to a second embodiment.

FIG. 17 is a circuit diagram illustrating a configuration of a pixel circuit 16 in the display device 10 according to the present embodiment, and in more detail, is a circuit diagram illustrating a configuration of the pixel circuit 16 corresponding to the i-th first scanning signal line NS1*i* and the j-th data signal line Dj, i.e., the pixel circuit Pix(i, j) in the i-th row and the j-th column ($1 \le i \le n$, $1 \le j \le m$). Similarly to the pixel circuit 15 in the first embodiment illustrated in FIG. 7, the pixel circuit 16 includes one organic EL element OL as a display element, the initialization transistor T1, the threshold compensation transistor T2, the write control transistor T3, the driving transistor T4, the first light emission control transistor T6, the second light emission control transistor T5, the bias control transistor T8, and the holding capacitor Cst. The transistors T1 to T6, and T8 are N-channel thin film transistors (in more detail, oxide TFT), and the transistors T1 to T3, T5, T6, and T8 other than the driving transistor T4 operate as switching elements.

As can be seen from comparison of FIG. 17 with FIG. 7, in the pixel circuit 15 according to the first embodiment, the source terminal of the driving transistor T4 is connected to the on-bias voltage line Lobs via the bias control transistor T8, whereas in the pixel circuit 16 according to the present embodiment, the source terminal of the driving transistor T4 is connected to the initialization voltage line Lini via the bias control transistor T8. The remaining configuration of the pixel circuit 16 in the present embodiment is the same as the configuration of the pixel circuit 15 in the first embodiment. Furthermore, the pixel circuit 16 in the present embodiment is driven by drive signals similar to the drive signals of the pixel circuit 15 (Pix(i, j)) in the first embodiment, i.e., the first scanning signal NS1(*i*), the second scanning signal NS2(*i*), the third scanning signal NS3(*i*), the first light emission control signal EM1(*i*), the second light emission control signal EM2(*i*), and the data signal D(j) (see FIGS. 10 to 12).

Next, operation in the pixel circuit Pix(i, j) in the i-th row and the j-th column in the present embodiment will be described with reference to FIGS. 18 together with FIG. 17. Note that since operation of the display device according to the present embodiment is basically the same as the operation of the display device according to the first embodiment, only main operation of the pixel circuit Pix(i, j) in the present embodiment will be described below. The pixel circuit Pix(i, j) in the present embodiment operates similarly to the first embodiment in the data initialization period Tini in the RF frame period Trf (see (A) of FIG. 8).

Figure 18:
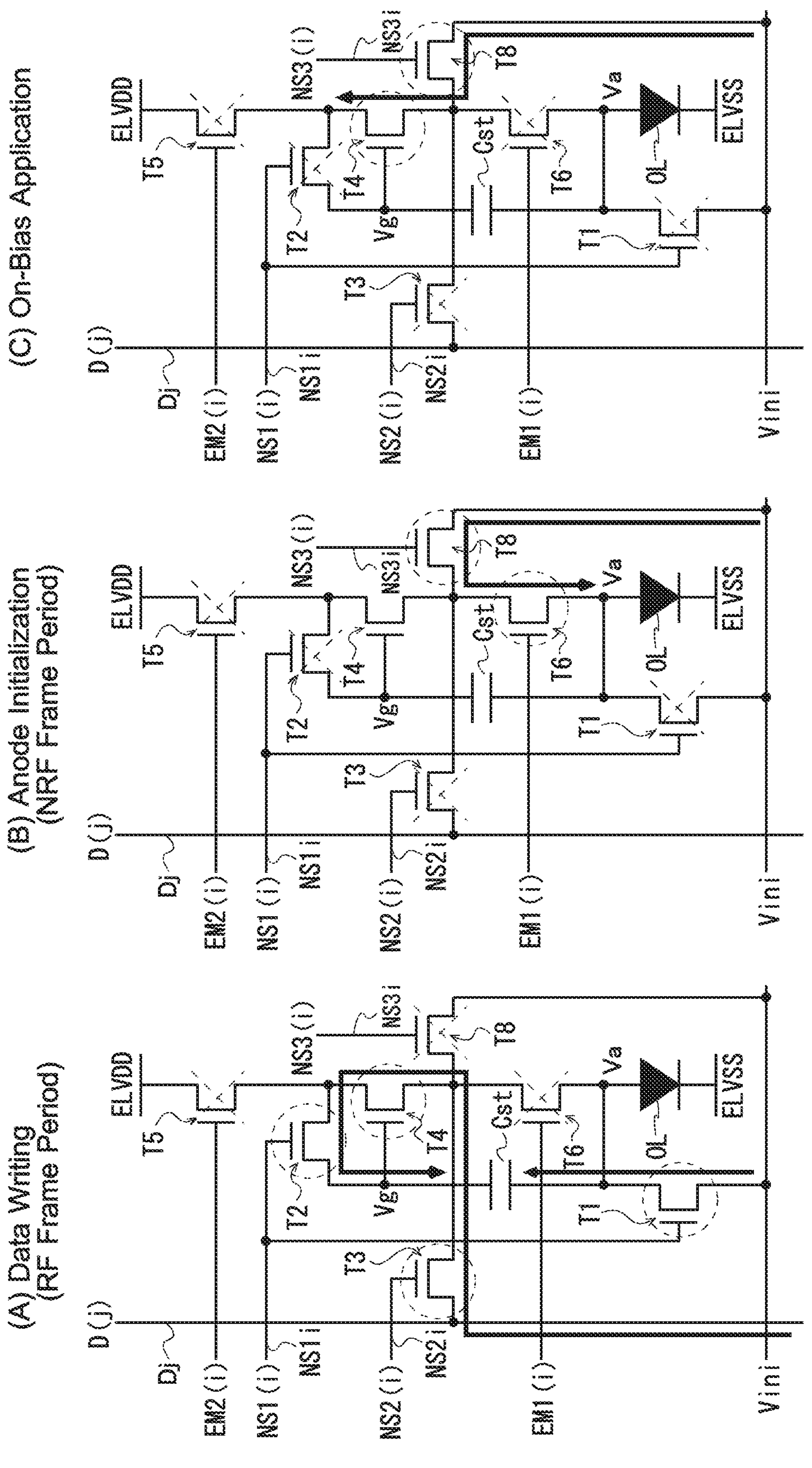
FIG. 18 provides circuit diagrams (A), (B), and (C) for describing data writing operation, anode initialization operation, and on-bias application operation of the pixel circuit in the second embodiment.

(A) of FIG. 18 illustrates a circuit state of the pixel circuit Pix(i, j) in the data write period Twr in the RF frame period. The circuit state in the data write period Twr is the same as that of the pixel circuit Pix(i, j) in the data write period Twr in the first embodiment (see (B) of FIG. 8). In this data write period Twr, the voltage of the corresponding data signal line Dj is written as the data voltage Vdata into the holding capacitor Cst via the driving transistor T4 that is brought into the diode connected state by the threshold compensation transistor T2 in ON state, and the voltage corresponding to the difference Vdata-*Vini* between the data voltage Vdata and the initialization voltage (to be precise, the voltage Vdata+Vth-*Vini* corresponding to the difference subjected to the threshold compensation) is held in the holding capacitor Cst (B) of FIG. 18 illustrates a circuit state of the pixel circuit Pix(i, j) in the anode initialization period Tanr in the NRF frame period Tnrf. During the anode initialization period Tanr, the bias control transistor T8 and the first light emission control transistor T6 are in ON state, and the second light emission transistor the threshold control T5, compensation transistor T2, the initialization transistor T1, and the write control transistor T3 are in OFF state. As described above, in the anode initialization period Tanr in the present embodiment, the circuit state is similar to the circuit state (see (A) of FIG. 9) of the pixel circuit Pix(i, j) in the anode initialization period Tanr in the first embodiment, and the anode voltage Va of the organic EL element OL is initialized. Note that as shown in FIG. 17, in the pixel circuit Pix(i, j) in the present embodiment, since the anode electrode of the organic EL element OL is connected to the initialization voltage line Lini via the first light emission control transistor T6 and the bias control transistor T8, not the voltage of the on-bias voltage line Lobs but a voltage of the initialization voltage line Lini is applied as the anode initialization voltage Vanr to the anode electrode of the organic EL element OL via the bias control transistor T8 and the first light emission control transistor T6 in ON state (see (B) of FIG. 18).

(C) of FIG. 18 illustrates a circuit state of the pixel circuit Pix(i, j) in an on-bias period Tobs in the RF frame period Trf and the NRF frame period Tnrf. During the on-bias period Tobs, the bias control transistor T8 is in ON state, and the first light emission control transistor T6, the second light emission control transistor T5, the threshold compensation transistor T2, the initialization transistor T1, and the write control transistor T3 are in OFF state. As described above, in the on-bias period Tobs in the present embodiment, as illustrated in FIG. 17, not the voltage of the on-bias voltage line Lobs but the voltage of the initialization voltage line Lini is applied as the on-bias voltage Vobs to the source terminal of the driving transistor T4 via the bias control transistor T8 in ON state. This enables reduction in an influence of a hysteresis characteristic of the driving transistor T4 on display luminance.

As described above, according to the present embodiment, unlike the first embodiment, not the voltage of the on-bias voltage line Lobs but the voltage of the initialization voltage line Lini is applied as the anode initialization voltage Vanr and the on-bias voltage Vobs to the anode electrode of the organic EL element OL and the source terminal of the driving transistor T4 in the pixel circuit Pix(i, j). Note that also in the present embodiment, the anode initialization operation and the on-bias operation can be performed in each pixel circuit Pix(i, j) similarly to the first embodiment. Therefore, according to the present embodiment, in a case where the variable refresh rate system is adopted in order to reduce power consumption in still image display or the like in a current drive system display device such as an organic EL display device, it is possible to obtain the same effect as that of the first embodiment without providing the on-bias voltage line Lobs.

3. Third Embodiment

As described above, both the on-bias voltage Vobs and the anode initialization voltage Vanr are applied to each pixel circuit 15 from the on-bias voltage line Lobs in the first embodiment (see FIG. 9), and are applied to each pixel circuit 16 from the initialization voltage line Lini in the second embodiment (see (B) and (C) of FIG. 18). By contrast, in a third embodiment, different voltage lines are used for a voltage line for providing the on-bias voltage Vobs and for a voltage line for providing the anode initialization voltage Vanr. In the following, such third embodiment will be described with reference to FIGS. 19, 20, and 21. Note that an overall configuration of a display device according to the third embodiment is basically the same as that of the display device according to the first embodiment except that n fourth scanning signal lines NS41 to NS4*n* are disposed along the n first scanning signal lines NS11 to NS1*n* in the display portion 11, respectively. Therefore, the same or corresponding parts are denoted by the same reference signs and detailed description thereof is omitted.

Figure 19:
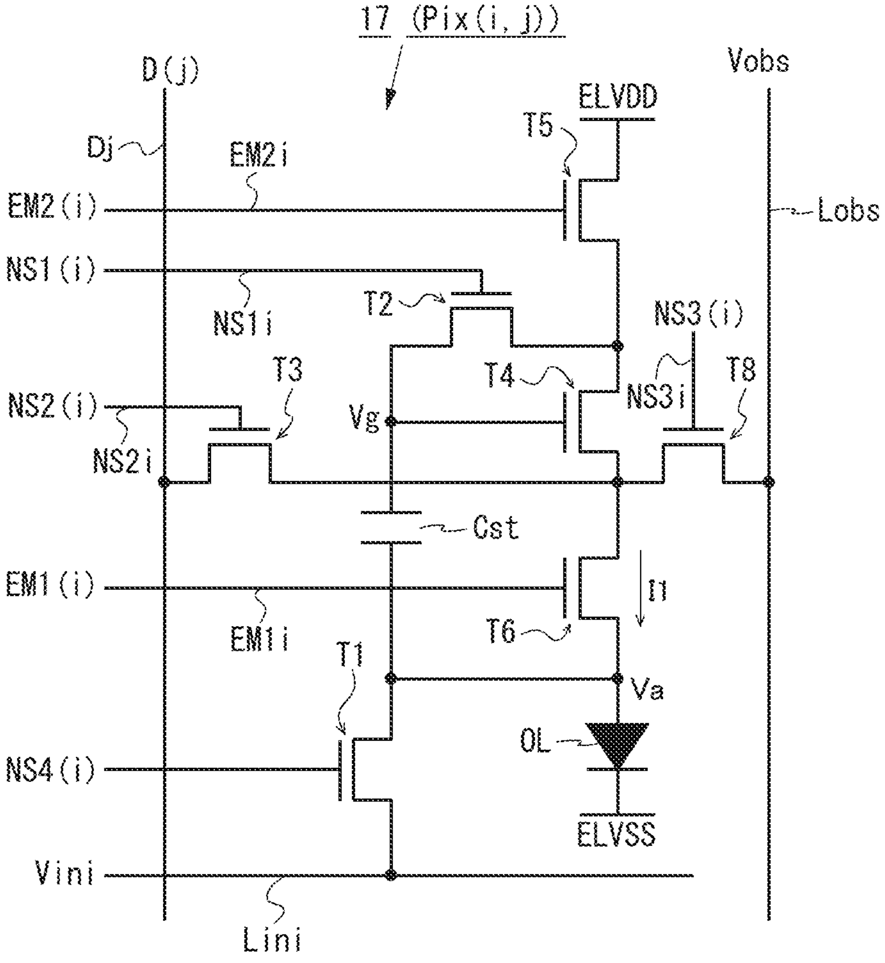
FIG. 19 is a circuit diagram illustrating a configuration of a pixel circuit in a display device according to a third embodiment.

FIG. 19 is a circuit diagram illustrating a configuration of a pixel circuit 17 in the display device 10 according to the present embodiment, and in more detail, is a circuit diagram illustrating a configuration of the pixel circuit 17 corresponding to the i-th first scanning signal line NS1*i* and the j-th data signal line Dj, i.e., the pixel circuit Pix(i, j) in the i-th row and the j-th column ($1 \le i \le n$, $1 \le j \le m$). Similarly to the pixel circuit 15 in the first embodiment illustrated in FIG. 7, the pixel circuit 17 includes one organic EL element OL as a display element, the initialization transistor T1, the threshold compensation transistor T2, the write control transistor T3, the driving transistor T4, the first light emission control transistor T6, the second light emission control transistor T5, the bias control transistor T8, and the holding capacitor Cst. The transistors T1 to T6, and T8 are N-channel thin film transistors (in more detail, oxide TFT), and the transistors T1 to T3, T5, T6, and T8 other than the driving transistor T4 operate as switching elements.

As can be seen by comparison of FIG. 19 with FIG. 7, in the pixel circuit 15 according to the first embodiment, the first scanning signal line NS1*i* connected to a gate terminal of the threshold compensation transistor T2 is also connected to a gate terminal of the initialization transistor T1, whereas in the pixel circuit 17 according to the present embodiment, the fourth scanning signal line NS4*i* different from the first scanning signal line NS1*i* connected to the gate terminal of the threshold compensation transistor T2 is connected to the gate terminal of the initialization transistor T1. This makes it possible to control the initialization transistor T1 independently of the threshold compensation transistor T2, thereby applying the voltage of the initialization voltage line Lini as the anode initialization voltage Vanr in the anode initialization period Tanr and applying the voltage of the on-bias voltage line Lobs as the on-bias voltage Vobs in the on-bias period Tobs.

Next, operation in the pixel circuit Pix(i, j) in the i-th row and the j-th column in the present embodiment will be described with reference to FIGS. 20 together with FIG. 19. Since operation of the display device according to the present embodiment is basically the same as the operation of the display device according to the first embodiment, description will be made mainly of operation, out of the operation of the pixel circuit 17 (Pix(i, j)) in the present embodiment, different from the operation of the pixel circuit 15 (Pix(i, j)) in the first embodiment. Note that the pixel circuit Pix(i, j) in the present embodiment operates similarly to the above first embodiment in the data initialization period Tini in the RF frame period (see (A) of FIG. 8).

Figure 20:
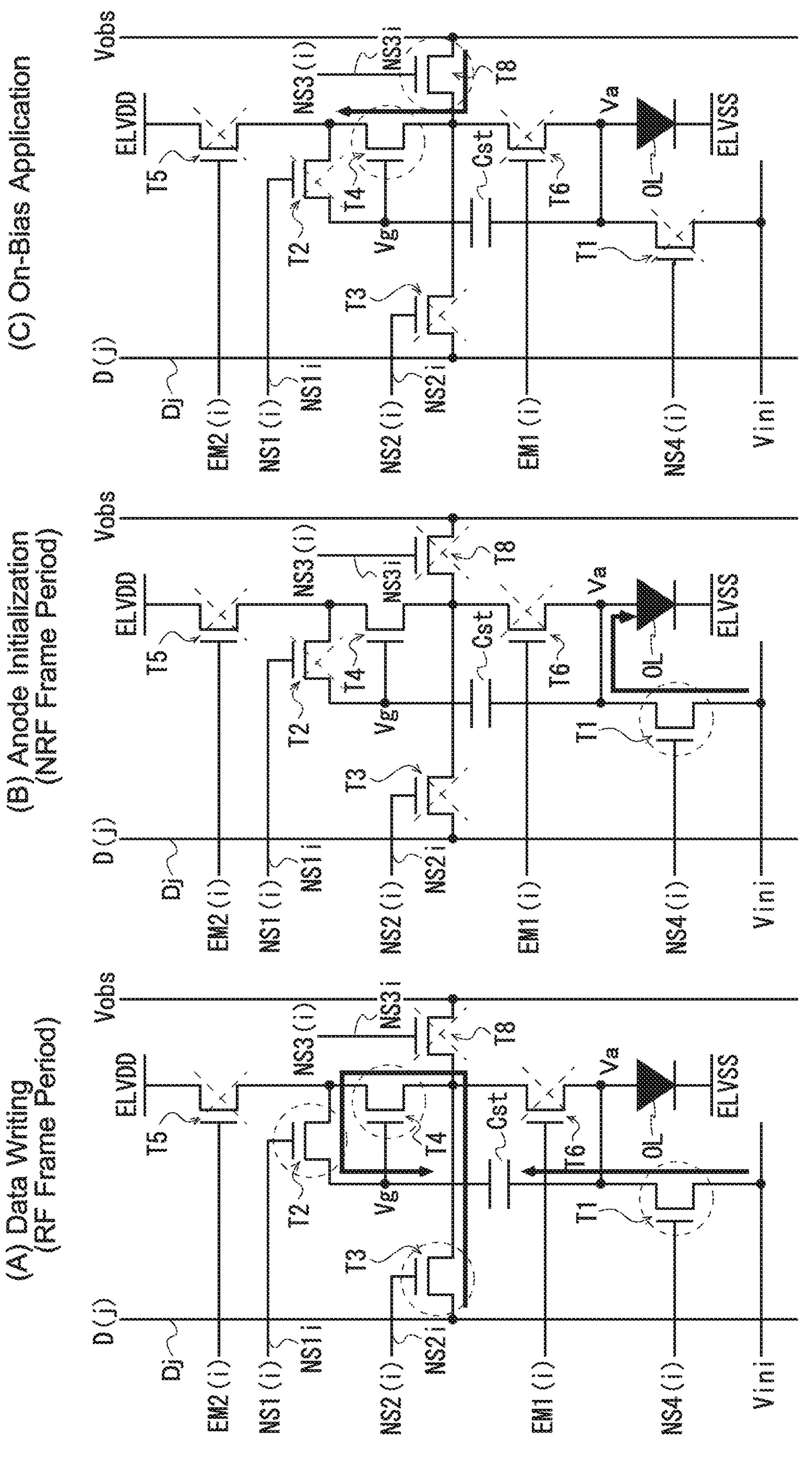
FIG. 20 provides circuit diagrams (A), (B), and (C) for describing data writing operation, anode initialization operation, and on-bias application operation of the pixel circuit in the third embodiment.

(A) of FIG. 20 illustrates a circuit state of the pixel circuit Pix(i, j) in the data write period Twr in the RF frame period Trf. The circuit state in the data write period Twr is the same as that of the pixel circuit Pix(i, j) in the data write period Twr in the first embodiment (see (B) of FIG. 8).

(B) of FIG. 20 illustrates a circuit state of the pixel circuit Pix(i, j) in the anode initialization period Tanr in the NRF frame period Tnrf. During the anode initialization period Tanr, the initialization transistor T1 is in ON state, and the first light emission control transistor T6, the second light emission control transistor T5, the threshold compensation transistor T2, the write control transistor T3, and the bias control transistor T8 are in OFF state. As described above, in the anode initialization period Tanr in the present embodiment, unlike the circuit state (see (A) of FIG. 9) of the pixel circuit Pix(i, j) in the anode initialization period Tanr in the first embodiment, the initialization transistor T1 is in ON state, and the bias control transistor T8 is in OFF state. As a result, the voltage of the initialization voltage line Lini is applied as the anode initialization voltage Vanr to the anode electrode of the organic EL element OL via the transistor T1. This is different from the first embodiment in which the voltage of the on-bias voltage line Lobs is applied to the anode electrode of the organic EL element OL as the anode initialization voltage Vanr in the anode initialization period Tanr(see (A) of FIG. 9).

(C) of FIG. 20 illustrates a circuit state of the pixel circuit Pix(i, j) in the on-bias period Tobs in the RF frame period Trf and the NRF frame period Tnrf. During the on-bias period Tobs, similarly to the pixel circuit Pix(i, j) in the embodiment (see (B) of FIG. 9), the bias control first transistor T8 is in ON state, and the first light emission control transistor T6, the second light emission control transistor T5, the threshold compensation transistor T2, the initialization transistor T1, and the write control transistor T3 are in OFF state. This brings the voltage of the on-bias voltage line Lobs to be applied as the on-bias voltage Vobs to the source terminal of the driving transistor T4.

Figure 21:
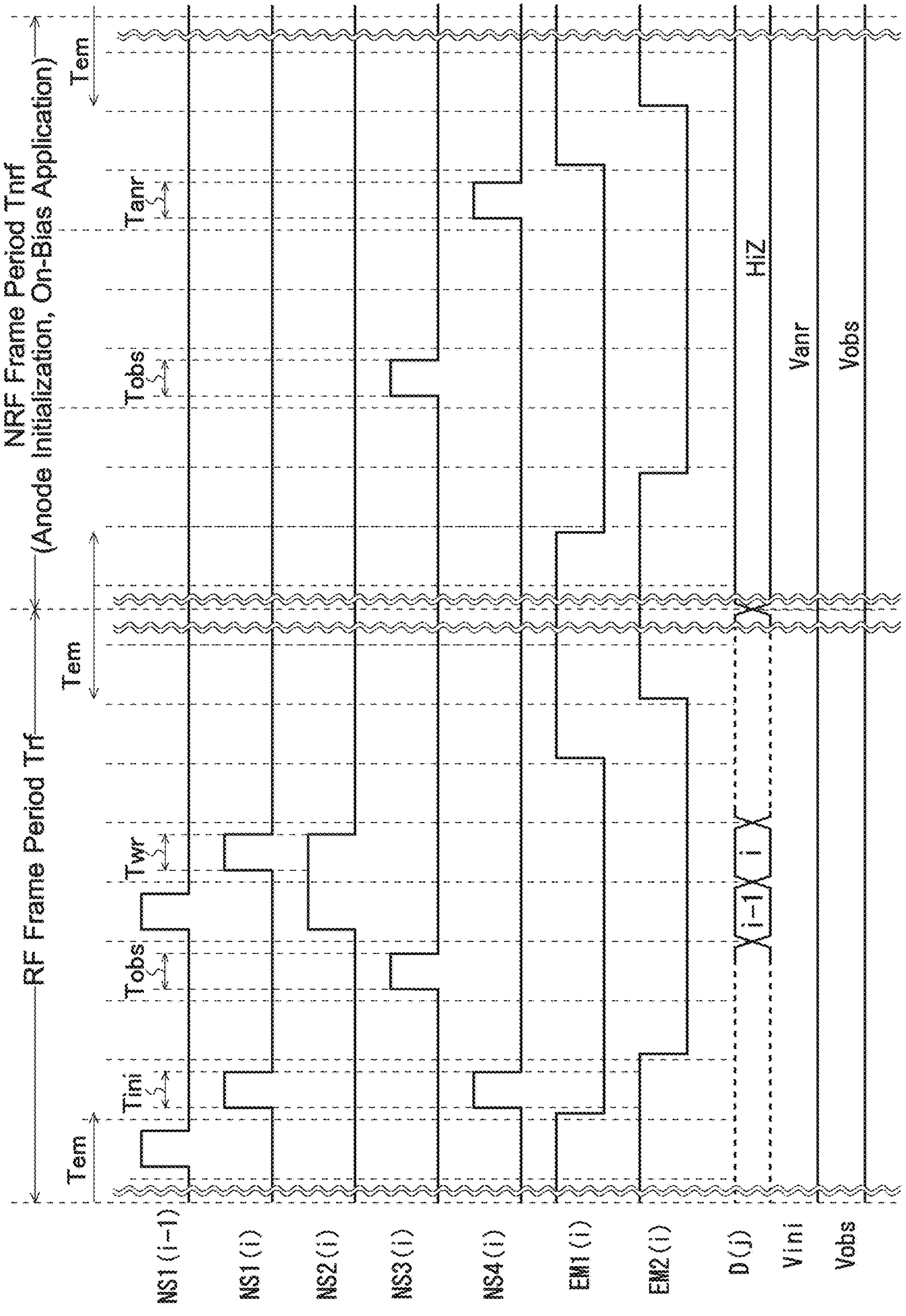
FIG. 21 is a timing chart for describing driving of the pixel circuit in the third embodiment.

FIG. 21 is a timing chart for describing a drive example for operating each pixel circuit Pix(i, j) in the present embodiment in a manner as illustrated in FIG. 20, and illustrates changes in drive signals in the drive example, i.e., changes in the first scanning signals NS1(*i*) and NS1(*i*-1), the second scanning signal NS2(*i*), the third scanning signal NS3(*i*), the fourth scanning signal NS4(*i*), the first light emission control signal EM1(*i*), the second light emission control signal EM2(*i*), and the data signal D(j). Note that the voltage Vini of the initialization voltage line Lini and the voltage Vobs of the on-bias voltage line Lobs are fixed voltages.

In the RF frame period Trf, the first scanning signal lines NS11 to NS1*n*, the second scanning signal lines NS21 to NS2*n*, the third scanning signal lines NS31 to NS3*n*, the fourth scanning signal lines NS41 to NS4*n*, the first light emission control lines EM11 to EM1*n*, and the second light emission control lines EM21 to EM2*n* are selectively driven by the changes of the drive signals as illustrated in FIG. 21, and data voltages to be written in the pixel circuits Pix(i, 1) to Pix(i, m) are respectively applied to the data signal lines D1 to Dm (i=1 to n). By such drive signals, the holding capacitor Cst in the pixel circuit Pix(i, j) is initialized (data initialization) in the data initialization period Tini, and the voltage of the data signal D(j) is written as the data voltage Vdata to the pixel circuit Pix(i, j) in the data write period Twr(see (A) of FIG. 20).

In the present drive example, as illustrated in FIG. 21, in the RF frame period Trf, the on-bias period Tobs is provided between the data initialization period Tini and the data write period Twr. For each pixel circuit Pix(i, j), during the on-bias period Tobs, the signal NS1(*i*) of the corresponding first scanning signal line NS1*i*, the signal NS2(*i*) of the corresponding second scanning signal line NS2*i*, the signal NS4 (*i*) of the corresponding fourth scanning signal line NS4*i*, the signal EM1(*i*) of the corresponding first light emission control line EM1*i*, and the signal EM2(*i*) of the corresponding second light emission control line EM2*i* are at L level (inactive), and the signal NS3(*i*) of the corresponding third scanning signal line NS3*i* is at H level (active). This brings the pixel circuit Pix(i, j) to operate as illustrated in (C) of FIG. 20, so that the voltage of the on-bias voltage line Lobs is applied as the on-bias voltage Vobs to the source terminal of the driving transistor T4.

In the NRF frame period Inrf, the second scanning signal lines NS21 to NS2*n*, the third scanning signal lines NS31 to NS3*n*, the fourth scanning signal lines NS41 to NS4*n*, the first light emission control lines EM11 to EM1*n*, and the second light emission control lines EM21 to EM2*n* are selectively driven by the changes of the drive signals as illustrated in FIG. 21, and the data signal lines D1 to Dm are maintained in the high impedance state. By such drive signals, the on-bias period Tobs and the anode initialization period Tanr are provided in the NRF frame period Inrf for each pixel circuit Pix(i, j).

Of these periods, during the on-bias period Tobs, similarly to the on-bias period Tobs included in the RF frame period Trf, the signal NS3(*i*) of the corresponding third scanning signal line NS3*i* is at H level (active), the signal NS1(*i*) of the corresponding first scanning signal line NS1*i*, the signal NS2(*i*) of the corresponding second scanning signal line NS2*i*, the signal NS4(*i*) of the fourth scanning signal line NS4*i*, the signal EM1(*i*) of the corresponding first light emission control line EM1*i*, and the signal EM2(*i*) of the corresponding second light emission control line EM2*i* are at L level (inactive). This brings the pixel circuit Pix(i, j) to operate as illustrated in (C) of FIG. 20, so that the voltage of the on-bias voltage line Lobs is applied as the on-bias voltage Vobs to the source terminal of the driving transistor T4.

During the anode initialization period Tanr, the signal NS4(*i*) of the fourth scanning signal line NS4*i* is at H level (active), and the signal NS1(*i*) of the corresponding first scanning signal line NS1*i*, signal the NS2(*i*) of the corresponding second scanning signal line NS2*i*, the signal NS3 (*i*) of the corresponding third scanning signal line NS3*i*, the signal EM1(*i*) of the corresponding first light emission control line EM1*i*, and the signal EM2(*i*) of the corresponding second light emission control line EM2*i* are at L level (inactive). As a result, the pixel circuit Pix(i, j) operates as illustrated in (B) of FIG. 20, and the voltage of the initialization voltage line Lini is applied as the anode initialization voltage Vanr to the anode electrode of the organic EL element OL via the initialization transistor T1.

According to the present embodiment as described above, unlike the first embodiment (see FIG. 7) in which on and off of the threshold compensation transistor T2 and the initialization transistor T1 are both controlled by the signal NS2(*i*) of the second scanning signal line NS2*i*, on and off of the initialization transistor T1 is controlled by the signal NS4(*i*) of the fourth scanning signal line NS4*i*. In addition, on and off of the bias control transistor T8 is controlled by the signal NS3(*i*) of the third scanning signal line NS3*i* similarly to the above first embodiment. As a result, in the on-bias period Tobs, the voltage Vobs of the on-bias voltage line Lobs is applied to the source terminal of the driving transistor T4 via the bias control transistor T8 (see (C) of FIG. 20), and in the anode initialization period Tanr, the voltage of the initialization voltage line Lini is applied as the anode initialization voltage Vanr to the anode electrode of the organic EL element OL via the initialization transistor T1 (see (B) of FIG. 20). Therefore, it is possible to individually select suitable voltage values for the on-bias voltage Vobs to reduce an influence of the hysteresis characteristic of the driving transistor T4 on display luminance and for the anode initialization voltage Vanr to block an influence of the past display history by initialization of the anode voltage Va.

4. Fourth Embodiment

As described above, while in the first to third embodiments, the transistors used in the pixel circuits 15 to 17 are only the N-channel transistors, the pixel circuits may be configured using both N-channel transistors and P-channel transistors. For example, among the transistors included in the pixel circuit, for a transistor whose on-resistance is preferably as low as possible, a P-channel transistor is conceivably used, which is a thin film transistor whose channel layer is formed of low-temperature polysilicon (hereinafter referred to as "LTPS-TFT"), and for a transistor whose off-leakage current is preferably as low as possible, an N-channel transistor is conceivably used, which is a thin film transistor whose channel layer is formed of an oxide semiconductor. As a thin film transistor whose channel layer is formed of an oxide semiconductor, i.e., an oxide TFT, a thin film transistor containing indium gallium zinc oxide (InGaZnO), i.e., an IGZO-TFT can be used. In the following, a display device using a pixel circuit including a P-channel transistor which is such an LTPS-TFT and an N-channel transistor which is an oxide TFT will be described as a fourth embodiment.

Figure 22:
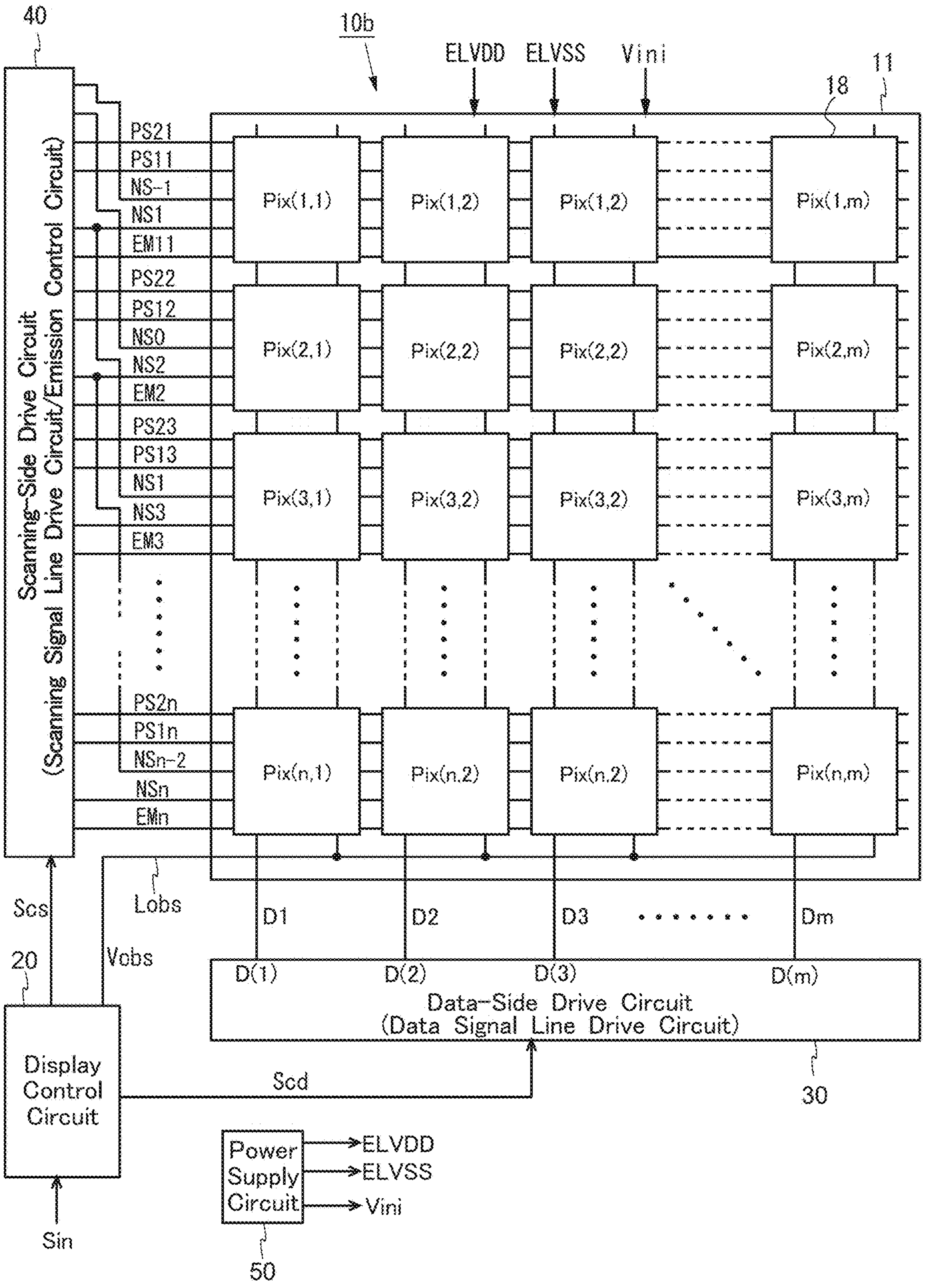
FIG. 22 is a block diagram illustrating an overall configuration of a display device according to a fourth embodiment.

FIG. 22 is a block diagram illustrating an overall configuration of a display device 10*b* according to the fourth embodiment. Similarly to the first embodiment, the display device 10*b* is an organic EL display device of a variable refresh rate system (VRR system) that performs internal compensation, and includes the display portion 11, the display control circuit 20, the data-side drive circuit 30, the scanning-side drive circuit 40, and the power supply circuit 50. Therefore, in the configuration of the display device 10*b* according to the present embodiment, parts that are the same as or correspond to the configuration of the display device 10 according to the first embodiment (see FIGS. 1 and 7) are denoted by the same reference signs. In the following, description will be given focusing on a part of the display device 10*b* according to the present embodiment that is different from the display device 10 according to the first embodiment.

Since the pixel circuit in the present embodiment includes both n N-channel transistor and a P-channel transistor (see FIG. 23 to be described later), the display portion 11 is provided with n first scanning signal lines PS11, P12, and PS1$n$ and n second scanning signal lines PS21, P22, . . . , and PS2$n$ for controlling on and off of the P-channel transistor in the pixel circuit, and n+2 third scanning signal lines NS-1, NS0, NS1, . . . , and NSn for controlling on and off of the N-channel transistor in the pixel circuit. In addition, n light emission control lines EM1 to EMn are disposed in the display portion 11 along the n first scanning signal lines PS11 to PS1$n$, respectively. Furthermore, m data signal lines D1 to Dm, the on-bias voltage line Lobs, the initialization voltage line Lini, the high level power supply line ELVDD, and the low level power supply line ELVSS are disposed in the display portion 11 in the same form as in the first embodiment (see FIGS. 1 and 22). Note that while the scanning-side drive circuit 40 in the first embodiment drives the first scanning signal lines NS11 to NS1$n$, the second scanning signal lines NS21 to NS2$n$, the third scanning signal lines NS31 to NS3$n$, the first light emission control lines EM11 to EM1$n$, and the second light emission control lines EM21 to EM2$n$, the scanning-side drive circuit 40 in the present embodiment drives the first scanning signal lines PS11 to PS1$n$, the second scanning signal lines PS21 to PS2$n$, the third scanning signal lines NS-1 to NSn, and the light emission control lines EM1 to EMn. Therefore, although both the drive circuits 40 and 40 are slightly different, they are basically the same, and details thereof will become apparent from the following description (see FIGS. 23 to 26), and thus description thereof will be omitted.

In addition, as illustrated in FIG. 22, similarly to the first embodiment, the display portion 11 is provided with m×n pixel circuits 18 arranged in a matrix along the m data signal lines D1 to Dm and the n first scanning signal lines PS11 to PS1$n$. Each pixel circuit 18 corresponds to one of the m data signal lines D1 to Dm and corresponds to one of the n first scanning signal lines PS11 to PS1$n$ (hereinafter, also in the present embodiment, in a case of distinguishing each pixel circuits 18 from another, a pixel circuit corresponding to the i-th first scanning signal line NS1$i$ and the j-th data signal line Dj is referred to as "pixel circuit in the i-th row and the j-th column", and is indicated by a reference sign "Pix(i, j)"). Each pixel circuit 18 also corresponds to one of the n second scanning signal lines PS21 to PS2$n$, corresponds to one of the n third scanning signal lines NS1 to NSn, and corresponds to one of the n light emission control lines EMI to EMn.

Figure 23:
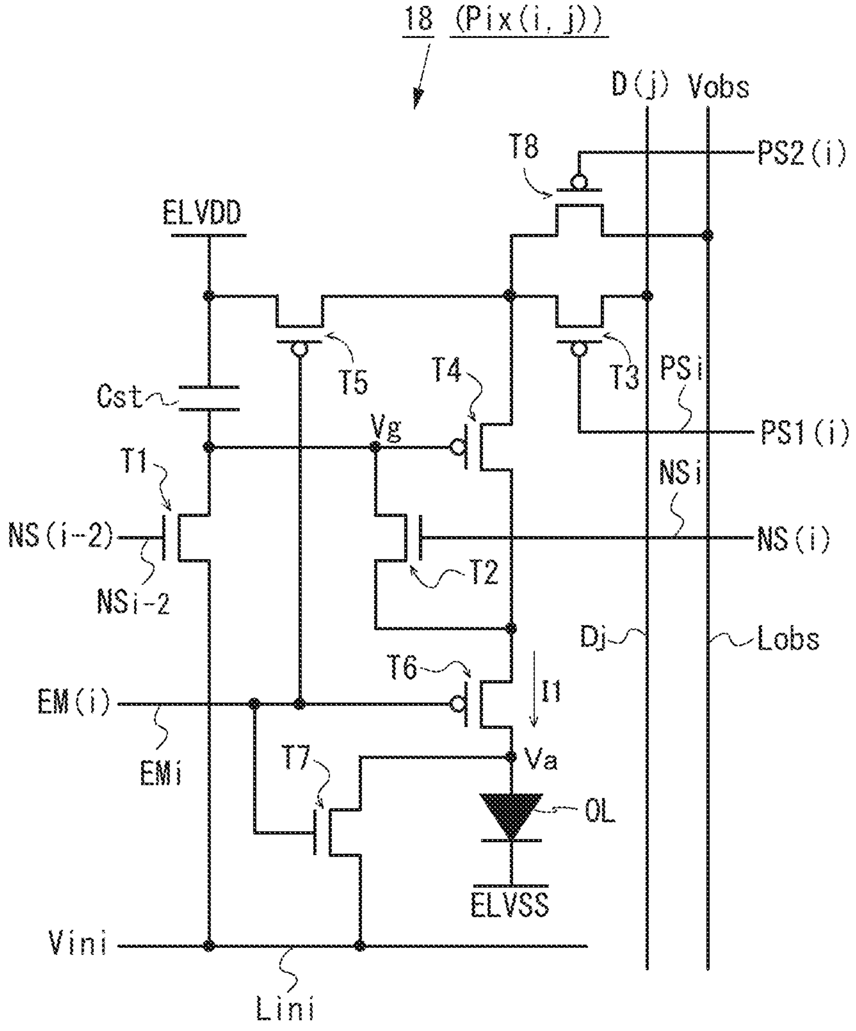
FIG. 23 is a circuit diagram illustrating a configuration of a pixel circuit in the display device according to the fourth embodiment.

FIG. 23 is a circuit diagram showing a configuration of the pixel circuit 18 in the present embodiment, and in more detail, is a circuit diagram showing a configuration of the pixel circuit 18 corresponding to the i-th first scanning signal line NS1$i$ and the j-th data signal line Dj, i.e., the pixel circuit Pix(i, j) in the i-th row and the j-th column ($1 \leq i \leq n$, $1 \leq j \leq m$). Similarly to the pixel circuit 15 in the first embodiment illustrated in FIG. 7, the pixel circuit 18 includes one organic EL element OL as a display element, the first initialization transistor T1, the threshold compensation transistor T2, the write control transistor T3, the driving transistor T4, the first light emission control transistor T6, the second light emission control transistor T5, the bias control transistor T8, and the holding capacitor Cst. The pixel circuit 18 is, however, different from the pixel circuit in the first embodiment in further including a second initialization transistor T7 and including transistors of different conductivity types. Specifically, in the pixel circuit 18, while N-channel oxide TFTs (e.g., IGZO-TFTs) are used for the first initialization transistor T1, the second initialization transistor T7, and the threshold compensation transistor T2, P-channel LTPS-TFTs are used for the driving transistor T4, the write control transistor T3, the first light emission control transistor T6, the second light emission control transistor T5, and the bias control transistor T8.

As illustrated in FIG. 23, connected to the pixel circuit Pix(i, j) according to the present embodiment are a first scanning signal line PS1$i$ corresponding to the pixel circuit (corresponding first scanning signal line), a second scanning signal line PS2$i$ corresponding to the pixel circuit (corresponding second scanning signal line), a third scanning signal line NSi corresponding to the pixel circuit (corresponding third scanning signal line), a light emission control line EMi corresponding to the pixel circuit (corresponding light emission control line), a data signal line Dj corresponding to the pixel circuit (corresponding data signal line), a third scanning signal line preceding by two to the corresponding third scanning signal line NSi (a scanning signal line preceding by two in a scanning order of the third scanning signal lines NS-1 to NSn), i.e., an i-2-th third scanning signal line NSi-2 (which is hereinafter also referred to simply as "preceding third scanning signal line" in the description focusing on the pixel circuit), the initialization voltage line Lini, the on-bias voltage line Lobs, the high level power supply line ELVDD, and the low level power supply line ELVSS.

As illustrated in FIG. 23, in the pixel circuit Pix(i, j) in the present embodiment, the source terminal of the driving transistor T4 is connected to the corresponding data signal line Dj via the write control transistor T3, is connected to the high level power supply line ELVDD via the second light emission control transistor T5, and is connected to the on-bias voltage line Lobs via the bias control transistor T8. A drain terminal of the driving transistor T4 is connected to the anode electrode as a first terminal of the organic EL element OL via the first light emission control transistor T6. The gate terminal as the control terminal of the driving transistor T4 is connected to the high level power supply line ELVDD via the holding capacitor Cst, connected to the drain terminal of the driving transistor via the threshold compensation transistor T2, and connected to the initialization voltage line Lini via the first initialization transistor T1. In addition, the anode electrode of the organic EL element OL is also connected to the initialization voltage line Lini via the second initialization transistor T7, and a cathode electrode as a second terminal of the organic EL element OL is connected to the low level power supply line ELVSS.

Furthermore, in the pixel circuit Pix(i, j) according to the present embodiment, a gate terminal of the write control transistor T3 is connected to the corresponding first scanning signal line PS1$i$, the gate terminal of the bias control transistor T8 is connected to the corresponding second scanning signal line PS2$i$, and the gate terminal of the threshold compensation transistor T2 is connected to the corresponding third scanning signal line NSi. The corresponding light emission control line EMi is connected to the gate terminals of the first light emission control transistor T6, the second light emission control transistor T5, and the second initialization transistor T7, and a preceding third scanning signal line NS(i-2) is connected to the gate terminal of the first initialization transistor T1.

Next, operation in the pixel circuit 18 illustrated in FIG. 23, i.e., the pixel circuit Pix(i, j) in the i-th row and the j-th column in the present embodiment will be described with reference to FIGS. 24 and 25 together with FIG. 23.

Figure 24:
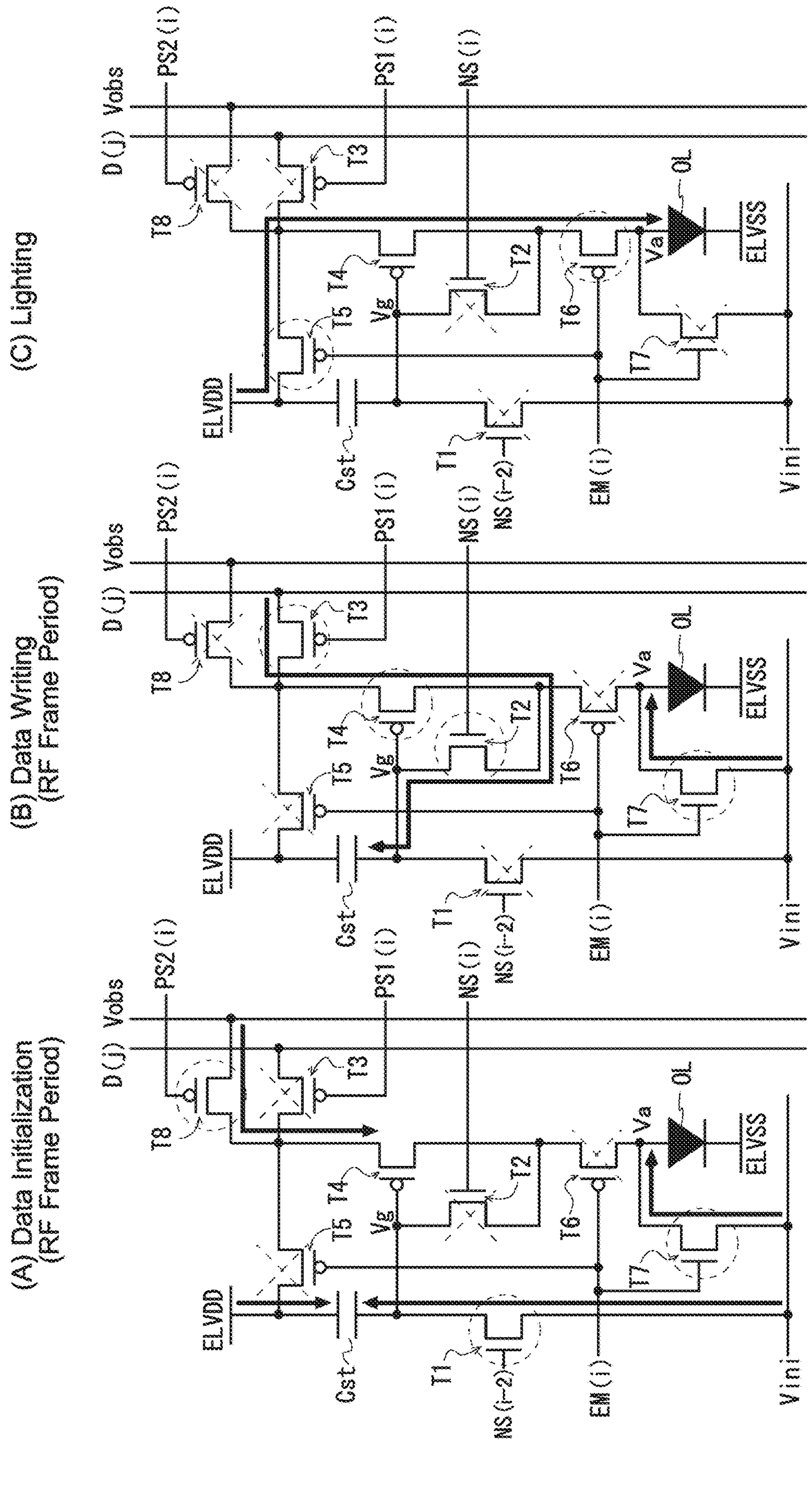
FIG. 24 provides circuit diagrams (A), (B), and (C) for describing data initialization operation, data writing operation, and lighting operation of the pixel circuit in the fourth embodiment.

(A) of FIG. 24 illustrates a circuit state of the pixel circuit Pix(i, j) in the data initialization period Tini in the RF frame period Trf. During the data initialization period Tini, the first initialization transistor T1, the second initialization transistor T7, and the bias control transistor T8 are in ON state, and the write control transistor T3, the threshold compensation transistor T2, the first light emission control transistor T6, and the second light emission control transistor T5 are in OFF state. As a result, the holding capacitor Cst is initialized to the voltage ELVDD-Vini, which is the difference between the high level power supply voltage ELVDD and the initialization voltage Vini, and the voltage Vg of the gate terminal (gate voltage) of the driving transistor T4 is initialized to the initialization voltage Vini. At this time, the initialization voltage Vini is applied to the anode electrode of the organic EL element OL via the second initialization transistor T7 to initialize the anode voltage Va, and the on-bias voltage Vobs is applied to the source terminal of the driving transistor T4 via the bias control transistor T8.

(B) of FIG. 24 illustrates a circuit state of the pixel circuit Pix(i, j) in the data write period Twr in the RF frame period Trf. During this data write period Twr, the write control transistor T3, the threshold compensation transistor T2, and the second initialization transistor T7 are in ON state, and the first initialization transistor T1, the first light emission control transistor T6, the second light emission control transistor T5, and the bias control transistor T8 are in OFF state. As a result, the voltage of the corresponding data signal line Dj is written as the data voltage Vdata into the holding capacitor Cst via the driving transistor T4 that is brought into the diode connected state by the threshold compensation transistor T2 in ON state, and a voltage corresponding to a difference |Vdata−ELVDD| between the data voltage and the high level power supply voltage ELVDD(to be precise, a voltage |Vdata+Vth−ELVDD| corresponding to a difference between a data voltage subjected to the threshold compensation and the high level power supply voltage ELVDD) is held in the holding capacitor Cst (Vth<0). Also in the data write period Twr, the initialization voltage *Vini* is applied to the anode electrode of the organic EL element OL by the second initialization transistor T7 in ON state.

(C) of FIG. 24 illustrates a circuit state of the pixel circuit Pix(i, j) in the light emission period Tem in the RF frame period Trf and the NRF frame period Tnrf. During the light emission period Tem, the first light emission control transistor T6 and the second light emission control transistor T5 are in ON state, and the write control transistor T3, the threshold compensation transistor T2, the first initialization transistor T1, the second initialization transistor T7, and the bias control transistor T8 are in OFF state. As a result, a current I1 of an amount corresponding to a voltage held in the holding capacitor Cst flows from the high level power supply line ELVDD to the low level power supply line ELVSS via the second light emission control transistor T5, the driving transistor T4, the first light emission control transistor T6, and the organic EL element OL, so that the organic EL element OL emits light with luminance corresponding to the current I1.

Figure 25:
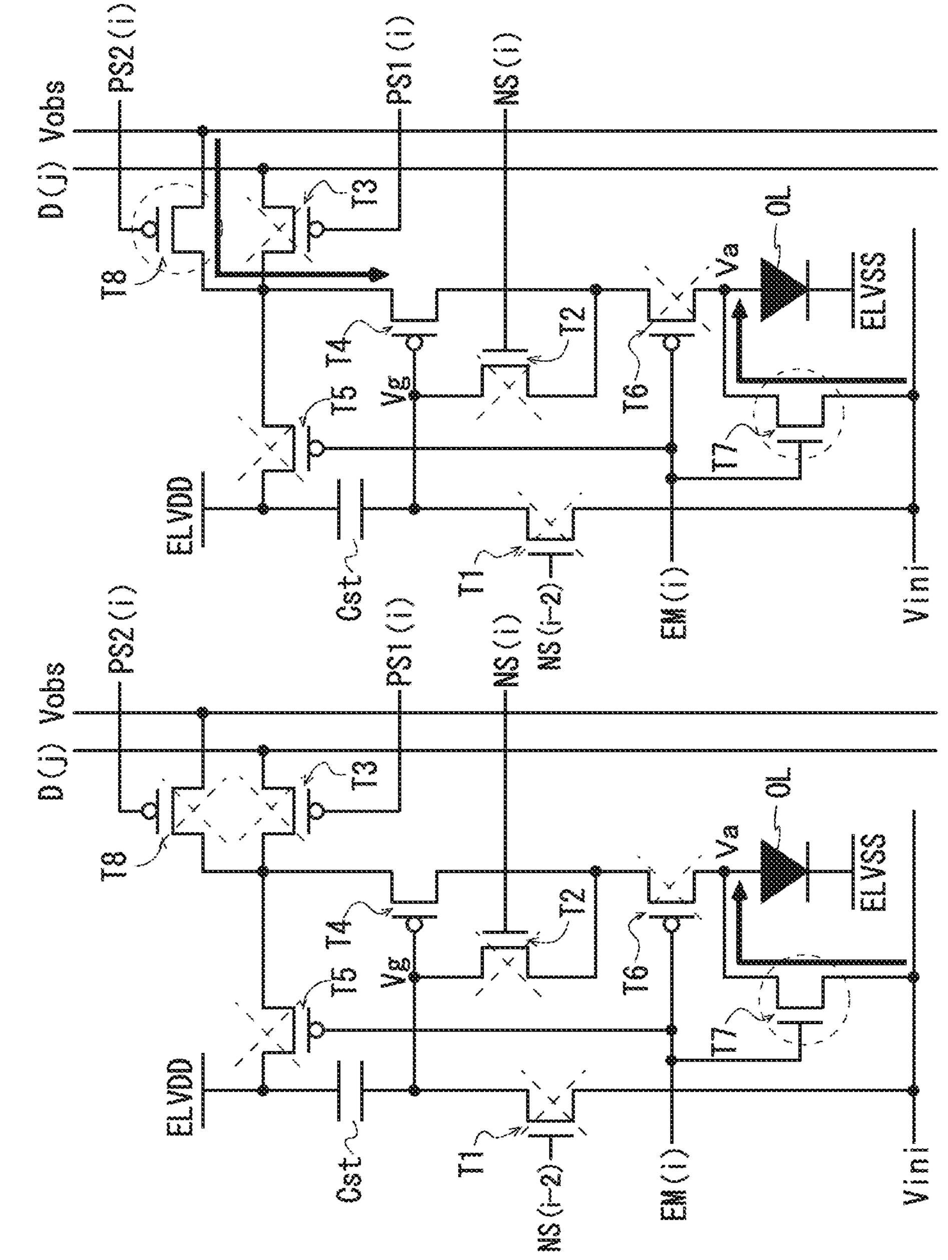
FIG. 25 provides circuit diagrams (A) and (B) for describing anode initialization operation and on-bias application operation of the pixel circuit in the fourth embodiment.

(A) of FIG. 25 illustrates a circuit state of the pixel circuit Pix(i, j) in the anode initialization period Tanr in the NRF frame period Tnrf. During the anode initialization period Tanr, the second initialization transistor T7 is in ON state, and the first light emission control transistor T6, the second light emission control transistor T5, the threshold compensation transistor T2, the first initialization transistor T1, the write control transistor T3, and the bias control transistor T8 are in OFF state. As described above, in the anode initialization period Tanr in the present embodiment, unlike the circuit state ((B) of FIG. 4) in the anode initialization period Tanr(i) in the above comparative example, the write control transistor is in OFF state, and the second initialization transistor T7 is in ON state. As a result, the voltage Vini of the initialization voltage line Lini is applied as the anode initialization voltage Vanr to the anode electrode of the organic EL element OL via the second initialization transistor T7 to initialize the anode voltage Va of the organic EL element OL.

(B) of FIG. 25 illustrates a circuit state of the pixel circuit Pix(i, j) in the on-bias period Tobs in the NRF frame period Tnrf. During the on-bias period Tobs, the bias control transistor T8 and the second initialization transistor T7 are in ON state, and the first light emission control transistor T6, the second light emission control transistor T5, the write control transistor T3, the threshold compensation transistor T2, and the first initialization transistor T1 are in OFF state. This brings the on-bias voltage Vobs to be applied from the bias voltage line Lobs to the source terminal of the driving transistor T4 via the bias control transistor T8 in order to reduce an influence of the hysteresis characteristic of the driving transistor T4 on display luminance. Also in the on-bias period Tobs, the voltage Vini of the initialization voltage line Lini is applied as the anode initialization voltage Vanr to the anode electrode of the organic EL element OL via the second initialization transistor T7.

Figure 26:
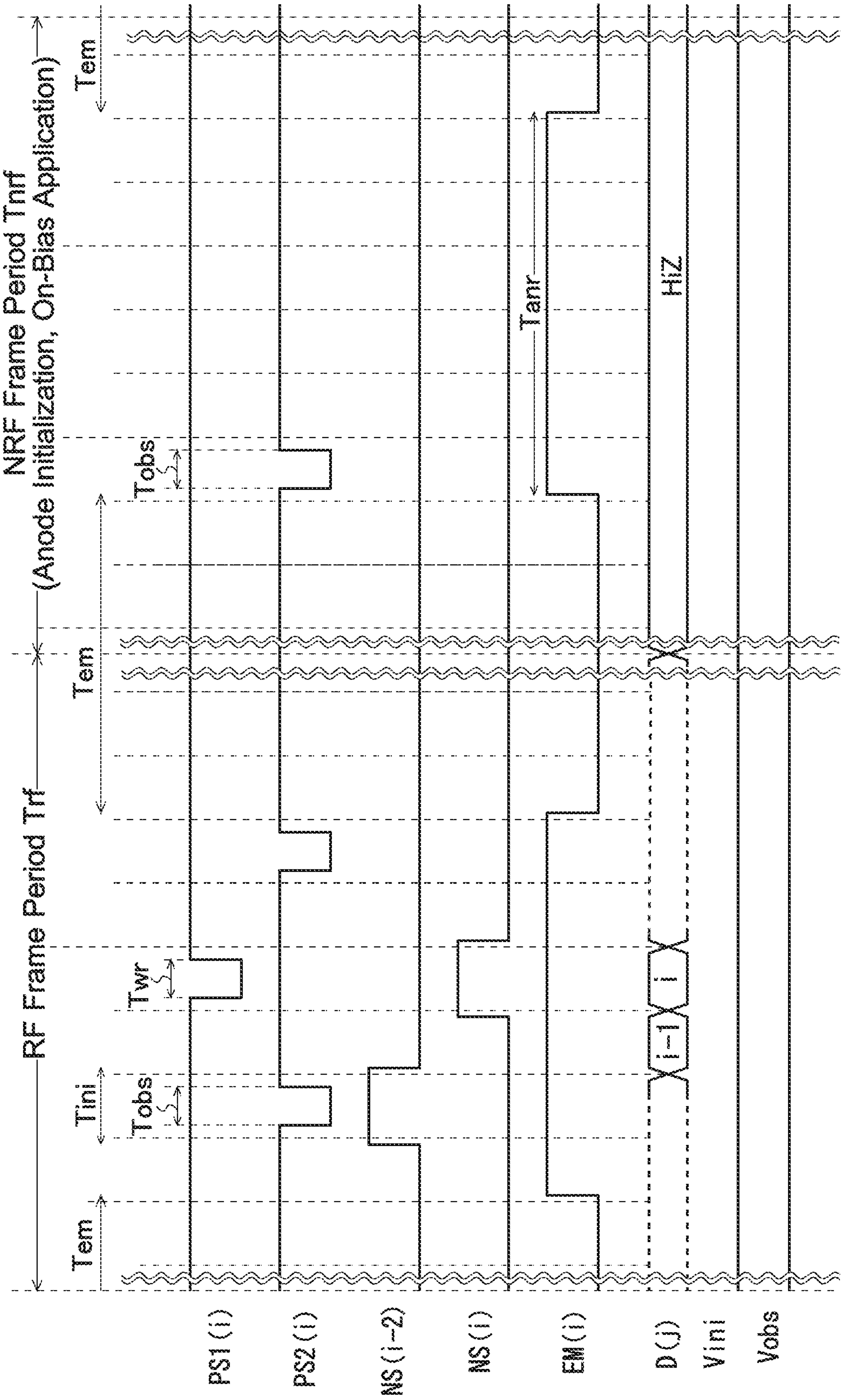
FIG. 26 is a timing chart for describing driving of the pixel circuit in the fourth embodiment.

FIG. 26 is a timing chart for describing a drive example for operating each pixel circuit Pix(i, j) in the present embodiment in a manner as illustrated in FIGS. 24 and 25, and illustrates changes in drive signals in the drive example, i.e., changes in a first scanning signal PS1(*i*), a second scanning signal PS2(*i*), a third scanning signal NS(i), a preceding third scanning signal NS(i-2), a light emission control signal EM(i), and the data signal D(j). Note that the voltage Vini (=Vanr) of the initialization voltage line Lini and the voltage Vobs of the on-bias voltage line Lobs are fixed voltages.

In the present embodiment, as a result of the changes of the drive signals in the RF frame period Trf in the manner as illustrated in FIG. 26, the first scanning signal lines PS11 to PS1*n*, the second scanning signal lines PS21 to PS2*n*, the third scanning signal lines NS-1 to NSn, and the light emission control lines EM1 to EMn are selectively driven, and data voltages to be written in the pixel circuits Pix(i, 1) to Pix(i, m) are respectively applied to the data signal lines D1 to Dm (i=1 to n). By such drive signals, the holding capacitor Cst in the pixel circuit Pix(i, j) is initialized (data initialization) in the data initialization period Tini (see (A) of FIG. 24), and the voltage of the data signal D(j) is written as the data voltage Vdata to the pixel circuit Pix(i, j) in the data write period Twr(see (B) of FIG. 24). Note that, in the present embodiment, as illustrated in (A) of FIG. 24, in the data initialization period Tini, the anode voltage Va is also initialized by the second initialization transistor T7 in ON state, and furthermore, the on-bias voltage Vobs is applied to the source terminal of the driving transistor T4 by the bias control transistor T8 in ON state. Therefore, the data initialization period Tini is also the anode initialization period Tanr, and the data initialization period Tini includes the on-bias period Tobs.

In addition, in the present embodiment, as a result of the changes of the drive signals in the NRF frame period Tnrf in the manner as illustrated in FIG. 26, the first scanning signal lines PS11 to PS1*n*, the second scanning signal lines PS21 to PS2*n*, the third scanning signal lines NS-1 to NSn, and the light emission control lines EM1 to EMn are selectively driven, and the data signal lines D1 to Dm are maintained in the high impedance state. By such drive signals, the on-bias period Tobs and the anode initialization period Tanr are provided in the NRF frame period Inrf for each pixel circuit Pix(i, j).

In the on-bias period Tobs, the on-bias voltage Vobs is applied from the on-bias voltage line Lobs to the source terminal of the driving transistor T4 via the bias control transistor T8, and the voltage *Vini* of the initialization voltage line Lini is applied as the anode initialization voltage Vanr to the anode electrode of the organic EL element OL via the second initialization transistor T7 (see (B) of FIG. 25). As described above, in the drive example illustrated in FIG. 26, the on-bias period Tobs in the NRF frame period Tnrf is included in the anode initialization period Tanr.

In the anode initialization period Tanr in the NRF frame period Tnrf, during a period that does not overlap with the on-bias period Tobs, while the second initialization transistor T7 is in ON state, the bias control transistor T8 is in OFF state in the pixel circuit Pix(i, j). Therefore, although the initialization voltage Vini is applied to the anode electrode of the organic EL element OL, the on-bias voltage Vobs is not applied to the source terminal of the driving transistor T4 (see (A) of FIG. 25).

As described above, in the present embodiment, the on-bias voltage Vobs and the anode initialization voltage Vanr are applied to each pixel circuit Pix(i, j) from the on-bias voltage line Lobs and the initialization voltage line Lini provided separately from the data signal line Dj, (see FIG. 25). Therefore, similarly to the first embodiment, at the time of switching the operation mode, in the pixel circuits Pix(1, j) to Pix(n, j) in the same column, the pixel circuit Pix(i1, j) to which data is written as illustrated in (B) of FIG. 24 and the pixel circuit Pix(i2, j) in which the anode initialization or the on-bias application is performed as illustrated in FIG. can be mixed (see the overlap period Tov in FIGS. 14 to 16). As a result, according to the present embodiment, in a case where the variable refresh rate system is adopted in order to reduce power consumption in still image display or the like in a current drive system display device such as an organic EL display device, it is possible to obtain the same effect as that of the first embodiment.

Furthermore, according to the present embodiment, in the on-bias period Tobs, the voltage Vobs of the on-bias voltage line Lobs is applied to the source terminal of the driving transistor T4 via the bias control transistor T8, and in the anode initialization period Tanr, the voltage *Vini* of the initialization voltage line Lini is applied as the anode initialization voltage Vanr to the anode electrode of the organic EL element OL via the second initialization transistor T7 (see FIG. 25). Therefore, similarly to the third embodiment (see FIGS. 19 to 20), it is possible to individually select suitable voltage values for the on-bias voltage Vobs to reduce an influence of the hysteresis characteristic of the driving transistor T4 on display luminance and for the anode initialization voltage Vanr to block an influence of the past display history by initializing the anode voltage Va.

Furthermore, in the present embodiment, among the transistors included in each pixel circuit 18, an oxide TFT such as an IGZO-TFT having a small off-leakage current is used for the threshold compensation transistor T2, the first initialization transistor T1, and the second initialization transistor T7, and an LTPS-TFT having a small on-resistance is used for the driving transistor T4, the first light emission control transistor T6, the second light emission control transistor T5, and the write control transistor T3. This makes it possible to perform excellent display not only in the case of operating at the high refresh rate but also in the case of operating at the low refresh rate.

5. Fifth Embodiment

In the first to fourth embodiments, in order to make it possible to mix, in the pixel circuits Pix(1, j) to Pix(n, j) in the same column, the pixel circuit Pix(i1, j) to which data is written and the pixel circuit Pix(i2, j) in which the on-bias application is performed (1≤i1<i2≤n), the display device is configured such that the on-bias voltage Vobs is applied to each pixel circuit Pix(i, j) from the voltage line (the on-bias voltage line Lobs or the initialization voltage line Lini) provided separately from the data signal lines D1 to Dm (see (B) of FIG. 9, (C) of FIG. 18, (C) of FIG. 20, and (B) of FIG. 25). By contrast, a display device according to a fifth embodiment is configured such that while the on-bias voltage Vobs is applied from the data signal lines D1 to Dm to each pixel circuit Pix(i, j), in the pixel circuits Pix(1, j) to Pix(n, j) in the same column, the pixel circuit Pix(i1, j) to which data is written and the pixel circuit Pix(i2, j) in which the on-bias application is performed can be mixed. In the following, such fifth embodiment will be described with reference to FIGS. 27 to 30. Note that an overall configuration of the display device according to the fifth embodiment is basically the same as that of the display device according to the fourth embodiment (FIG. 22, FIG. 23) except that neither the on-bias voltage line Lobs nor the bias control transistor T8 is provided, and that a multiplexer MXj (j=1 to m) to be described later is provided. Therefore, the same or corresponding parts are denoted by the same reference signs and detailed description thereof is omitted.

Figure 27:
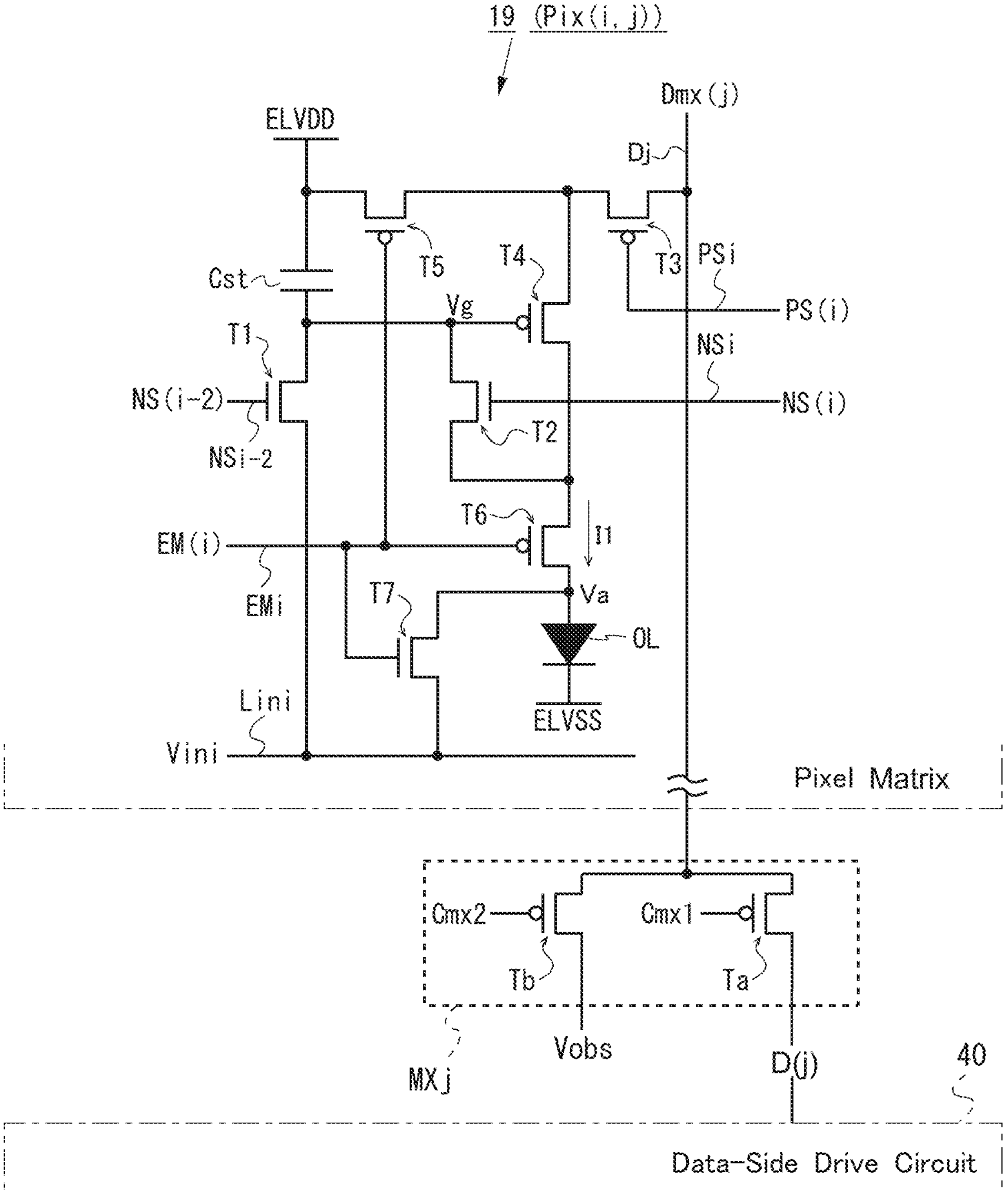
FIG. 27 is a circuit diagram illustrating a configuration of a pixel circuit in a display device according to a fifth embodiment.

FIG. 27 is a circuit diagram illustrating a configuration of a pixel circuit 19 in the display device 10*b* according to the present embodiment, and in more detail, is a circuit diagram illustrating a configuration of the pixel circuit 19 corresponding to the i-th first scanning signal line PS1*i* and the j-th data signal line Dj, i.e., the pixel circuit Pix(i, j) in the i-th row and the j-th column (1≤i≤n, 1≤j≤m). Similarly to the pixel circuit 18 in the fourth embodiment illustrated in FIG. 23, the pixel circuit 19 includes one organic EL element OL as a display element, the first initialization transistor T1, the threshold compensation transistor T2, the write control transistor T3, the driving transistor T4, the first light emission control transistor T6, the second light emission control transistor T5, the second initialization transistor T7, and the holding capacitor Cst. Note that the pixel circuit 19 does not include the bias control transistor T8. In addition, similarly to the pixel circuit 18 in the fourth embodiment, among the transistors T1 to T7, while N-channel oxide TFTs (e.g., IGZO-TFTs) are used for the first initialization transistor T1, the second initialization transistor T7, and the threshold compensation transistor T2, P-channel LTPS-TFTs are used for the driving transistor T4, the write control transistor T3, the first light emission control transistor T6, and the second light emission control transistor T5.

As shown in FIG. 27, connected to the pixel circuit 19 (Pix(i, j)) in the present embodiment in a similar form to the pixel circuit 18 (FIG. 23) in the fourth embodiment are: a P-type scanning signal line PSi corresponding to the pixel circuit (corresponding P-type scanning signal line); an N-type scanning signal line NSi corresponding to the pixel circuit (corresponding N-type scanning signal line); the light emission control line EMi corresponding to the pixel circuit (corresponding light emission control line); the data signal line Dj corresponding to the pixel circuit (corresponding data signal line); an N-type scanning signal line preceding the corresponding N-type scanning signal line NSi by two (which is hereinafter also referred to simply as "preceding N-type scanning signal line" in the description focusing on the pixel circuit); the initialization voltage line Lini; the high level power supply line ELVDD; and the low level power supply line ELVSS. Note that the P-type scanning signal line PSi and the N-type scanning signal line NSi in the present embodiment correspond to the first scanning signal line PS1*i* and the third scanning signal line NSi in the fourth embodiment, respectively, and no signal line corresponding to the second scanning signal line PS2*i* is provided in the present embodiment.

Figure 29:
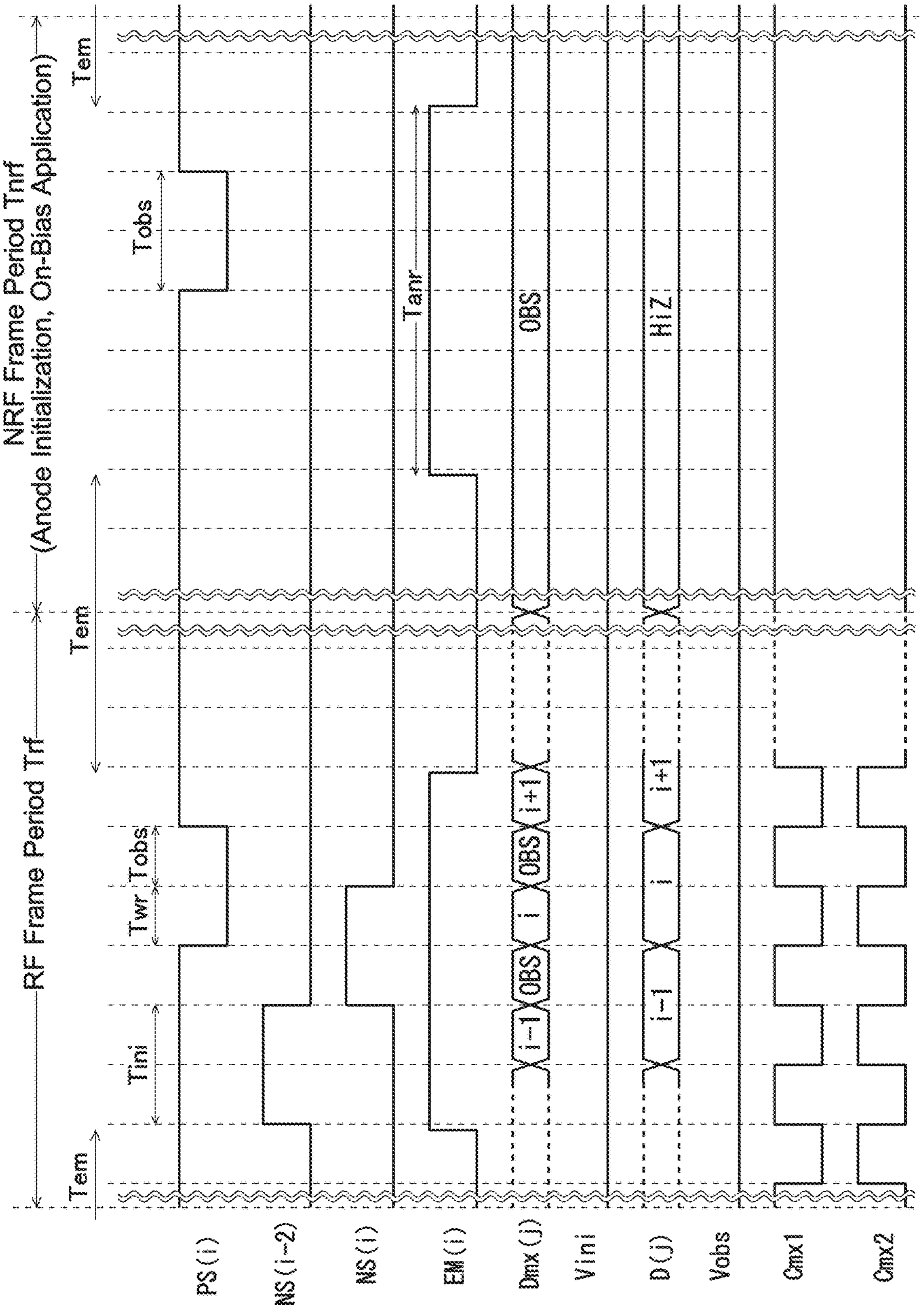
FIG. 29 is a timing chart for describing driving of the pixel circuit in the fifth embodiment.

Furthermore, in the present embodiment, as illustrated in FIG. 27, for each data signal line Dj, there is provided a multiplexer MX j to configured perform time-division multiplexing of the data signal D(j) and the on-bias voltage Vobs and output the obtained result to each data signal line (j=1 to m). Here, although each multiplexer MXj is disposed between a pixel matrix including n×m pixel circuits Pix(1,1) to Pix(n, m) in the display portion 11 and the data-side drive circuit 30, each multiplexer MXj may be provided in the data-side drive circuit 30 instead. The multiplexer MXj includes a first selection transistor Ta and a second selection transistor Tb which are two P-channel transistors operating as switching elements. First conductive terminals of the first and second selection transistors Ta and Tb are connected to the corresponding data signal line Dj, the data signal D(j) is applied from the data-side drive circuit 30 to a second conductive terminal of the first selection transistor Ta, and the on-bias voltage Vobs is applied to a second conductive terminal of the second selection transistor Tb. In addition, a first multiplexing control signal Cmx1 and a second multiplexing control signal Cmx2 as illustrated in FIG. 29 are generated by the display control circuit 20 and respectively applied to gate terminals of the first selection transistor Ta and the second selection transistor Tb in each multiplexer MXj. As a result, in the RF frame period Trf, a signal Dmx (j) (hereinafter referred to as "on-bias multiplexed data signal") obtained by time-division multiplexing the data signal D(j) output from the data-side drive circuit 30 and the on-bias voltage Vobs generated by the display control circuit 20 is applied from the multiplexer MXj to the data signal line Dj (j=1 to m), and in the NRF frame period Inrf, the on-bias voltage Vobs is applied to the data signal line Dj (details will be described later with reference to FIG. 29). Note that, in the following description, for convenience, it is assumed that the on-bias multiplexed data signal Dmx (j) is applied to the data signal line Dj also in the NRF frame period Inrf, and that a voltage of the on-bias multiplexed data signal Dmx (j) is maintained at the on-bias voltage Vobs also in the NRF frame period Tnrf.

Next, operation in the pixel circuit 19 illustrated in FIG. 27, i.e., the pixel circuit Pix(i, j) in the i-th row and the j-th column in the present embodiment will be described with reference to FIG. 28 together with FIG. 27. Note that here, only main operation of the pixel circuit Pix(i, j) in the present embodiment will be described, and the remaining operation will be described later with reference to FIG. 29.

Figure 28:
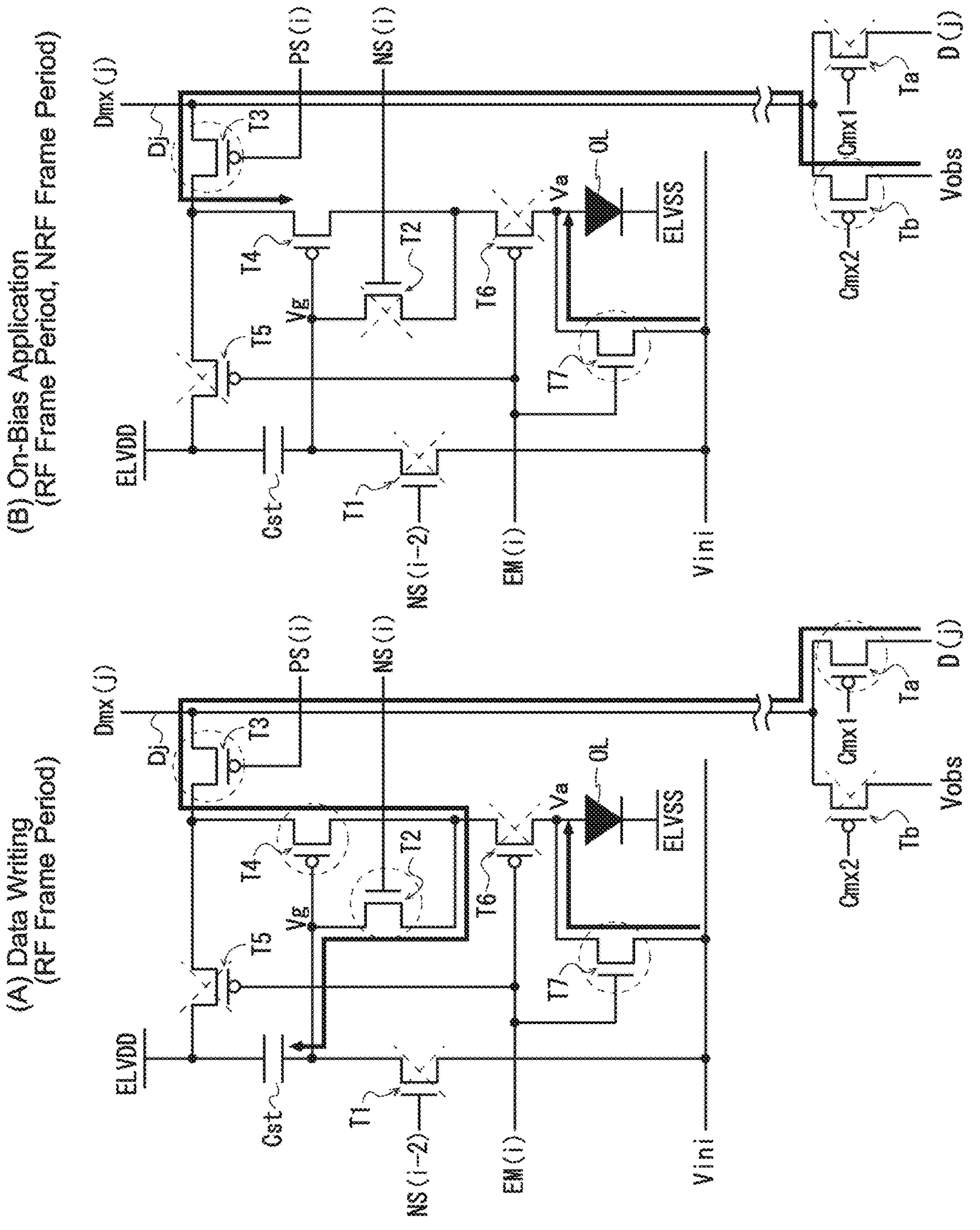
FIG. 28 provides circuit diagrams (A) and (B) for describing data writing operation and on-bias application operation of the pixel circuit in the fifth embodiment.

(A) of FIG. 28 illustrates a circuit state of the pixel circuit Pix(i, j) in the data write period Twr in the RF frame period Trf. During this data write period Twr, the write control transistor T3, the threshold compensation transistor T2, and the second initialization transistor T7 are in ON state, and the first initialization transistor T1, the first light emission control transistor T6, the second light emission control transistor T5, and the bias control transistor T8 are in OFF state. In addition, in the multiplexer MXj connected to the corresponding data signal line Dj, the first selection transistor Ta is in ON state and the second selection transistor Tb is in OFF state. Therefore, in the data write period Twr, the data signal D(j) is applied from the data-side drive circuit to the corresponding data signal line Dj via the first selection transistor Ta, the voltage of the data signal D(j), which is the voltage of the corresponding data signal line Dj, is written as the data voltage Vdata to the holding capacitor Cst via the driving transistor T4 that is brought into the diode connected state by the threshold compensation transistor T2 in ON state, and the voltage corresponding to the difference |Vdata-ELVDD| between the data voltage and the high level power supply voltage ELVDD(to be precise, the voltage |Vdata+Vth-ELVDD| corresponding to the difference between the data voltage subjected to the threshold compensation and the high level power supply voltage ELVDD) is held in the holding capacitor Cst. In the data write period Twr, the voltage Va of the anode electrode of the organic EL element OL is also initialized by the initialization transistor T1 in ON state.

(B) of FIG. 28 illustrates a circuit state of the pixel circuit Pix(i, j) in the on-bias period Tobs in the RF frame period Trf and the NRF frame period Tnrf. During the on-bias period Tobs, the write control transistor T3 and the second initialization transistor T7 are in ON state, and the first light emission control transistor T6, the second light emission control transistor T5, the threshold compensation transistor T2, and the initialization transistor T1 are in OFF state. In addition, in the multiplexer MXj connected to the corresponding data signal line Dj, the first selection transistor Ta is in OFF state and the second selection transistor Tb is in ON state. Therefore, in the on-bias period Tobs, the on-bias voltage Vobs applied to the corresponding data signal line Dj via the second selection transistor Tb is applied to the source terminal of the driving transistor T4 via the write control transistor T3. In the on-bias period Tobs, the voltage Va of the anode electrode of the organic EL element OL is also initialized by the initialization transistor T1 in ON state.

FIG. 29 is a timing chart for describing a drive example for operating each pixel circuit Pix(i, j) in the present embodiment in a manner as illustrated in FIG. 28, and illustrates changes in drive signals in the drive example, i.e., changes in the P-type scanning signal PS(i), the N-type scanning signal NS(i), the preceding N-type scanning NS(i-2), the light emission control signal EM(i), the on-bias multiplexed data signal Dmx (j), and the data signal D(j). Note that the voltage Vini (=Vanr) of the initialization voltage line Lini and the voltage Vobs are fixed voltages.

In the present embodiment, as a result of the changes of the drive signals in the RF frame period Trf in the manner as illustrated in FIG. 29, the P-type scanning signal lines PS1 to PSn, the N-type scanning signal lines NS-1 to NSn, and the light emission control lines EM1 to EMn are selectively driven, and the on-bias multiplexed data signal Dmx (j) generated by the multiplexer MXj using the first multiplexing control signal Cmx1 and the second multiplexing control signal Cmx2 is applied to each data signal line Dj. By such drive signals, as illustrated in FIG. 29, the data initialization period Tini, the data write period Twr, and the on-bias period Tobs are provided in the RF frame period Trf for each pixel circuit Pix(i, j).

In such RF frame period Trf, in the data initialization period Tini, the pixel circuit Pix(i, j) operates similarly to the fourth embodiment (see (A) of FIG. 24), whereby the holding capacitor Cst is initialized (data initialization). In the data write period Twr, the pixel circuit Pix(i, j) and the multiplexer MXj operate in the manner as illustrated in (A) of FIG. 28, and accordingly, the voltage of the data signal D(j) is written as the data voltage Vdata to the pixel circuit Pix(i, j). In the on-bias period Tobs, the pixel circuit Pix(i, j) and the multiplexer MXj operate in the manner as illustrated in (B) of FIG. 28, whereby the on-bias voltage Vobs is applied from the corresponding data signal line Dj to the source terminal of the driving transistor T4 in the pixel circuit Pix(i, j). Note that since in the data initialization period Tini, the data write period Twr, and the on-bias period Tobs, the corresponding light emission control signal EM(i) is at H level and the second initialization transistor T7 is in ON state, the anode voltage Va of the organic EL element OL is also initialized.

Also in the present embodiment, as a result of the changes of the drive signals in the NRF frame period Inrf in the manner as illustrated in FIG. 29, the P-type scanning signal lines PS1 to PSn and the light emission control lines EM1 to EMn are selectively driven, the N-type scanning signal lines NS-1 to NSn are maintained in a non-selected state (N-type scanning signals NS(-1) to NS(n) are maintained at L level), and the data signal lines D1 to Dm are maintained in the high impedance state. By such drive signals, the on-bias period Tobs and the anode initialization period Tanr are provided in the NRF frame period Inrf for each pixel circuit Pix(i, j) as illustrated in FIG. 29.

In such NRF frame period Tnrf, in the on-bias period Tobs, the pixel circuit Pix(i, j) and the multiplexer MXj operate in the manner as illustrated in (B) of FIG. 28, whereby the on-bias voltage Vobs is applied from the corresponding data signal line Dj to the source terminal of the driving transistor T4 in the pixel circuit Pix(i, j). Note that, in the NRF frame period Tnrf, as illustrated in FIG. 29, the on-bias period Tobs is included in the anode initialization period Tanr, and in the on-bias period Tobs, the anode voltage Va of the organic EL element OL is also initialized. In the anode initialization period Tanr in the NRF frame period Inrf, during a period that does not overlap with the on-bias period Tobs, the pixel circuit Pix(i, j) operates similarly to the fourth embodiment (see (A) of FIG. 25), whereby the anode voltage Va of the organic EL element OL is initialized.

Note that, in the light emission period Tem provided in the RF frame period Trf and the NRF frame period Tnrf as illustrated in FIG. 29, the pixel circuit Pix(i, j) operates similarly to the above-described fourth embodiment (see (C) of FIG. 24), whereby the current I1 of the amount corresponding to the voltage held in the holding capacitor Cst flows from the high level power supply line ELVDD to the low level power supply line ELVSS via the second light emission control transistor T5, the driving transistor T4, the first light emission control transistor T6, and the organic EL element OL, so that the organic EL element OL emits light with luminance corresponding to the current I1.

Next, an operation example in a case where the operation mode is switched from the low refresh mode to the high refresh mode in the present embodiment will be described with reference to FIG. 30 in addition to FIGS. 28 and 29. In the present operation example, it is assumed that the display device according to the present embodiment is configured such that the refresh rate can be changed on a ½ frame period basis.

Figure 30:
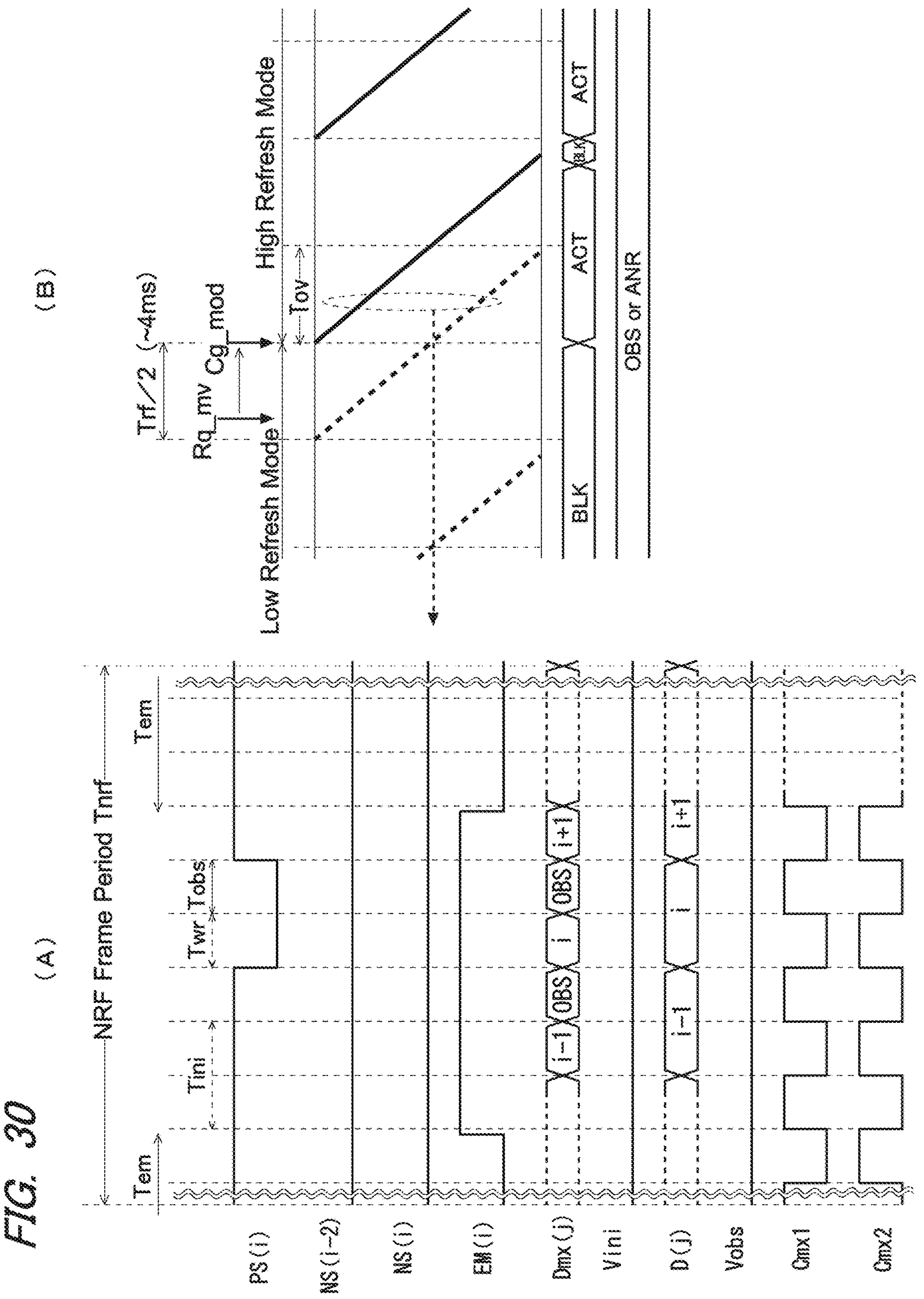
FIG. 30 provides timing charts (A) and (B) for describing driving of the pixel circuit when switching an operation mode (refresh rate) in the fifth embodiment.

FIG. 30 is a timing chart for describing driving of the pixel circuit when switching the operation mode from the low refresh mode to the high refresh mode in the present embodiment. In more detail, (A) of FIG. 30 is a timing chart for describing driving in a second half of a last NRF frame period (overlap period Tov to be described later) of the pixel circuit 19 operating in the low refresh mode, and (B) of FIG. 30 is a timing chart illustrating an operation example of the display device when the operation mode (refresh rate) is switched from the low refresh mode to the high refresh mode in the present embodiment.

(B) of FIG. 30 illustrates operation of the display device in a case where the refresh request Rq_mv for moving image display occurs within a first half period of a certain NRF frame period Tnrf when operating in the low refresh mode in which the RF frame period Trf is followed by a plurality of NRF frame periods Tnrf. Since the display device in the present embodiment is configured such that the refresh rate can be changed in on a ½ frame period basis, in this case, the operation mode of the display device is switched to the high refresh mode at the end time point Cg_mod of the first half period of the NRF frame period Tnrf. In other words, the RF frame period Trf starts at the end time point, and the RF frame period Trf continues while the operation is performed in the high refresh mode.

As illustrated in (B) of FIG. 30, in the present operation example, although the refresh request Rq_mv for moving image display is generated in the first half period of the NRF frame period Inrf, and the operation mode is switched to the high refresh mode at the end time point Cg_mod of the first half period, the on-bias application performed in the first half period is also performed in a second half period of the NRF frame period Tnrf. In other words, as illustrated in (B) of FIG. 30, the second half period of the NRF frame period Tnrf and a first half period of a first RF frame period Trf after the operation mode is switched overlap with each other. In the overlap period Tov, in the pixel circuits Pix(1, j) to Pix(n, j) in the same column, the pixel circuit Pix(i1, j) to which data is written and the pixel circuit Pix(i2, j) in which the on-bias application is performed are mixed (1≤i1<i2≤n).

Specifically, in the overlap period Tov, the drive signals of the pixel circuits Pix(i, j) to which data is written among the pixel circuits Pix(1, j) to Pix(n, j) in the same column, i.e., the P-type scanning signal PS(i), the N-type scanning signal NS(i), the preceding N-type scanning signal NS(i-2), the light emission control signal EM(i), and the on-bias multiplexed data signal Dmx (j) change as already described (see the drive signals in the RF frame period Trf in FIG. 29). This causes data initialization and data writing to be performed on the pixel circuit Pix(i, j) similarly to the ordinary RF frame period Trf.

Furthermore, in the overlap period Tov, the drive signals of the pixel circuits Pix(i, j) in which the on-bias application is performed among the pixel circuits Pix(1, j) to Pix(n, j) in the same column, i.e., the P-type scanning signal PS(i) and the light emission control signal EM(i) change in the manner as illustrated in (A) of FIG. 30, and the N-type scanning signal NS(i) and the preceding N-type scanning signal NS(i-2) are maintained at L level (inactive state). Note that, in the NRF period Inrf, in the period Tov overlapping the RF frame period Trf, unlike the ordinary NRF frame period Inrf, the pixel circuit Pix(i1, j) to which data is written and the pixel circuit Pix(i2, j) in which the on-bias application is performed are mixed in the pixel circuits Pix(1, j) to Pix(n, j) in the same column. Therefore, by operation of the multiplexer MXj based on the first and second multiplexing control signals Cmx1 and Cmx2 illustrated in (A) of FIG. 30, the on-bias multiplexed data signal Dmx (j), which is a signal obtained by time-division multiplexing the on-bias voltage Vobs and the data signal D(j), is applied to the data signal line Dj. However, since among the pixel circuits (1, j) to Pix(n, j) in the same column, for the pixel circuit Pix(i2, j) in which bias application is performed, a N-type scanning signal NS(i2) and a preceding N-type scanning signal NS(i2-2) are maintained at L level, neither data initialization nor data writing is performed, and the on-bias voltage Vobs is applied to the driving transistor T4 in the on-bias period Tobs. Note that in the on-bias period Tobs, since the light emission control line EM (j) is at H level, in the pixel circuit Pix(i2, j), the initialization voltage *Vini* is applied to the anode electrode of the organic EL element OL via the second initialization transistor T7 in ON state, and the anode voltage Va is also initialized (see (B) of FIG. 28).

As described above, in the present embodiment, the on-bias multiplexed data signal Dmx (j), which is a signal obtained by time-division multiplexing the on-bias voltage Vobs and the data signal D(j), is applied to the data signal line Dj (see (A) of FIG. 30). Therefore, the pixel circuit Pix(i1, j) to which data is written as shown in (A) of FIG. 28 and the pixel circuit Pix(i2, j) in which the on-bias application is performed as shown in (B) of FIG. 28 at the time of switching the operation mode can be mixed in the pixel circuits Pix(1, j) to Pix(n, j) in the same column, without providing a voltage line for supplying the on-bias voltage Vobs to the pixel circuit Pix(i, j) separately from the data signal line Dj (see the overlap period Tov in (B) of FIG. 30). In this manner, in the overlap period Tov, the on-bias application in the NRF frame period and the data writing in the RF frame period are performed concurrently based on the on-bias multiplexed data signal Dmx (j). Therefore, according to the present embodiment, in a case where the variable refresh rate system is adopted in order to reduce power consumption in still image display or the like in a current drive system display device such as an organic EL display device, it is possible to obtain the same effect as that of the first embodiment without providing a voltage line for supplying the on-bias voltage Vobs separately from the data signal line Dj.

Furthermore, according to the present embodiment, unlike the first to fourth embodiments in which the on-bias voltage Vobs is applied to the driving transistor T4 in the pixel circuit Pix(i, j) via the bias control transistor T8, the on-bias voltage Vobs is applied to the driving transistor T4 from the corresponding data signal line Dj via the write control transistor T3 (see (B) of FIG. 28). In other words, in the present embodiment, the write control transistor T3 constitutes a bias application circuit, and the bias control transistor T8 is unnecessary (see FIG. 27). Therefore, an effect similar to those of the first embodiment and the like can be obtained without increasing the number of elements in the pixel circuit Pix(i, j). Furthermore, since the on-bias multiplexed data signal Dmx (j), which is a signal obtained by time-division multiplexing the on-bias voltage Vobs and the data signal D(j), is applied to the data signal line Dj, suitable voltage values can be independently selected for the on-bias voltage Vobs and the voltage *Vini* for anode initialization.

6. Variants

The disclosure is not limited to the above embodiments, and various modifications can be made without departing from the scope of the disclosure. For example, possible variants are as follows.

Although in the display device according to each of the above embodiments, the pixel circuit Pix(i, j) of the internal compensation system is used (FIGS. 7, 17, 19, 23, and 27), the disclosure is not limited to a display device using a pixel circuit of an internal compensation system. Specifically, even in a display device using a pixel circuit that is not of an internal compensation system, as long as it is a current drive type display device of the VRR system configured to control a drive current of a display element such as an organic EL element by a driving transistor, it is possible to obtain an effect similar to that of each of the above embodiments by incorporating the same configuration as that of each of the above embodiments regarding on-bias application at the time of switching the operation mode from the low refresh mode to the high refresh mode.

In the first to fifth embodiments, the pixel circuit Pix(i, j) is configured using only the N-channel transistors or using both the N-channel transistor and the P-channel transistor (FIGS. 7, 17, 19, 23, and 27). Note that the combination of the N-channel transistor and the P-channel transistor in the configuration of the pixel circuit Pix(i, j) is not limited to the combination in the pixel circuit in these embodiments, and the pixel circuit may be configured to operate similarly by appropriately changing a conductivity type of the transistor to be used between the P-channel type and the N-channel type. For example, only a P-channel LTPS-TFT may be used as a transistor constituting the pixel circuit Pix(i, j). In addition, while in the fifth embodiment, the P-channel transistor is used as the driving transistor T4 (see FIG. 27), the display device using the pixel circuit Pix(i, j) using the N-channel driving transistor T4 may be configured such that the data signal D(j) and the on-bias voltage Vobs are supplied to the pixel circuit Pix(i, j) in a time division manner by the data signal line Dj as in the fifth embodiment (FIGS. 27 to 30).

Although in the foregoing, each embodiment has been described by taking the organic EL display device as an example, the disclosure is not limited to the organic EL display device, and can be applied to any current drive type display device of the VRR system. Examples of the display element that can be used here include an inorganic light emitting diode, a quantum dot light emitting diode (QLED), and the like in addition to an organic EL element, i.e., an organic light emitting diode (OLED).

Note that the above-described features of the display device may be arbitrarily combined within a range not departing from the gist of the disclosure without departing from the properties thereof to configure a display device having some features of the above-described embodiments and variants.

DESCRIPTION OF REFERENCE CHARACTERS

10, 10*b* Organic El Display Device
11 Display Portion
15 to 19 Pixel Circuit
20 Display Control Circuit
30 Data-Side Drive Circuit (Data Signal Line Drive Circuit)
40 Scanning-Side Drive Circuit (Scanning Signal Line Drive Circuit/Light Emission Control Circuit)
Pix(j, i) Pixel Circuit (i=1 to n, j=1 to m)
NS1*i* First Scanning Signal Line (i=1 to n)
NS2*i* Second Scanning Signal Line (i=1 to n)
NS3*i* Third Scanning Signal Line (i=1 to n)
NS4*i* Fourth Scanning Signal Line (i=1 to n)
PS1*i* First Scanning Signal Line (i=1 to n)
PS2*i* Second Scanning Signal Line (i=1 to n)
NSi Third Scanning Signal Line (i=–1 to n)
Psi P-Type Scanning Signal Line (i=1 to n)
Nsi N-Type Scanning Signal Line (i=1 to n)
EM1*i* First Light Emission Control Line (i=1 to n)

EM2*i* Second Light Emission Control Line (i=1 to n)
Emi Light Emission Control Line (i=1 to n)
Dj Data Signal Line (j=1 to m)
Lini Initialization Voltage Line
Lobs On-Bias Voltage Line (Bias Voltage Line)
MXj Multiplexer (j=1 to m)
ELVDD High Level Power Supply Line (First Power Supply Line),
High Level Power Supply Voltage
ELVSS Low Level Power Supply Line (Second Power Supply Line),
Low Level Power Supply Voltage
OL Organic El Element (Display Element)
Cst Holding Capacitor
T1 Initialization Transistor, First Initialization Transistor
T2 Threshold Compensation Transistor
T3 Write Control Transistor
T4 Driving Transistor
T6 First Light Emission Control Transistor
T5 Second Light Emission Control Transistor
T7 Second Period Transistor
T8 Bias Control Transistor
Ta First Selection Transistor
Tb Second Selection Transistor
Trf Refresh Frame Period (Rf Frame Period)
Tnrf Non-Refresh Frame Period (Nrf Frame Period)
Va Anode Voltage
Vini Initialization Voltage
Vanr anode initialization voltage
Vobs On-Bias Voltage (Bias Voltage)

The invention claimed is:

1. A display device having at least two operation modes including a low refresh mode and a high refresh mode, the display device comprising:

a display portion including a plurality of data signal lines, a plurality of control scanning lines, and a plurality of pixel circuits arranged along the plurality of data signal lines and the plurality of control scanning lines;

a data-side drive circuit configured to generate a plurality of data signals based on image data input from the outside and apply the plurality of data signals to the plurality of data signal lines;

a scanning-side drive circuit configured to control the plurality of pixel circuits by selectively driving the plurality of control scanning lines, and a display control circuit configured to control the data-side drive circuit and the scanning-side drive circuit such that an image represented by the image data is displayed by the plurality of pixel circuits in one of the at least two operation modes, wherein each pixel circuit of the plurality of pixel circuits corresponds to one of the plurality of data signal lines, includes: a display element driven by a current; a holding capacitor; a driving transistor for controlling a supply amount of a current to the display element; a write control switching element for controlling whether to write a voltage of a corresponding data signal line as a data voltage to the holding capacitor; and a bias application circuit for applying, to the driving transistor, a bias voltage for reducing an influence of a hysteresis characteristic of the driving transistor on luminance of the display element, and is configured to apply the bias voltage from the bias application circuit to the driving transistor simultaneously or concurrently in the each pixel circuit when a voltage of a data signal line corresponding to the each pixel circuit is written as a data voltage to the holding capacitor of another pixel circuit, the display control circuit, in the low refresh mode, controls the data-side drive circuit and the scanning-side drive circuit such that one or a plurality of refresh frame periods during which a plurality of data voltages based on the image data is written to the plurality of pixel circuits, respectively, alternates with one or a plurality of non-refresh frame periods during which writing of the plurality of data voltages to the plurality of pixel circuits is stopped, and in the high refresh mode, controls the data-side drive circuit and the scanning-side drive circuit such that the refresh frame period during which the plurality of data voltages based on the image data is written to the plurality of pixel circuits, respectively, continues, and the scanning-side drive circuit, in each refresh frame period, controls the write control switching element such that the voltage of the corresponding data signal line is written as a data voltage to the holding capacitor in each of the plurality of pixel circuits in a predetermined data write period, in each non-refresh frame period, controls the bias application circuit such that the bias voltage is applied to the driving transistor in each of the plurality of pixel circuits during a predetermined bias period, and controls the write control switching element and the bias application circuit such that when new image data is input from the outside during any one of the non-refresh frame periods in the low refresh mode, a new refresh frame period is started at a predetermined time point before an end time point of the any one of the non-refresh frame periods and a plurality of data voltages based on the new image data is written to the plurality of pixel circuits, respectively, and such that in a pixel circuit in which the bias voltage is yet not applied to the driving transistor during the any one of the non-refresh frame periods among the plurality of pixel circuits, the bias voltage is applied to the driving transistor during the bias period from the predetermined time point to the end time point.

2. The display device according to claim 1, wherein the display portion further includes a bias voltage line configured to supply the bias voltage, the bias application circuit is connected to the bias voltage line, and the scanning-side drive circuit controls the bias application circuit such that the bias voltage is applied to the driving transistor from the bias voltage line during the bias period in each of the plurality of pixel circuits.

3. The display device according to claim 1, wherein the display portion further includes an initialization voltage line configured to supply an initialization voltage for initializing the display element, the bias application circuit is connected to the initialization voltage line, and the scanning-side drive circuit controls the bias application circuit such that a voltage of the initialization voltage line is applied to the driving transistor as the bias voltage during the bias period in each of the plurality of pixel circuits.

4. The display device according to claim 3, wherein the driving transistor is an N-channel transistor.

5. The display device according to claim 1, further comprising a plurality of multiplexers provided outside or inside the data-side drive circuit so as to correspond to the plurality of data signal lines, respectively, each of the multiplexers outputting a data signal to be applied to a corresponding data signal line and the bias voltage, to the corresponding data signal line in a time division manner, wherein the write control switching element constitutes the bias application circuit, and the scanning-side drive circuit, in each refresh frame period, in each pixel circuit of the plurality of pixel circuits, with a predetermined period in which a data signal is applied to a data signal line corresponding to the each pixel circuit set as the data write period, controls the write control switching element to be in ON state during the data write period, and controls the write control switching element to be in ON state during a predetermined period in which the bias voltage is applied to the data signal line corresponding to the each pixel circuit such that the bias voltage is applied to the driving transistor during said predetermined period, and in each non-refresh frame period, in each pixel circuit of the plurality of pixel circuits, with a predetermined period in which the bias voltage is applied to the data signal line corresponding to the each pixel circuit set as the bias period, controls the write control switching element to be in ON state during the bias period.

6. The display device according to claim 1, wherein the display portion further includes a first power supply line, a second power supply line, and an initialization voltage line, each of the plurality of pixel circuits further includes a threshold compensation switching element, a first initialization switching element, a first light emission control switching element, and a second light emission control switching element, the display element has a first terminal, and a second terminal connected to the second power supply line, the driving transistor is an N-channel transistor, has:

a first conductive terminal connected to the first power supply line via the second light emission control switching element;

a second conductive terminal connected to the first terminal of the display element via the first light emission control switching element, connected to the corresponding data signal line via the write control switching element, and connected to the bias application circuit; and a control terminal connected to the first conductive terminal of the driving transistor via the threshold compensation switching element and connected to the first terminal of the display element via the holding capacitor, the first initialization switching element has a first conductive terminal connected to the control terminal of the driving transistor via the holding capacitor, and a second conductive terminal connected to the initialization voltage line, and the scanning-side drive circuit, in each refresh frame period, in each of the plurality of pixel circuits, controls the first initialization switching element, the threshold compensation switching element, and the second light emission control switching element to be in ON state and controls the write control switching element and the first light emission control switching element to be in OFF state during a data initialization period provided before the data write period, and controls the write control switching element, the threshold compensation switching element, and the first initialization switching element to be in ON state and controls the first light emission control switching element and the second light emission control switching element to be in OFF state during the data write period, and in each non-refresh frame period, in each of the plurality of pixel circuits, controls the bias application circuit such that the bias voltage is applied to the second conductive terminal of the driving transistor and controls the first light emission control switching element, the second light emission control switching element, and the threshold compensation switching element to be in OFF state during the bias period.

7. The display device according to claim 6, wherein the display portion further includes a bias voltage line for supplying the bias voltage, the bias application circuit includes a bias control switching element having a first conductive terminal connected to the bias voltage line and a second conductive terminal connected to the second conductive terminal of the driving transistor, and the scanning-side drive circuit controls the bias control switching element and the first light emission control switching element to be in ON state and controls the second light emission control switching element and the first initialization switching element to be in OFF state during a display element initialization period provided for initializing the display element in each of the plurality of pixel circuits.

8. The display device according to claim 6, wherein the bias application circuit includes a bias control switching element having a first conductive terminal connected to the initialization voltage line and a second conductive terminal connected to the second conductive terminal of the driving transistor, and the scanning-side drive circuit controls the bias control switching element and the first light emission control switching element to be in ON state and controls the second light emission control switching element to be in OFF state during a display element initialization period provided for initializing the display element in each of the plurality of pixel circuits.

9. The display device according to claim 6, wherein in each of the plurality of pixel circuits, the scanning-side drive circuit controls the first initialization switching element to be in ON state and controls the first light emission control switching element to be in OFF state during a display element initialization period provided for initializing the display element.

10. The display device according to claim 6, wherein the threshold compensation switching element is a thin film transistor in which a channel layer is formed of an oxide semiconductor.

11. The display device according to claim 1, wherein the display portion further includes a first power supply line, a second power supply line, and an initialization voltage line, each of the plurality of pixel circuits further includes a threshold compensation switching element, a first initialization switching element, a first light emission control switching element, and a second light emission control switching element, the display element has a first terminal, and a second terminal connected to the second power supply line, the driving transistor
is a P-channel transistor,
has:
a first conductive terminal connected to the first terminal of the display element via the first light emission control switching element;
a second conductive terminal connected to the first power supply line via the second light emission control switching element, connected to the corresponding data signal line via the write control switching element, and connected to the bias application circuit; and
a control terminal connected to the first conductive terminal of the driving transistor via the threshold compensation switching element, connected to the first power supply line via the holding capacitor, and connected to the initialization voltage line via the first initialization switching element, and
the scanning-side drive circuit,
in each refresh frame period, in each of the plurality of pixel circuits, controls the first initialization switching element to be in ON state and controls the first light emission control switching element and the second light emission control switching element to be in OFF state during a data initialization period provided before the data write period, and controls the write control switching element and the threshold compensation switching element to be in ON state and controls the first initialization switching element, the first light emission control switching element, and the second light emission control switching element to be in OFF state during the data write period, and
in each non-refresh frame period, in each of the plurality of pixel circuits, controls the bias application circuit such that the bias voltage is applied to the second conductive terminal of the driving transistor and controls the first light emission control switching element, the second light emission control switching element, and the threshold compensation switching element to be in OFF state during the bias period.

12. The display device according to claim 11, wherein each of the plurality of pixel circuits further includes a second initialization switching element,
the first terminal of the display element is connected to the initialization voltage line via the second initialization switching element, and
in each of the plurality of pixel circuits, the display control circuit controls the second initialization switching element to be in ON state and controls the first light emission control switching element to be in OFF state during a display element initialization period provided for initializing the display element.

13. The display device according to claim 11, wherein each of the driving transistor, the write control switching element, the first light emission control switching element, and the second light emission control switching element is a thin film transistor in which a channel layer is formed of low-temperature polysilicon, and
each of the threshold compensation switching element and the first initialization switching element is a thin film transistor in which a channel layer is formed of an oxide semiconductor.

14. The display device according to claim 6, wherein the display portion further includes a bias voltage line for supplying the bias voltage,
the bias application circuit includes a bias control switching element having a first conductive terminal connected to the bias voltage line and a second conductive terminal connected to the second conductive terminal of the driving transistor, and
the scanning-side drive circuit controls the bias control switching element to be in ON state and controls the write control switching element to be in OFF state during the bias period in each of the plurality of pixel circuits.

15. The display device according to claim 6, wherein the bias application circuit includes a bias control switching element having a first conductive terminal connected to the initialization voltage line and a second conductive terminal connected to the second conductive terminal of the driving transistor, and
the scanning-side drive circuit controls the bias control switching element to be in ON state and controls the write control switching element to be in OFF state during the bias period in each of the plurality of pixel circuits.

16. The display device according to claim 6, further comprising a plurality of multiplexers provided outside or inside the data-side drive circuit so as to correspond to the plurality of data signal lines, respectively, each of the multiplexers outputting a data signal to be applied to a corresponding data signal line and the bias voltage, to the corresponding data signal line in a time division manner, wherein
the write control switching element constitutes the bias application circuit, and
the scanning-side drive circuit,
in each refresh frame period, in each pixel circuit of the plurality of pixel circuits, with a predetermined period in which a data signal is applied to a data signal line corresponding to the each pixel circuit set as the data write period, controls the write control switching element to be in ON state during the data write period, and controls the write control switching element to be in ON state during a predetermined period in which the bias voltage is applied to the data signal line corresponding to the each pixel circuit such that the bias voltage is applied to the driving transistor during said predetermined period, and
in each non-refresh frame period, in each pixel circuit of the plurality of pixel circuits, with a predetermined period in which the bias voltage is applied to the data signal line corresponding to the each pixel circuit set as the bias period, controls the write control switching element to be in ON state during the bias period.

17. A drive method of a display device having at least two operation modes including a low refresh mode and a high refresh mode, wherein
the display device includes a display portion including a plurality of data signal lines, a plurality of control scanning lines, and a plurality of pixel circuits arranged along the plurality of data signal lines and the plurality of control scanning lines,
each pixel circuit of the plurality of pixel circuits
corresponding to one of the plurality of data signal lines,
including: a display element driven by a current; a holding capacitor; a driving transistor for controlling a supply amount of a current to the display element; a write control switching element for controlling whether to write a voltage of a corresponding data signal line as a data voltage to the holding capacitor; and a bias application circuit for applying, to the driving transistor, a bias voltage for reducing an influence of a hysteresis characteristic of the driving transistor on luminance of the display element, and being configured to apply the bias voltage from the bias application circuit to the driving transistor simultaneously or concurrently in the each pixel circuit when a voltage of a data signal line corresponding to the each pixel circuit is written as a data voltage to the holding capacitor of another pixel circuit, the drive method comprising:

a data-side driving step of generating a plurality of data signals based on image data input from the outside and applying the plurality of data signals to the plurality of data signal lines; and a scanning-side driving step of controlling the plurality of pixel circuits by selectively driving the plurality of control scanning lines, the scanning-side driving step including a low refresh driving step of controlling the plurality of pixel circuits in the low refresh mode such that one or a plurality of refresh frame periods during which a plurality of data voltages based on the image data is written to the plurality of pixel circuits, respectively, alternates with one or a plurality of non-refresh frame periods during which writing of the plurality of data voltages to the plurality of pixel circuits is stopped, and a high refresh driving step of controlling the plurality of pixel circuits in the high refresh mode such that the refresh frame period during which the plurality of data voltages based on the image data is written to the plurality of pixel circuits, respectively, continues, wherein in the low refresh driving step, in each refresh frame period, the write control switching element is controlled such that the voltage of the corresponding data signal line is written as a data voltage to the holding capacitor in each of the plurality of pixel circuits in a predetermined data write period, and in each non-refresh frame period, the bias application circuit is controlled such that the bias voltage is applied to the driving transistor in each of the plurality of pixel circuits during a predetermined bias period, and the scanning-side driving step further includes a mode switching driving step of controlling the write control switching element and the bias application circuit such that when new image data is input from the outside during any one of the non-refresh frame periods in the low refresh mode, a new refresh frame period is started at a predetermined time point before an end time point of the any one of the non-refresh frame periods and a plurality of data voltages based on the new image data is written to the plurality of pixel circuits, respectively, and such that in a pixel circuit in which the bias voltage is yet not applied to the driving transistor during the any one of the non-refresh frame periods among the plurality of pixel circuits, the bias voltage is applied to the driving transistor during the bias period from the predetermined time point to the end time point.

18. The drive method according to claim 17, wherein the display portion further includes a bias voltage line configured to supply the bias voltage, the bias application circuit is connected to the bias voltage line, and in the low refresh driving step, the bias application circuit is controlled such that the bias voltage is applied from the bias voltage line to the driving transistor during the bias period in each of the plurality of pixel circuits.

19. The drive method according to claim 17, wherein the display portion further includes an initialization voltage line configured to supply an initialization voltage for initializing the display element, the bias application circuit is connected to the initialization voltage line, and in the low refresh driving step, the bias application circuit is controlled such that a voltage of the initialization voltage line is applied to the driving transistor as the bias voltage during the bias period in each of the plurality of pixel circuits.

20. The drive method according to claim 17, further comprising a time-division multiplexing driving step of outputting, for each data signal line of the plurality of data signal lines, a data signal to be applied to the each data signal line and the bias voltage, to the data signal line in a time division manner, wherein the write control switching element constitutes the bias application circuit, and in the low refresh driving step, in each refresh frame period, in each pixel circuit of the plurality of pixel circuits, with a predetermined period in which a data signal is applied to a data signal line corresponding to the each pixel circuit set as the data write period, the write control switching element is controlled to be in ON state during the data write period, and the write control switching element is controlled to be in ON state during a predetermined period in which the bias voltage is applied to the data signal line corresponding to the each pixel circuit such that the bias voltage is applied to the driving transistor during said predetermined period, and in each non-refresh frame period, in each pixel circuit of the plurality of pixel circuits, with a predetermined period in which the bias voltage is applied to the data signal line corresponding to the each pixel circuit set as the bias period, the write control switching element is controlled to be in ON state during the bias period.

* * * * *